(12) United States Patent
An et al.

(10) Patent No.: US 10,947,098 B2
(45) Date of Patent: Mar. 16, 2021

(54) REFRIGERATOR AND CONTROL METHOD THEREOF

(71) Applicant: SAMSUNG ELECTRONICS CO., LTD., Suwon-si (KR)

(72) Inventors: Jae Koog An, Gwangju (KR); Kyung Ho Hwang, Anyang-si (KR); Yong Soo Kyong, Seoul (KR); Jea Won Lee, Hwaseong-si (KR); Jong Ho Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 758 days.

(21) Appl. No.: 15/475,729

(22) Filed: Mar. 31, 2017

(65) Prior Publication Data

US 2017/0240403 A1 Aug. 24, 2017

Related U.S. Application Data

(63) Continuation of application No. PCT/KR2015/008779, filed on Aug. 21, 2015.

(30) Foreign Application Priority Data

Oct. 1, 2014 (KR) .................. 10-2014-0132520

(51) Int. Cl.
*B67D 1/00* (2006.01)
*B67D 1/08* (2006.01)
(Continued)

(52) U.S. Cl.
CPC ........ *B67D 1/0075* (2013.01); *B01F 3/04106* (2013.01); *B01F 3/04808* (2013.01);
(Continued)

(58) Field of Classification Search
CPC ..... G05B 15/02; F25D 23/126; F25D 23/028; B01F 3/04106; B01F 3/04815;
(Continued)

(56) References Cited

U.S. PATENT DOCUMENTS 3,991,219 A 11/1976 Kückens
5,021,219 A 6/1991 Rudick et al.
(Continued)

FOREIGN PATENT DOCUMENTS

CN 101146736 A 3/2008
CN 103423936 A 12/2013
(Continued)

OTHER PUBLICATIONS

First Chinese Office Action dated Jun. 23, 2017 in related Chinese Patent Application No. 201510639318.9 (10 pages) (15 pages English Translation).
(Continued)

*Primary Examiner* — Shogo Sasaki
(74) *Attorney, Agent, or Firm* — Staas & Halsey LLP

(57) ABSTRACT

Disclosed herein is a refrigerator capable of producing carbonated water and a control method thereof. The refrigerator includes a carbonated water tank to store carbonated water a carbon dioxide gas supply valve to open/close a carbon dioxide gas flow path to guide carbon dioxide gas from a carbon dioxide gas cylinder to the carbonated water tank, and a carbonated water tank pressure sensor to detect an internal pressure of the carbonated water tank.

8 Claims, 42 Drawing Sheets

(51) Int. Cl.
*B67D 1/12* (2006.01)
*B01F 3/04* (2006.01)
*F25D 23/12* (2006.01)
*F25D 23/02* (2006.01)
*G05B 15/02* (2006.01)

(52) U.S. Cl.
CPC ........ *B01F 3/04815* (2013.01); *B67D 1/0871* (2013.01); *B67D 1/0884* (2013.01); *B67D 1/1252* (2013.01); *F25D 23/028* (2013.01); *F25D 23/126* (2013.01); *G05B 15/02* (2013.01); *B67D 2001/1259* (2013.01); *B67D 2210/00036* (2013.01)

(58) Field of Classification Search
CPC . B01F 3/04808; B67D 1/0871; B67D 1/0075; B67D 1/1252; B67D 2001/1259; B67D 2210/00036; B67D 1/088
See application file for complete search history.

(56) References Cited

U.S. PATENT DOCUMENTS

| | | | | |
|---|---|---|---|---|
| 8,905,383 | B2* | 12/2014 | Ko | F25D 23/126 261/26 |
| 9,381,475 | B2* | 7/2016 | An | F25D 23/126 |

| | | | |
|---|---|---|---|
| 2003/0080142 | A1 | 5/2003 | Meheen |
| 2011/0226343 | A1 | 9/2011 | Novak et al. |
| 2014/0238502 | A1 | 8/2014 | Ko et al. |
| 2014/0239517 | A1 | 8/2014 | An et al. |

FOREIGN PATENT DOCUMENTS

| | | |
|---|---|---|
| CN | 104019612 A | 9/2014 |
| EP | 2 772 713 A2 | 9/2014 |
| EP | 2 772 713 A3 | 4/2015 |
| GB | 1286039 | 8/1972 |
| KR | 10-2011-0011391 | 2/2011 |
| WO | WO 2016/052861 A1 | 4/2016 |

OTHER PUBLICATIONS

Decision on Grant dated Feb. 24, 2018, in corresponding Chinese Patent Application No. 201510639318.9, 8 pgs.
Extended European Search Report dated Apr. 26, 2018, in corresponding European Patent Application No. 15847339.7, 9 pgs.
International Search Report dated Nov. 30, 2015 in corresponding International Patent Application No. PCT/KR2015/008779.
International Written Opinion of the International Searching Authority dated Nov. 30, 2015 in corresponding International Patent Application No. PCT/KR2015/008779.

* cited by examiner

REFRIGERATOR AND CONTROL METHOD THEREOF

CROSS-REFERENCE TO RELATED APPLICATIONS

This application is a continuation of PCT International Patent Application No. PCT/KR2015/008779, filed Aug. 21, 2015 which claims the foreign priority benefit under 35 U.S.C. § 119 of Korean Patent Application No. 10-2014-0132520, filed Oct. 1, 2014, the contents of which are incorporated herein by reference.

TECHNICAL FIELD

Embodiments of the present disclosure relate to a refrigerator, more particularly a refrigerator including an apparatus for producing carbonated water and a control method of the refrigerator.

BACKGROUND ART

A refrigerator is a home appliance including a storage chamber to store food, and a cold air supplier to supply cold air to the storage chamber in order to keep food fresh. To satisfy consumer demand, the refrigerator may be provided with an icemaker to make ice, and a dispenser to allow the user to take water or ice out of the refrigerator from outside of the refrigerator without opening a door.

There are demands for providing processed beverages from the refrigerator, as well as purified water or ice, but a refrigerator typically provides only purified water or ice to a user but processed beverages.

DISCLOSURE

Technical Problem

Therefore, it is an aspect of the present disclosure to provide a refrigerator capable of maintaining an internal pressure of a carbonated water tank to discharge carbonated water at a constant.

It is another aspect of the present disclosure to provide a refrigerator capable of informing to a user or a manager of a valve where an abnormality occurs when an abnormality occurs in any valve included in a carbonated water production module.

Technical Solution

In accordance with one aspect of the present disclosure, a refrigerator includes a carbonated water tank to store carbonated water, a carbonated water tank pressure sensor to detect an internal pressure of the carbonated water tank, a purified water supply valve to open/close a purified water supply flow path to guide water from a purified water tank to the carbonated water tank, a carbon dioxide gas supply valve to open/close a carbon dioxide gas supply flow path to guide carbon dioxide gas from a carbon dioxide gas cylinder to the carbonated water tank, and a controller to open the purified water supply valve and the carbon dioxide gas supply valve in sequence to produce carbonated water, wherein, when an internal pressure of the carbonated water tank is lower than a minimum pressure after carbonated water is produced, the controller may open the carbon dioxide gas supply valve so that the internal pressure of the carbonated water tank is equal to or higher than the minimum pressure.

The refrigerator may further include a carbon dioxide gas discharge valve to control the discharge of carbon dioxide gas in the carbonated water tank, wherein, when an internal pressure of the carbonated water tank is higher than a maximum pressure, the controller may open the carbon dioxide gas discharge valve so that the internal pressure of the carbonated water tank is equal to or lower than the maximum pressure.

While the carbonated water is produced, the controller may warn the change of the carbon dioxide gas cylinder when the internal pressure of carbonated water tank is lower than a reference pressure just after the carbon dioxide gas is supplied.

In accordance with another aspect of the present disclosure, a refrigerator includes a carbonated water tank to store carbonated water, a carbonated water tank pressure sensor to detect an internal pressure of the carbonated water tank, a purified water supply valve to open/close a purified water supply flow path to guide water from a purified water tank to the carbonated water tank, a carbon dioxide gas supply valve to open/close a carbon dioxide gas supply flow path to guide carbon dioxide gas from a carbon dioxide gas cylinder to the carbonated water tank, a carbon dioxide gas discharge valve to control the discharge of carbon dioxide gas in the carbonated water tank, and a controller to open the carbon dioxide gas discharge valve, the purified water supply valve, and the carbon dioxide gas supply valve in sequence to produce carbonated water, wherein, while the carbonated water is produced, the controller may display an abnormality in at least one of the carbon dioxide gas supply valve and the carbon dioxide gas discharge valve based on a detection result of the carbonated water tank pressure sensor.

The controller may warn an abnormality in the carbon dioxide gas discharge valve based on a control valve signal that is provided to the carbon dioxide gas discharge valve and the detection result of the carbonated water tank pressure sensor while the carbonated water is produced.

The controller may warn an abnormality in the carbon dioxide gas discharge valve when the internal pressure of the carbonated water tank is higher than atmospheric pressure after delivering an open valve signal to the carbon dioxide gas discharge valve.

The controller may open the carbon dioxide gas discharge valve when the internal pressure of the carbonated water tank is the same as atmospheric pressure after delivering an open valve signal to the carbon dioxide gas discharge valve.

The controller may warn an abnormality in the carbon dioxide gas supply valve based on a control valve signal that is provided to the carbon dioxide gas supply valve and a detection result of the carbonated water tank pressure sensor while the carbonated water is produced.

The controller may warn an abnormality in the carbon dioxide gas supply valve when the internal pressure of the carbonated water tank is not increased after delivering an open valve signal to the carbon dioxide gas supply valve.

In accordance with another aspect of the present disclosure, a refrigerator includes a carbonated water tank to store carbonated water, a carbonated water tank pressure sensor to detect an internal pressure of the carbonated water tank, a carbonated water discharge valve to open/close a carbonated water discharge flow path to guide carbonated water stored in the carbonated water tank to the outside of the refrigerator, and a controller to warn an abnormality in the carbonated water discharge valve based on a detection result of the carbonated water tank pressure sensor.

The controller may warn an abnormality in the carbonated water discharge valve when the internal pressure of the carbonated water tank is not reduced after delivering an open valve signal to the carbonated water discharge valve.

The controller may warn an abnormality in the carbonated water discharge valve when the internal pressure of the carbonated water tank is reduced after delivering a close valve signal to the carbonated water discharge valve.

In accordance with one aspect of the present disclosure, a control method of a refrigerator capable of producing carbonated water includes supplying water and carbon dioxide gas sequentially to a carbonated water tank to produce carbonated water, detecting an internal pressure of the carbonated water tank by a carbonated water tank pressure sensor after carbonated water is produced, and resupplying carbon dioxide gas to the carbonated water tank when the detected internal pressure of the carbonated water tank is lower than a minimum pressure, so that the internal pressure of the carbonated water tank is higher than a reference pressure.

The control method may further include discharging carbon dioxide gas from the carbonated water tank when the detected internal pressure of the carbonated water tank is higher than the maximum pressure, so that the internal pressure of the carbonated water tank is lower than a maximum pressure.

The control method may further include detecting an internal pressure of the carbonated water tank by a carbonated water tank pressure sensor while carbonated water is produced and warning of the change of a carbon dioxide gas cylinder when the internal pressure of the carbonated water tank is lower than the reference pressure.

In accordance with another aspect of the present disclosure, a control method of a refrigerator capable of producing carbonated water includes supplying water and carbon dioxide gas sequentially to a carbonated water tank to produce carbonated water, detecting an internal pressure of the carbonated water tank by a carbonated water tank pressure sensor after carbonated water is produced, and displaying an abnormality in at least one valve of the carbon dioxide gas supply valve and the carbon dioxide gas discharge valve based a detection result of the carbonated water tank pressure sensor.

The displaying an abnormality in at least one valve may include warning an abnormality in the carbon dioxide gas discharge valve when the internal pressure of the carbonated water tank is higher than atmospheric pressure after delivering an open valve signal to the carbon dioxide gas discharge valve.

The displaying an abnormality in at least one valve may include warning an abnormality in the carbon dioxide gas supply valve when the internal pressure of the carbonated water tank is not increased after delivering a close valve signal to the carbon dioxide gas discharge valve.

Advantageous Effects

In accordance with one aspect of the present disclosure, a refrigerator may maintain an internal pressure of a carbonated water tank to discharge carbonated water at a constant by being provided with a pressure sensor configured to detect an internal pressure of a carbonated water tank.

In accordance with another aspect of the present disclosure, a refrigerator may inform to a user or a manager of a valve which is not opened or not closed, by sequentially opening/closing a plurality of valves used for the production of carbonated water, and detecting the flow of water.

DESCRIPTION OF DRAWINGS

These and/or other aspects of the present disclosure will become apparent and more readily appreciated from the following description of the embodiments, taken in conjunction with the accompanying drawings of which.

BEST MODE

Figure 1:
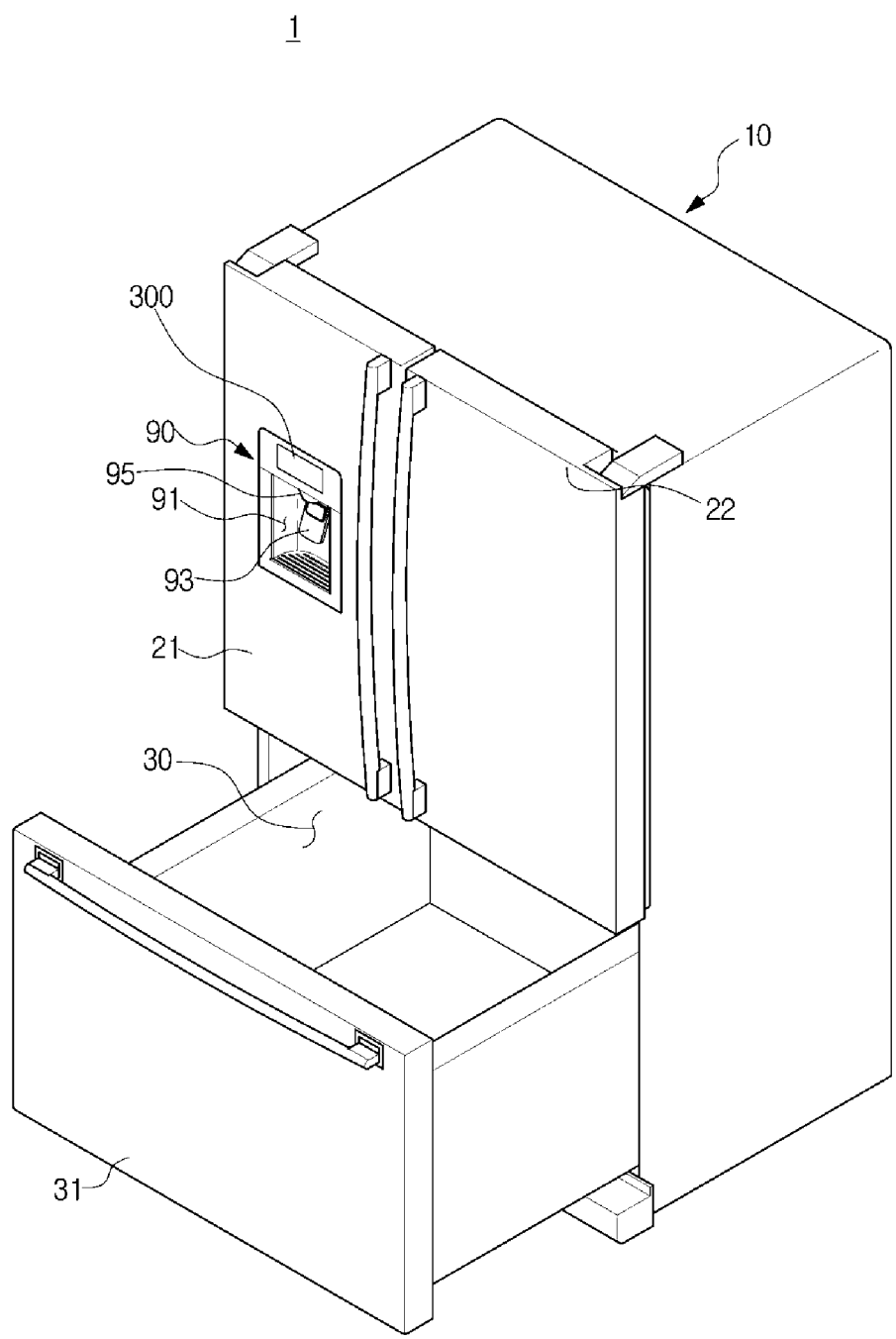
FIG. 1 is a view illustrating an appearance of a refrigerator according to one embodiment of the present disclosure.

Reference will now be made in detail to embodiments of the present disclosure, examples of which are illustrated in the accompanying drawings, wherein like reference numerals refer to like elements throughout.

Figure 2:
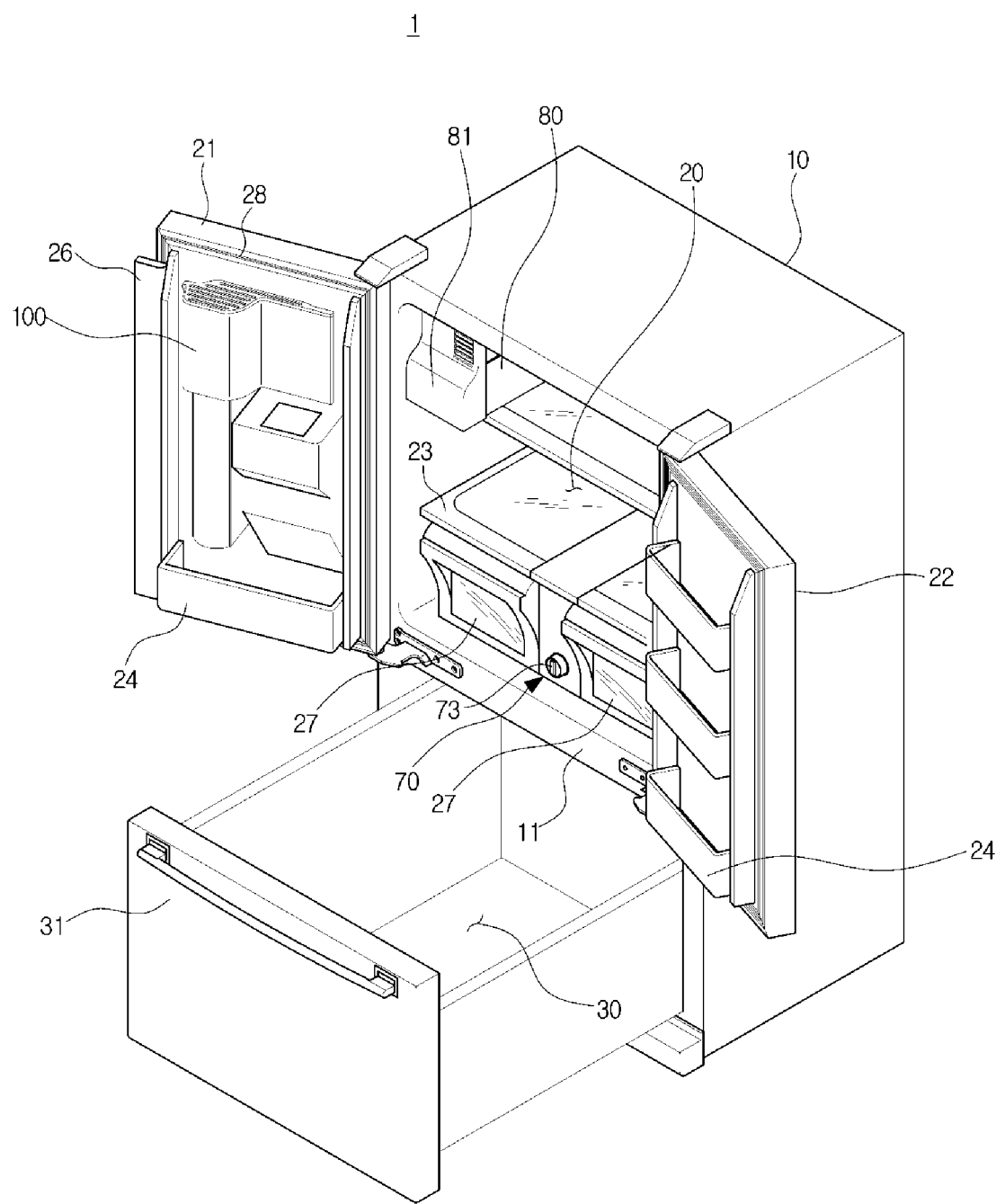
FIG. 2 is a view illustrating an interior of a refrigerator according to one embodiment of the present disclosure.

FIG. 1 is a view illustrating an appearance of a refrigerator according to one embodiment of the present disclosure, and FIG. 2 is a view illustrating an interior of a refrigerator according to one embodiment of the present disclosure.

Referring to FIGS. 1 to 2, a refrigerator 1 according to one embodiment of the present disclosure may include a body 10, a storage chamber 20 and 30 provided inside the body 10, and a cold air supplier (not shown) to supply cool air to the storage chamber 20 and 30.

The body 10 may include an inner case to form the storage chamber 20 and 30, an outer case coupled to the inner case at an outside of the inner case to form the appearance of the refrigerator 1, and an insulator disposed between the inner and outer cases, to insulate the storage chamber 20 and 30.

The storage chamber 20 and 30 may be divided into an upper refrigerating compartment 20 and a lower freezing compartment 30 by an intermediate partition 11. The refrigerating compartment 20 may be kept at a temperature of approximately 3° C., to store food in a refrigerated state, whereas the freezing compartment 30 may be kept at a temperature of approximately −18.5° C., to store food in a frozen state.

Hereinbefore the refrigerating compartment 20 and the freezing compartment 30 which are divided into upside and down are illustrated, but are not limited thereto. Thus the refrigerating compartment 20 and the freezing compartment 30 may be divided into side by side by the intermediate partition 11.

Racks 23 may be provided at the refrigerating compartment 20, to place food thereon. In the refrigerating compartment 20, at least one storage box 27 may also be provided to store food in a closed state.

In addition, a purified water supply module 70 configured to purify water and store purified water may be provided in the refrigerating compartment 20, and the purified water supply module 70 may include a purification filter 73 to purify water supplied from water source and a purified water tank 71 to store purified water.

As illustrated in FIG. 2, the purified water supply module 70 may be between a plurality of storage boxes 27, but is not limited thereto. It may be enough for the purified water supply module 70 to be disposed inside the refrigerating compartment 20 so that water in the purified water supply module 70 is cooled by cool air from the inside of the refrigerating compartment 20.

A detailed configuration of the purified water supply module 70 will be described later with reference to FIGS. 5 and 6.

In addition, an ice making compartment 80 to produce ice may be provided at an upper corner of the refrigerating compartment 20 to be separated from the refrigerating compartment 20. In the ice making compartment 80, an icemaker 81 to make and store ice may be provided. The icemaker 81 may include an ice making tray to produce ice by using water supplied from the purified water tank 70, and an ice bucket to store ice produced in the ice making tray.

Each of the refrigerating compartment 20 and the freezing compartment 30 has an open front side to allow food to be place therein or withdraw therefrom. The open front side of the refrigerating compartment 20 may be opened/closed by a pair of rotatable doors 21 and 22 hinge-coupled to the body 10. The open front side of the freezing compartment 30 may be opened/closed by a sliding door 31 slidable with respect to the body 10.

Door guards 24 may be provided at rear surfaces of the refrigerating compartment doors 21 and 22 to store food. A gasket 28 may be provided along an edge of the rear surface of the refrigerating compartment door 21 and 22 to confine cold air in the refrigerating compartment 20 by closing between the refrigerating compartment door 21 and 22 and the body 10 when the refrigerating compartment door 21 and 22 are closed.

A rotating bar 26 may be selectively provided at any one of the refrigerating compartment doors 21 and 22, to confine cold air in the refrigerating compartment 20 by closing between the refrigerating compartment door 21 and 22 when the refrigerating compartment door 21 and 22 are closed.

In addition, at any one of the refrigerating compartment doors 21 and 22, a dispenser module 90 may be provided to allow the user to put out purified water, carbonated water or ice from the outside of the refrigerator 1 without opening the refrigerating compartment door 21, and a user interface 300 may be provide to receive an input of a control command related to operations of the refrigerator 1, and to display operation information of the refrigerator 1.

The dispenser module 90 may include a dispensation space 91 in which a container such as a cup, is inserted to dispense water or ice, a dispenser lever 93 to operate the dispenser module 90 to discharge purified water, carbonated water or ice, and a dispenser nozzle 95 in which purified water or carbonated water is discharged.

A detailed configuration and operation of the dispenser module 90 will be described later with reference to FIGS. 3 and 4.

The user interface 300 may include a touch switch to receive an input of a variety of control commands of the refrigerator 1 from a user, and a display unit to display operation information of the refrigerator 1 to the user.

The user interface 300 may receive a target temperature of the refrigerating compartment 20, a target temperature of the freezing compartment 30, whether to activate the carbonated water production, a concentration of carbonated water, and the likes, and may display a present temperature of the refrigerating compartment 20, a present temperature of the freezing compartment 30, whether to produce carbonated water, a concentration of produced carbonated water, and the likes corresponding to a control command of a user.

A detailed configuration and operation of the user interface 300 will be described later with reference to FIGS. 10 and 11.

On the rear surface of the refrigerating compartment door 21 where the dispenser module 90 is provided, a carbonated water production module 100 to produce and store carbonated water may be mounted.

The carbonated water production module 100 will be described with reference to FIGS. 5 and 6.

Figure 3:
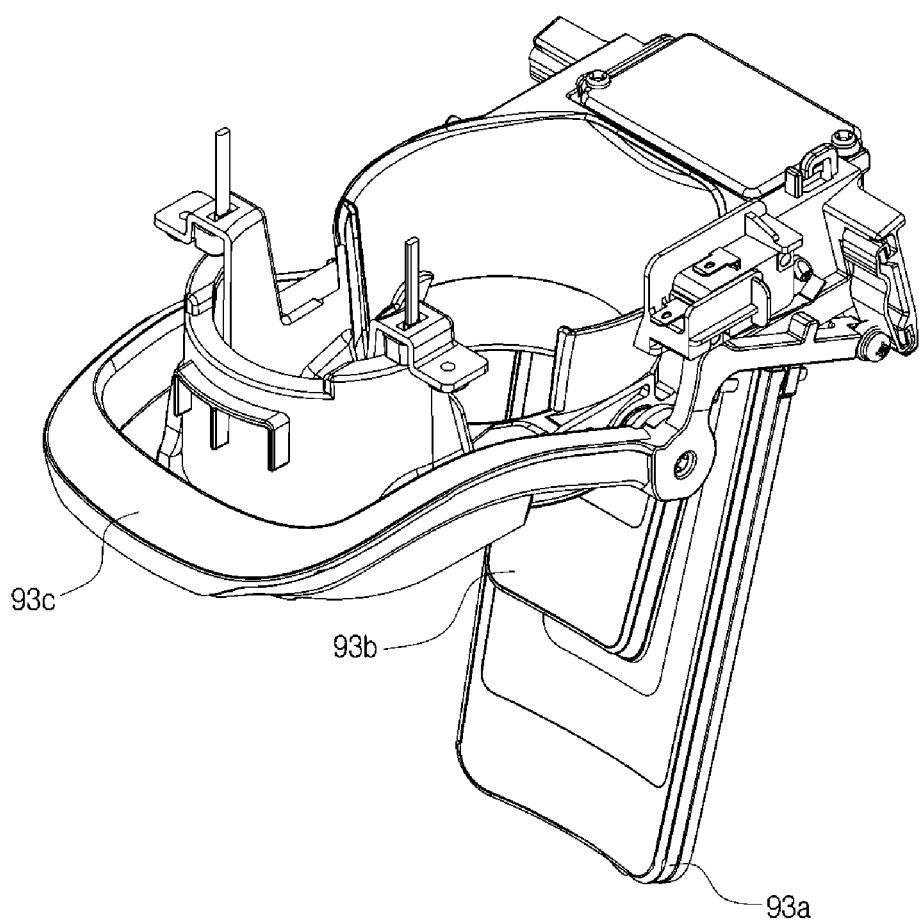
FIG. 3 is a view illustrating a configuration of a dispenser module included in a refrigerator according to one embodiment of the present disclosure.
Figure 4:
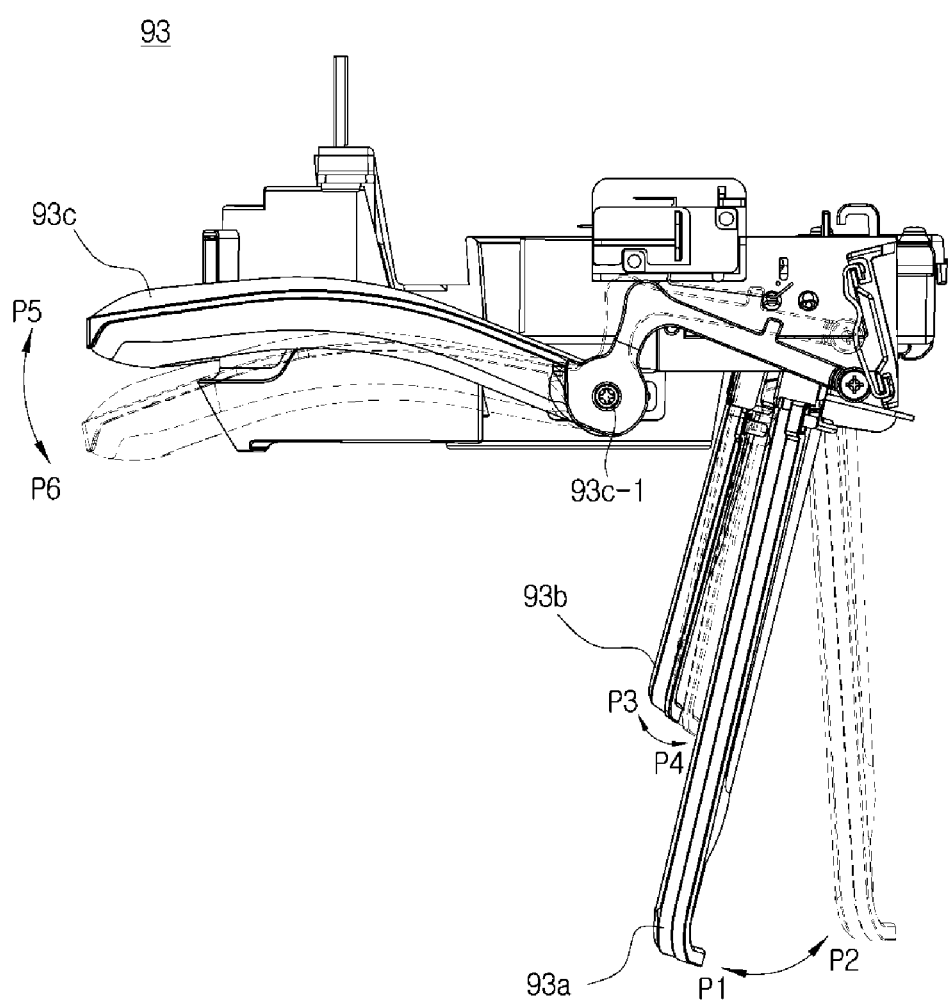
FIG. 4 is a view illustrating a motion of a dispenser module included in a refrigerator according to one embodiment of the present disclosure.

FIG. 3 is a view illustrating a configuration of a dispenser module included in a refrigerator according to one embodiment of the present disclosure and FIG. 4 is a view illustrating a motion of a dispenser module included in one refrigerator according to one embodiment of the present disclosure.

Referring to FIGS. 3 and 4, a dispenser lever 93 may include a first dispenser lever 93a, a second dispenser lever 93b, and a third dispenser lever 93c.

The first lever 93a may be formed to be extended from an upper side to an lower side, and may be rotatably movable back and forth with respect to a first shaft (not shown) provided on an upper side of the first lever 93a.

Particularly, the first lever 93a may be rotatably moved between a first position P1 and a second position P2 with respect to the first shaft (not shown). For example, when the user presses the first lever 93a backward, the first lever 93a may be moved from the first position P1 to the second position P2, and when the user releases the first lever 93a, the first lever 93a may automatically return to the first position P1.

The second lever 93b may be provided to be overlapped in the front of the first lever 93a, and may be rotatably movable back and forth with respect to a second shaft (not shown) provided on an upper side of the second lever 93b.

The second lever 93b may be rotatably moved between a third position P3 and a fourth position P4 with respect to the second shaft (not shown). For example, when the user presses the second lever 93b backward, the second lever 93b may be moved from the third position P3 to the fourth position P4, and when the user releases the second lever 93b, the second lever 93b may automatically return to the third position P3.

The third lever 93c may be protruded toward the front of the dispenser 90, and may be rotatably moved up and down with respect to a third shaft 93c-1 provided on a rear side of the third lever 93c.

Particularly, the third lever 93c may be rotatably moved between a fifth position P5 and a sixth position P6 with respect to the third shaft (93c-1). For example, when the user presses the third lever 93c downward, the third lever 93c may be moved from the fifth position P5 to the sixth position P6 and fixed at the sixth position P6. In addition, when the user presses the third lever 93c upward, the third lever 93c may be moved from the sixth position P6 to the fifth position P5 and fixed at the fifth position P5.

The user may input commands of discharging ice, purified water, or carbonated water by manipulating the first lever 93a, the second lever 93b, or the third lever 93c according to a predetermined operation method.

For example, when the user presses the first dispenser lever 93a, the refrigerator 1 may discharge purified water. That is, when the first dispenser lever 93a is placed in the second position P2, the refrigerator 1 may discharge purified water via the dispenser module 90, and when the first dispenser lever 93a is placed in the first position P1, the refrigerator 1 may stop discharging purified water.

For another example, when the user places the third dispenser lever 93c at the fifth position P5, and presses the second dispenser lever 93b, the refrigerator 1 may discharge carbonated water. When the user places the third dispenser lever 93c at the sixth position P6, and presses the second dispenser lever 93b, the refrigerator 1 may discharge ice. In other words, the refrigerator 1 may discharge carbonated water or ice depending on the position of the third dispenser lever 93c when the second dispenser lever 93b is placed in the fourth position P4, and may stop discharging carbonated water or ice when the second dispenser lever 93b is placed in the third position P3.

Hereinbefore the configuration of the refrigerator 1 according to one embodiment of the present disclosure is described. However, the description of the refrigerator 1 may be an example of embodiments, and thus the present disclosure may apply to a refrigerator having any structure capable of producing carbonated water.

Hereinafter a carbonated water production module 100 provided in a refrigerator 1 will be described.

Figure 5:
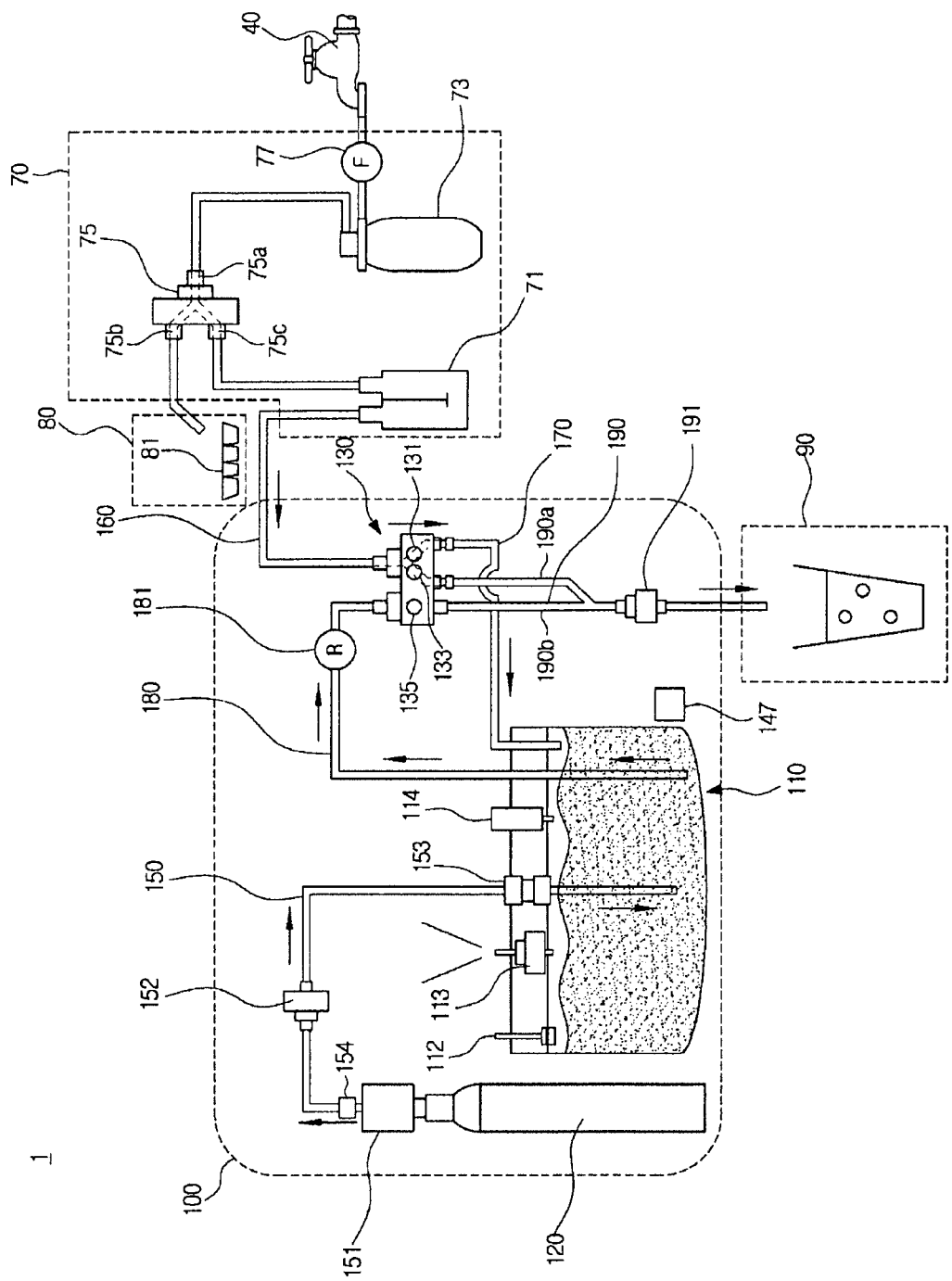
FIG. 5 is a view illustrating a carbonated water production module and a purified water supply module included in a refrigerator according to one embodiment of the present disclosure.
Figure 6:
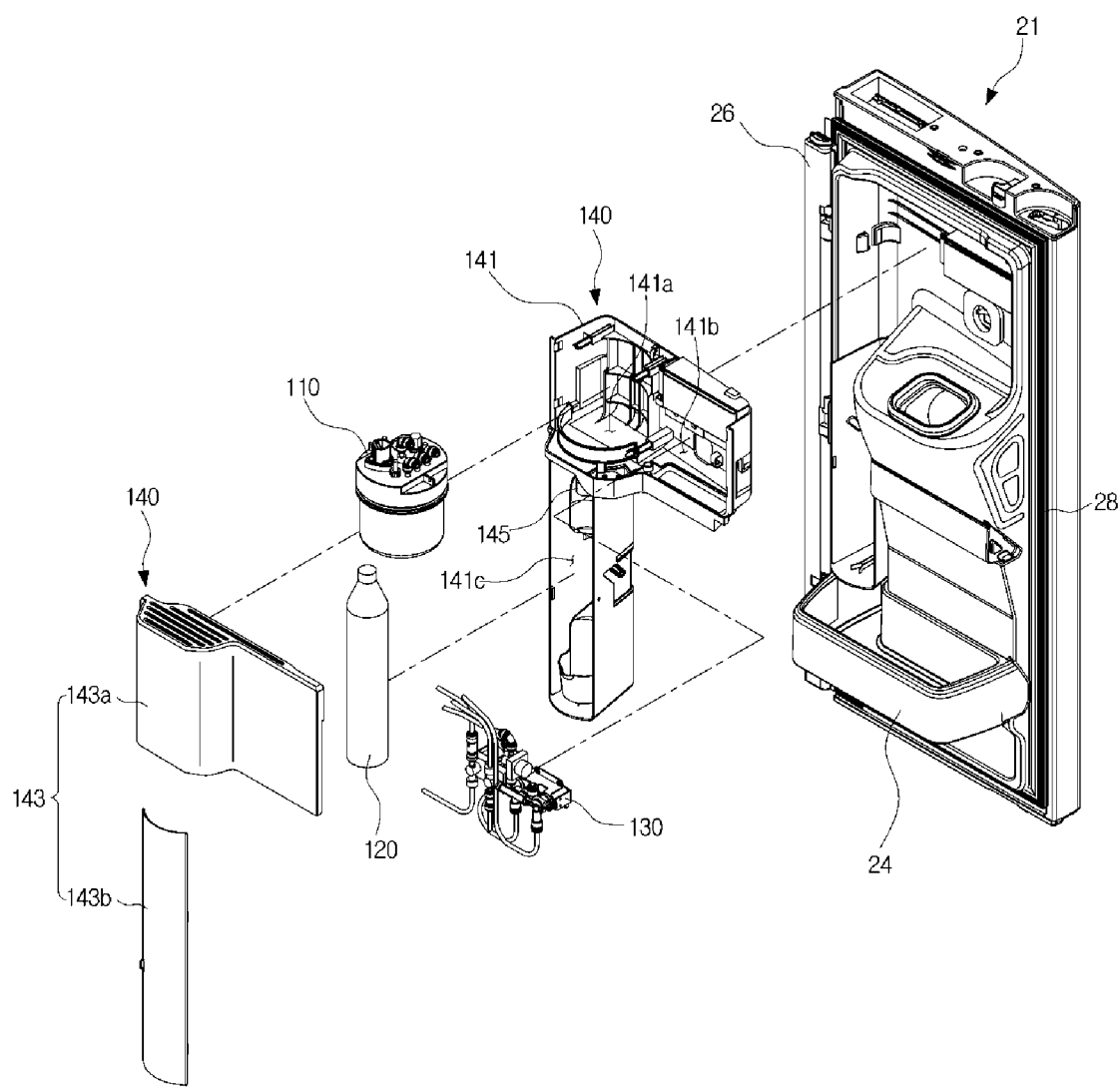
FIG. 6 is a view illustrating an assembly structure of a carbonated water production module included in a refrigerator according to one embodiment of the present disclosure.

FIG. 5 is a view illustrating a carbonated water production module and a purified water supply module included in a refrigerator according to one embodiment of the present disclosure, and FIG. 6 is a view illustrating an assembly structure of a carbonated water production module included in a refrigerator according to one embodiment of the present disclosure.

Figure 7A:
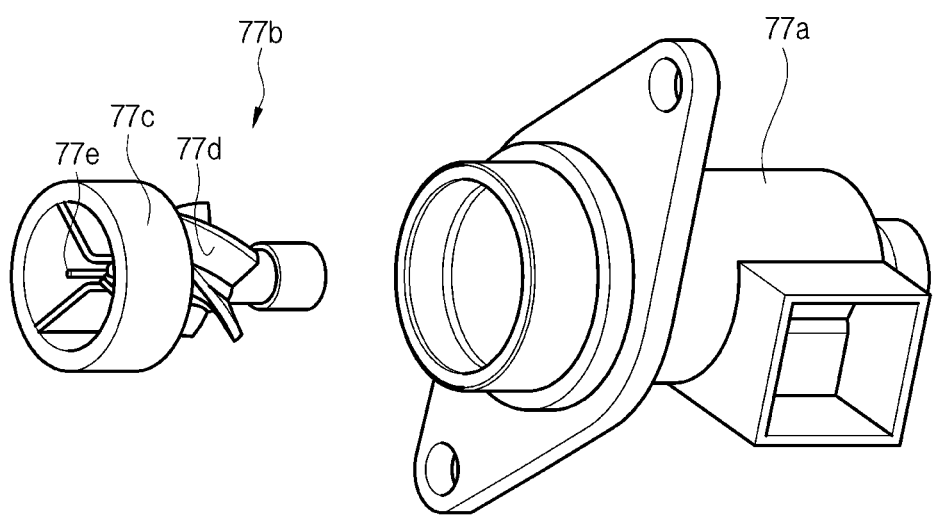
FIGS. 7A and 7B are a view illustrating an example of a flow sensor included in a refrigerator according to one embodiment of the present disclosure.
Figure 7B:
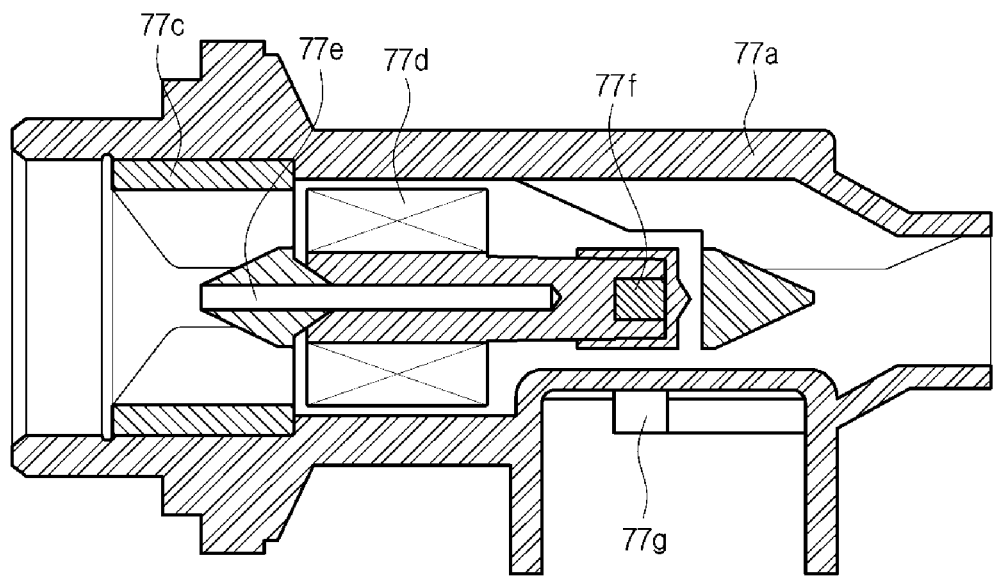
Figure 8A:
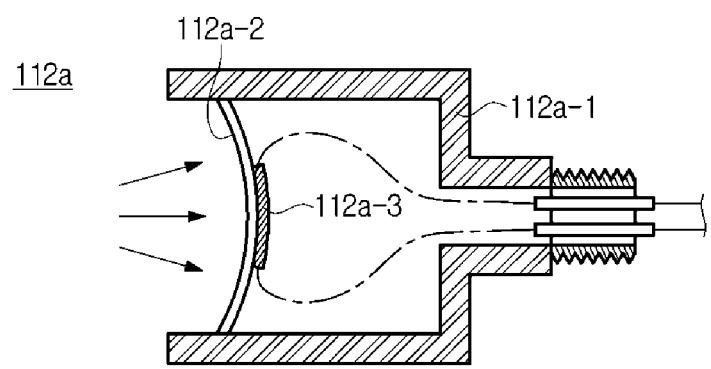
FIGS. 8A, 8B and 8C are a view illustrating an example of a carbonated water tank pressure sensor included in a refrigerator according to one embodiment of the present disclosure.
Figure 8B:
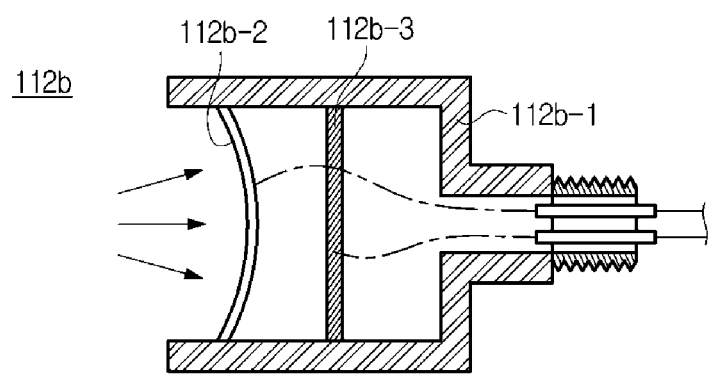
Figure 8C:
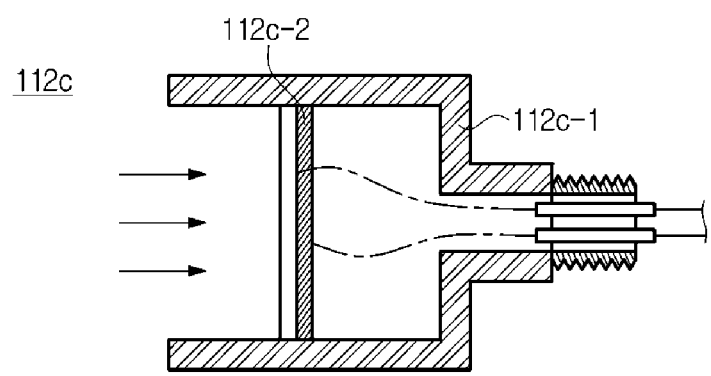
Figure 9:
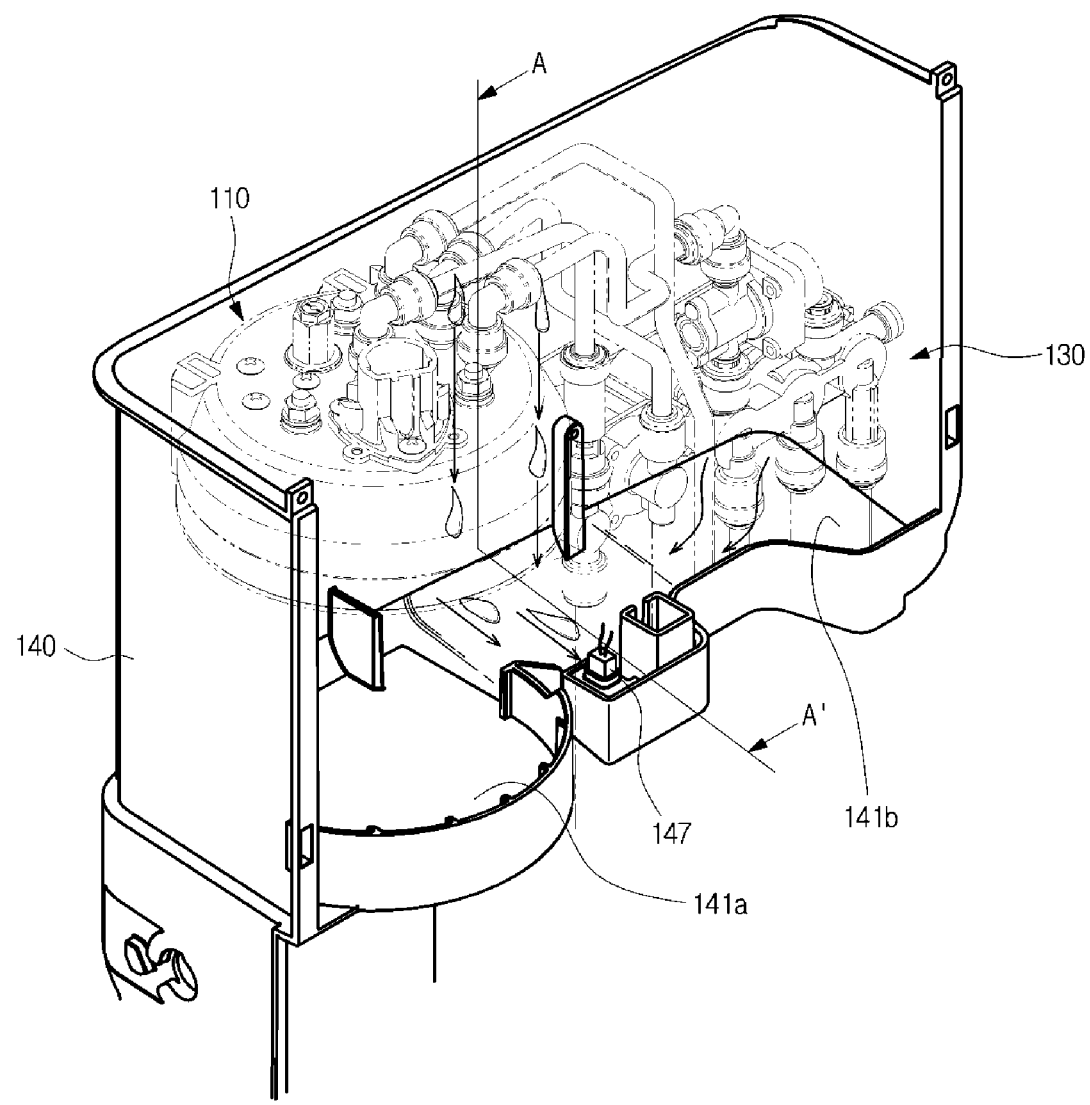
FIG. 9 is a view illustrating an example of a water leakage sensor included in a refrigerator according to one embodiment of the present disclosure.

FIGS. 7A and 7B are a view illustrating an example of a flow sensor included in a refrigerator according to one embodiment of the present disclosure, FIGS. 8A, 8B and 8C are a view illustrating an example of a carbonated water tank pressure sensor included in a refrigerator according to one embodiment of the present disclosure, and FIG. 9 is a view illustrating an example of a water leakage sensor included in a refrigerator according to one embodiment of the present disclosure.

An example of the purified water supply module 70 and the carbonated water production module 100 will be described with reference to FIGS. 5 to 9

The purified water supply module 70 may supply purified water, which is discharged via the dispenser module 90 or used for producing carbonated water.

As illustrated in FIG. 5, the purified water supply module 70 may include a purified water tank 71 to store purified water, a purification filter 73 to purify water supplied from the water source 40, a flow path switching valve 75 to distribute purified water into the ice maker 81 or the purified water tank 71, and a flow sensor 77 to detect an amount of water supplied to the ice maker 81 or the purified water tank 71.

As mentioned above, the purified water tank 71 may be provided in the plurality of storage boxes 27 (refer to FIG. 2), and the purification filter 73 may be provided to be adjacent to the center of the purified water tank 71.

The flow path switching valve 75 may be implemented by a three-way valve including an inlet 75a connected to the purification filter 73, a first outlet 75b connected to the ice maker 81 and a second outlet 75c connected to the purified water tank 71, as illustrated in FIG. 5.

The flow path switching valve 75 may supply purified water supplied from the purification filter 73 to any one of the purified water tank 71 and the ice maker 81.

Particularly, when an operation of making ice is not required, the flow path switching valve 75 may open a flow path on the side of the purified water tank 71 and close a flow path on the side of the ice maker 81 to supply purified water to the purified water tank 71.

In addition, when an operation of making ice is required, the flow path switching valve 75 may close a flow path on the side of the purified water tank 71 and open a flow path on the side of the ice maker 81 to supply purified water to the ice maker 81.

As illustrated in FIGS. 7A and 7B, the flow sensor 77 may include a flow sensor body 77a in the shape of a cylinder, and a rotor 77b inserted into the inside of the flow sensor body 77a.

The rotor 77b may be rotated by a flow of water supplied from the water source 40, and may include a holder 77c to fix the rotator 77b to the inside of the flow sensor body 77a, an impeller 77d rotated with respect to a rotation shaft 77e according to the flow water, and a permanent magnet 77f rotated together with the impeller 77d.

In the outside of the flow sensor body 77a, a hall sensor 77g to detect a magnetic field generated by the permanent magnet 77f of the rotor 77b may be provided.

According to the rotation of the permanent magnet 77f, the magnetic field may be detected at the same period as a period of rotation of the rotor 77b by the hall sensor 77g, and whenever the magnetic field is detected, electric pulses may be outputted.

Based on the total number of electric pulses outputted by the flow sensor 77, the refrigerator 1 may estimate an amount of water supplied to the purified water supply module 70 from the external water source 40, and may estimate flow velocity of water supplied to the purified water supply module 70 based on the number of electric pulses per unit time i.e., 1 second.

In FIG. 5, the flow sensor 77 is disposed between the external water source 40 and the purification filter 73, but is not limited thereto. The flow sensor 77 may be disposed between the purification filter 73 and the flow path switching valve 75.

The carbonated water production module 100 may produce and store carbonated water inside the refrigerator 1.

The carbonated water production module 100 may include a carbonated water tank 110 to produce carbonated water by mixing of purified water with carbon dioxide gas and to store the carbonated water, a carbon dioxide gas cylinder 120 to store carbon dioxide gas, a valve assembly 130 to control a flow of purified water and carbonated water. The carbonated water production module 100 may further include a variety of valves 150, 160, 170, 180, and 190 to connect between the carbonated water tank 110, the carbon dioxide cylinder 120 and the valve assembly 130, and a module case 140 where the carbonated water tank 110, the carbon dioxide gas cylinder 120 and the valve assembly 130 are placed.

The carbonated water tank 110 may produce carbonated water by mixing of purified water supplied from the purified water tank 70 with carbon dioxide gas supplied from the carbon dioxide gas cylinder 120, and may store the produced carbonated water. In addition, as illustrated in FIG. 6, the carbonated water tank 110 may be placed in a first upper accommodation space 141a of the module case 140.

The carbonated water tank 110 may be formed to have a predetermined size to store approximately 1 l of purified water. The carbonated water tank 110 may be made of a stainless steel material in order to minimize the size of the carbonated water tank 110 while sustaining a high pressure and exhibiting corrosion resistance.

In the carbonated water tank 110, a carbonated water tank pressure sensor 112 to detect the internal pressure of the carbonated water tank 110, a carbon dioxide gas discharge valve 113 to discharge carbon dioxide gas inside the carbonated water tank 110, and a safety valve 114 to discharge carbon dioxide gas inside the carbonated water tank 110, when the internal pressure of the carbonated water tank 110 is higher than the reference pressure, may be provided.

The carbonated water tank pressure sensor 112 may detect the internal pressure of the carbonated water tank 110 and output an electrical signal corresponding to the detected pressure.

As illustrated in FIGS. 8A, 8B and 8C, the carbonated water tank pressure sensor 112 may have various shapes. For example, the carbonated water tank pressure sensor 112 may employ a strain gauge pressure sensor 112a, a capacitive pressure sensor 112b, a piezoelectric pressure sensor 112c and the likes.

As illustrated in FIG. 8A, the strain gauge pressure sensor 112a may include a sensor body 112a-1, a diaphragm 112a-2 having a shape, which is variable according to the internal pressure of the carbonated water tank 110, a strain gauge 112a-3 mounted to the diaphragm 112a-2. The shape of the strain gauge 112a-3 may be variable together with the diaphragm 112a-2 according to the internal pressure of the carbonated water tank 110, and an electrical resistance may be variable according to the variation of the shape.

The strain gauge pressure sensor 112*a* may detect carbon dioxide gas pressure of the inside of the carbonated water tank 110 by using the electrical resistance of the strain gauge 112*a*-3 variable according to the internal pressure of the carbonated water tank 110.

As illustrated in FIG. 8B, the capacitive pressure sensor 112*b* may include a sensor body 112*b*-1, a diaphragm 112*b*-2 having a shape variable according to the internal pressure of the carbonated water tank 110, a fixation electrode 112*b*-3 installed to be separated from the diaphragm 112*b*-2. The capacitance between the diaphragm 112*b*-2 and the fixation electrode 112*b*-3 may be variable according to the internal pressure of the carbonated water tank 110.

The capacitive pressure sensor 112*b* may detect carbon dioxide gas pressure of the inside of the carbonated water tank 110 by using the capacitance between the diaphragm 112*b*-2 and the fixation electrode 112*b*-3 variable according to the internal pressure of the carbonated water tank 110.

As illustrated in FIG. 8C, the piezoelectric pressure sensor 112*c* may include a sensor body 112*c*-1, and a piezoelement 112*c*-2 variable according to the internal pressure of the carbonated water tank 110. The piezoelement 112*c*-2 may output variable voltage according to the variation of the shape.

The piezoelectric pressure sensor 112*c* may detect carbon dioxide gas pressure of the inside of the carbonated water tank 110 by using the output voltage of the piezoelement 112*c*-2 variable according to the internal pressure of the carbonated water tank 110.

The carbon dioxide gas cylinder 120 may store carbon dioxide gas at a high pressure of approximately 45 to 60 bars, and may be mounted to a cylinder connector 145 of the module case 140. In addition, the carbon dioxide gas cylinder 120 may be placed in the lower accommodation space 141*c* of the module case 140.

Carbon dioxide gas in the carbon dioxide gas cylinder 120 may be supplied to the carbonated water tank 110 via a carbon dioxide gas supply flow path 150 to connect the carbon dioxide gas cylinder 120 to the carbonated water tank 110.

The carbon dioxide gas supply flow path 150 may guide carbon dioxide gas stored in the carbon dioxide gas cylinder 120 to the carbonated water tank 100. A carbon dioxide gas regulator 151 to adjust the pressure of carbon dioxide gas, a carbon dioxide gas pressure sensor 154 to detect a pressure of discharged carbon dioxide gas, a carbon dioxide gas supply valve 152 to open/close the carbon dioxide gas supply flow path 150, and a carbon dioxide gas backflow prevention valve 153 to prevent backflow of carbon dioxide gas may be provided on the carbon dioxide gas supply flow path 150.

The carbon dioxide gas regulator 151 may be provided on a carbon dioxide gas outlet of the carbon dioxide gas cylinder 120 and may adjust the pressure of carbon dioxide gas discharged from the carbon dioxide gas cylinder 120. Particularly, the carbon dioxide gas regulator 151 may reduce the pressure of carbon dioxide gas, which is supplied to the carbonated water tank 110, to approximately 8.5 bar.

The carbon dioxide gas pressure sensor 154 may be provided on a carbon dioxide gas outlet of the carbon dioxide regulator 151 and may detect the pressure of carbon dioxide gas, which is reduced by the carbon dioxide gas regulator 151.

The carbon dioxide gas pressure sensor 154 may employ a pressure switch to output a low pressure sensing signal corresponding to the reduced pressure of carbon dioxide gas when the pressure of carbon dioxide gas reduced by the carbon dioxide gas regulator 151 is reduced below a predetermined pressure, The valve assembly 130 may be placed in the second upper accommodation space 141*b* of the module case 140, and may include a purified water supply valve 131 to regulate to supply purified water to the carbonated water tank 110, a purified water discharge valve 133 to regulate the discharge of purified water and a carbonated water discharge valve 135 to regulate the discharge of carbonated water.

The purified water supply valve 131 may allow purified water to be supplied to the carbonated water tank 110, or may stop supplying purified water. Particularly, when the purified water supply valve 131 is opened, purified water may be supplied to the carbonated water tank 110 from the purified water supply module 70, and when the purified water supply valve 131 is closed, purified water may be not supplied to the carbonated water tank 110.

One end of the purified water supply valve 131 may be connected to a first purified water supply flow path 160 to guide purified water from the purified water supply module 70 to the valve assembly 130, and the other end of the purified water supply valve 131 may be connected to a second purified water supply flow path 170 to guide purified water passed through the purified water supply valve 131 to the carbonated water tank 110.

The purified water discharge valve 133 may allow the discharge of the purified water via the dispenser module 90 or may stop the discharge of the purified water. Particularly, when the purified water discharge valve 133 is opened, purified water may be discharged from the purified water supply module 70 via the dispenser module 90, and when the purified water discharge valve 133 is closed, purified water may be not discharged.

One end of the purified water discharge valve 133 may be connected to the first purified water supply flow path 160 to guide purified water from the purified water supply module 70 to the valve assembly 130, and the other end of the purified water supply valve 131 may be connected to an integrated discharge flow path 190 to guide purified water or carbonated water to the dispenser module 90.

The carbonated water discharge valve 135 may allow the discharge of the carbonated water via the dispenser module 90 or may stop the discharge of the carbonated water. Particularly, when the carbonated water discharge valve 135 is opened, carbonated water may be discharged from the carbonated water tank 110 via the dispenser module 90, and when the carbonated water discharge valve 135 is closed, carbonated water may be not discharged.

One end of the carbonated water discharge valve 135 may be connected to a carbonated water discharge flow path 180 to guide carbonated water from the carbonated water tank 110 to the valve assembly 130, and the other end of the carbonated water discharge valve 135 may be connected to the integrated discharge flow path 190 to guide purified water or carbonated water to the dispenser module 90.

The purified water supply valve 131, the purified water discharge valve 133 and the carbonated water discharge valve 135 may be independently openable or closeable, and may be configured with a solenoid valve.

As mentioned above, the valve assembly 130 may include the three independent valves 131, 133, and 135, and may further include one three way flow path switch valve to selectively supply purified water from the purified water supply module 70 to the carbonated water tank 110 or the dispenser module 90, and another three-way flow path switch valve to supply purified water from the purified water supply module 70 to the dispenser module 90 or to supply carbonated water from the carbonated water tank 110 to the dispenser module 90.

The first purified water supply flow path 160 may connect the purified water supply module 70 to the valve assembly 130, and may guide purified water in the purified water supply module 70 from the purified water supply module 70 to the valve assembly 130.

One end of the first purified water supply valve 160 may be connected to the purified water supply module 70, and the other end of the first purified water supply valve 160 may be connected to the purified water supply valve 131 and the purified water discharge valve 133 of the valve assembly 130. In addition, purified water supplied via the first purified water supply valve 160 may be supplied to the carbonated water tank 100 or may be discharged via the dispenser module 90 depending on the open/close of the purified water supply valve 131 and the purified water discharge valve 133

The second purified water supply flow path 170 may connect the carbonated water tank 110 to the valve assembly 130, and may guide purified water passed through the valve assembly 130 to the carbonated water tank 110.

One end of the second purified water supply flow path 170 may be connected to the purified water supply valve 131 of the valve assembly 130 and the other end of the second purified water supply flow path 170 may be connected to the carbonated water tank 110.

The carbonated water discharge flow path 180 may connect the carbonated water tank 110 to the valve assembly 130, and may guide carbonated water of the carbonated water tank 110 to the valve assembly 130.

One end of the carbonated water discharge flow path 180 may be connected to the carbonated water tank 110 and the other end of the carbonated water discharge flow path 180 may be connected to the carbonated water discharge valve 135 of the valve assembly 130. In addition, carbonated water supplied via the carbonated water discharge flow path 180 may be discharged via the dispenser module 90 depending on the open/close of the carbonated water discharge valve 135.

On the carbonated water discharge flow path 180, a carbonated water regulator 181 to adjust the pressure of the carbonated water may be disposed. The carbonated water regulator 181 may reduce the pressure of the carbonated water discharged from the carbonated water tank 110 below at a certain pressure so that a certain amount of the carbonated water may be discharged via the dispenser module 90.

The integrated discharge flow path 190 may be integrally formed by a purified water discharge flow path 190a to discharge purified water and a carbonated water discharge flow path 190b to discharge carbonated water, and may guide carbonated water and purified water passed through the valve assembly 130 to the dispenser module 90.

The purified water discharge flow path 190a of the integrated discharge flow path 190 may be connected to the purified water discharge valve 133 of the valve assembly 130, and the carbonated water discharge flow path 190b of the integrated discharge flow path 190 may be connected to the carbonated water discharge valve 135 of the valve assembly 130.

On the integrated discharge flow path 190, a residual water discharge prevention valve 191 to open/close the integrated discharge flow path 190 may be provided so that remaining purified water or remaining carbonated water in the integrated discharge flow path 190 may be not discharged to the outside via the dispenser module 90 in a state where the purified water discharge valve 133 and the carbonated water discharge valve 135 are closed.

The residual water discharge prevention valve 191 may be disposed on an end portion of the integrated discharge flow path 190.

The integrated discharge flow path 190, which is integrally formed by the purified water discharge flow path 190a and the carbonated water discharge flow path 190b, is described, but is not limited thereto. The purified water discharge flow path 190a and the carbonated water discharge flow path 190b may be separately provided.

The module case 140 may include a back case 141 having an opened side, and a cover 143 coupled to the open side of the back case 141.

In a state where the cover 143 is coupled to the back case 141, the carbon dioxide gas cylinder 120, the carbonated water tank 110, and the valve assembly 130, all of which are placed in the module case 140, may be not exposed to the outside.

The cover 143 may be divided into a first cover 143a to open/close the upper accommodation spaces 141a and 141b, in which the carbonated water tank 110 and the valve assembly 130 are placed, respectively, and a second cover 143b to open/close the lower accommodation space 141c, in which the carbon dioxide gas cylinder 120 is placed. The first cover 143a and second cover 143b may be independently opened or closed.

Therefore, when the carbon dioxide gas cylinder 120 is replaced with a new one due to exhaustion of carbon dioxide gas thereof, the replacement may be achieved by separating only the second cover 143b without opening the first cover 143a. Thus, it may be possible to prevent cold air in the upper accommodation space 141a from being outwardly discharged during the replacement of the carbon dioxide gas cylinder 120 because the first cover 143a is maintained in a closed state.

In addition, a water leakage sensor 147 may be disposed on a bottom surface of the upper accommodation space 141a and 141b where the carbonated water tank 110 and the valve assembly 130 are placed.

When water leakage occurs in the carbonated water tank 110 or the valve assembly 130, leaked water may be remained in the bottom surface of the upper accommodation space 141a and 141b, and thus the water leakage sensor 147 may determine whether water leakage occurs or not by detecting remaining water on the bottom surface of the upper accommodation space 141a and 141b.

The water leakage sensor 147 may include a pair of electrode, and may determine that water leakage occurs when the current flows on a pair of electrode, or may determine that water leakage does not occur when the current does not flow on a pair of electrode.

The water leakage sensor 147 may be an optional component, and thus may be not an essential component for the operation of a refrigerator 1.

Figure 10:
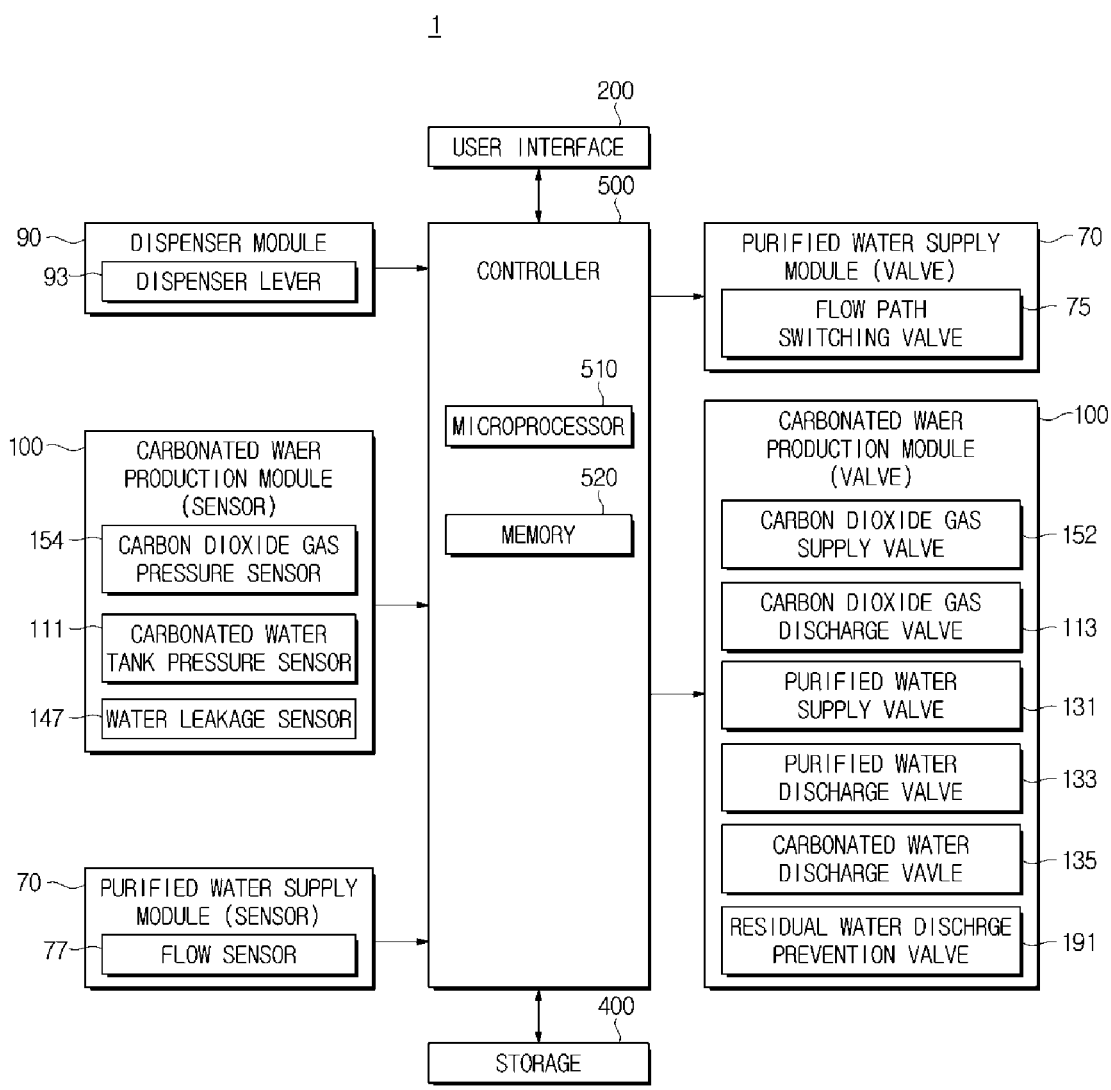
FIG. 10 is a control block diagram of a refrigerator according to one embodiment of the present disclosure.
Figure 11:
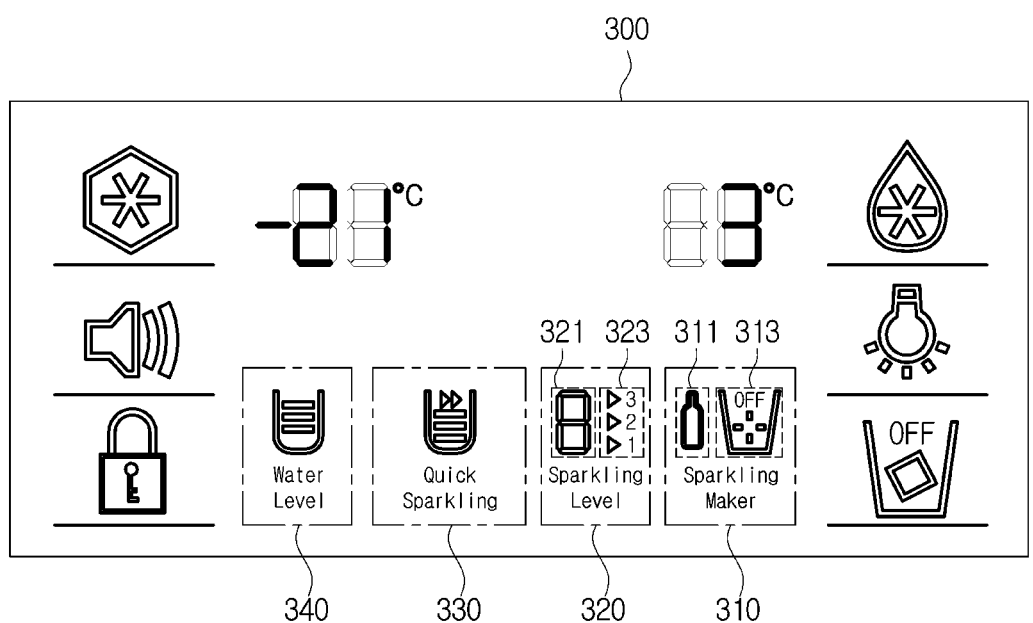
FIG. 11 is a view illustrating a user interface included in a refrigerator according to one embodiment of the present disclosure.

FIG. 10 is a control block diagram of a refrigerator according to one embodiment of the present disclosure, and FIG. 11 is a view illustrating a user interface included in a refrigerator according to one embodiment of the present disclosure.

Referring to FIGS. 10 and 11, a refrigerator 1 may include a user interface 300 to interact with a user along with the above-described cool air supplier (not shown), the flow sensor 77 included in the purified water supply module 70, a variety of sensors 154, 111, 112, and 147, and a variety of valves 152, 113, 131, 133, 135, and 191 included in the carbonated water production module 100, a storage 400 to store programs and data related to an operation of the refrigerator 1, and a controller 500 to control the operation of the refrigerator 1.

The user interface 300 may include a carbonated water producing activation unit 310 to receive an input of a command of producing carbonated water from the user and to display information related to producing carbonated water, a carbonated water concentration setting unit 320 to receive an input of a command of setting a concentration of carbonated water from the user and to display information related to setting a concentration of carbonated water, a carbonated water high-speed producing unit 330 to receive an input of producing carbonated water at high-speed from the user and to display information related to producing carbonated water at high-speed, and a carbonated water level displaying unit 340 to display a carbonated water level.

Each unit 310, 320, 330, 340 provided in the user interface 300 may include a touch switch to detect a touch or a pressure of the user and a display unit to display images to the user.

The touch switch may employ a push switch, a membrane switch to detect a pressure of the user or a touch pad to detect a touch of the user. In addition, the display unit may employ Liquid Crystal Display (LCD), Light Emitting Diode (LED), or Organic Light Emitting Diode (OLED).

Each unit 310, 320, 330, 340 provided in the user interface 300 may employ a touch screen. The touch screen may be integrally formed with the touch switch and the display unit, and may receive an input of a control command through a touch of the user and to display information of operation corresponding to a control command.

The carbonated water producing activation unit 310 may receive an input of a command of activating carbonated water production from the user. In addition, the carbonated water producing activation unit 310 may include a carbon dioxide gas low-pressure display unit 311 to warn that a pressure of carbon dioxide gas discharged from the carbon dioxide gas cylinder 120 is less than a predetermined pressure, and a carbonated water producing display unit 313 to display producing carbonated water at real time.

For example, when a pressure of carbon dioxide gas discharged from the carbon dioxide gas cylinder 120 is less than the predetermined pressure, the refrigerator 1 may warn low-pressure of carbon dioxide gas by displaying a carbon dioxide gas low-pressure image on the carbon dioxide gas low-pressure display unit 311. In addition, when producing carbonated water, the refrigerator 1 may display carbonated water production to the user by displaying a carbonated water producing image on the carbonated water producing display unit 313.

When the user touches or presses the carbonated water producing activation unit 310, the refrigerator 1 may start to produce carbonated water and may display the carbonated water producing image on the carbonated water producing display unit 313.

The carbonated water concentration setting unit 320 may receive an input of a command of setting a concentration of carbonated water from the user. The carbonated water concentration setting unit 320 may include a present concentration display unit 321 to display a concentration of carbonated water currently stored in the carbonated water tank 110 and a target concentration display unit 323 to display a set concentration of carbonated water which is set by the user.

For example, as illustrated in FIG. 11, the present concentration display unit 321 may display a present concentration of carbonated water stored in the carbonated water tank 110 in 7-segment displays, and the target concentration display unit 323 may display an image corresponding to a target concentration of carbonated water inputted by the user.

When the user touches or presses the carbonated water concentration setting unit 320, the refrigerator 1 may change a target concentration of carbonated water and a target concentration of carbonated water displayed on the target concentration display unit 323.

The carbonated water high-speed producing unit 330 may receive an input of a command of producing a carbonated water at high-speed from the user and may display an operation of a carbonated water high-speed production according to the command of producing a carbonated water at high-speed.

For example, when the user touches or presses the carbonated water high-speed producing unit 330, the refrigerator 1 may produce carbonated water at high-speed according to a predetermined method, and may display a producing carbonated water at high-speed image on the carbonated water high-speed producing unit 330.

The carbonated water level displaying unit 340 may display a water level of remaining carbonated water stored in the carbonated water tank 110.

For example, the refrigerator 1 may classify the water level of carbonated water stored in the carbonated water tank 110 by three levels between the highest level and the lowest level. The carbonated water level displaying unit 340 may display a carbonated water level displaying image according to the water level of carbonated water.

The storage 400 may store programs and data related to cooling operation of the refrigerator 1 and programs and data related to carbonated water production.

For example, the storage 400 may store a target temperature of the refrigerating compartment 20, a target temperature of the freezing compartment 30, etc. related to the cooling operation, and a carbonated water level, a present concentration of carbonated water, a target concentration of carbonated water, etc. related to carbonated water production.

The storage 400 may employ nonvolatile memory, such as, magnetic disc, solid state disk, etc. to store permanently programs and data to control the operation of the refrigerator 1.

The controller 500 may control overall operation of the refrigerator 1.

Particularly, the controller 500 may control the carbonated water production module 100 to produce carbonated water according to a target concentration, a carbonated water level, wherein the carbonated water is stored in the carbonated water tank 110, and to discharge carbonated water via the dispenser module 90 according to a command of discharging carbonated water.

The controller 500 may include a memory 520 to memory control programs and data read from the storage 400, and a microprocessor 510 to perform calculation according to control programs and data stored in the memory 520.

The memory 520 may include volatile memory, such as, D-RAM, S-RAM, but is not limited thereto. The memory 520 may include nonvolatile memory, such as, flash memory, and erasable programmable read only memory (EPROM).

The microprocessor 510 may perform calculation to control a variety of components included in the refrigerator 1 according to control programs and data stored in the memory 520

Particularly, the microprocessor 510 may process the detection result of the carbon dioxide gas pressure sensor 154, the carbonated water tank pressure sensor 112, and the flow sensor 77, and may perform calculation to control the carbon dioxide gas supply valve 152, the carbon dioxide gas discharge valve 113, the purified water supply valve 131, the purified water discharge valve 133, the carbonated water discharge valve 135 and the residual water discharge prevention valve 191.

Operations of a refrigerator 1 described in the following may be described as operations by control operations of the controller 500.

Hereinbefore the configuration of the refrigerator 1 is described.

Hereinafter the operation of the refrigerator 1, particularly producing carbonated water and discharging carbonated water, according to one embodiment of the present disclosure will be described.

Figure 12:
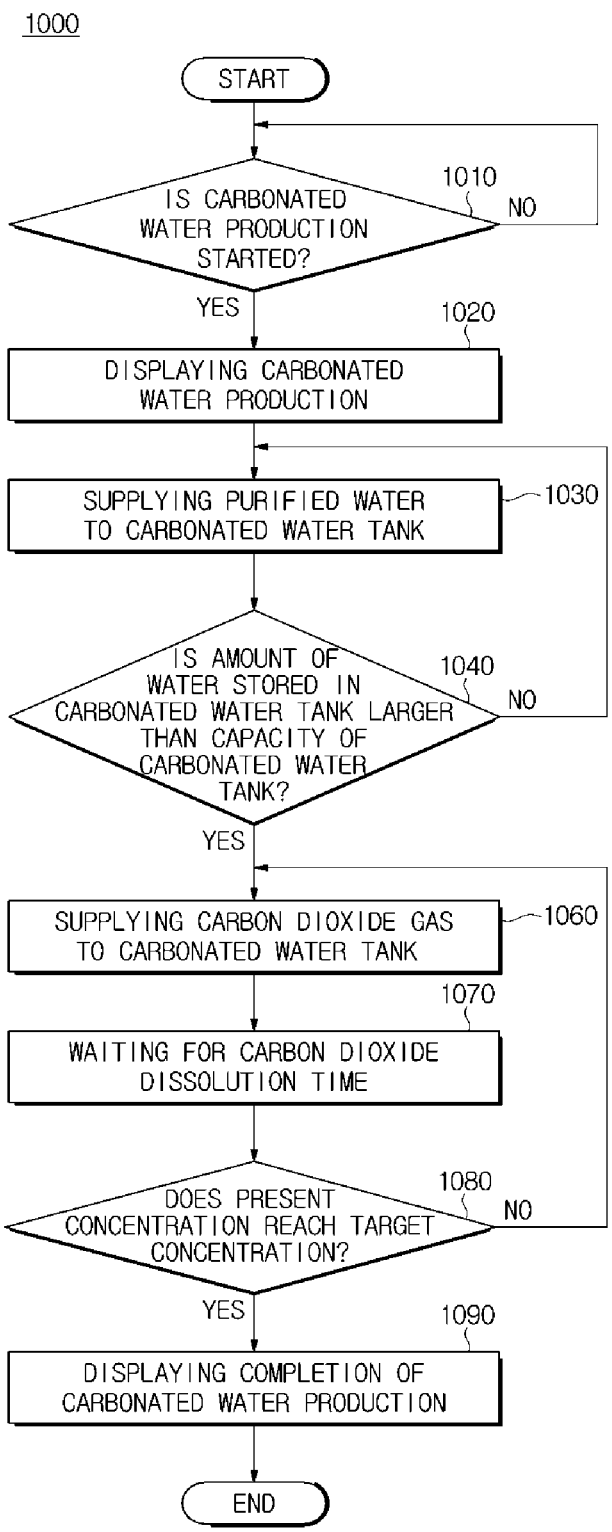
FIG. 12 is a view illustrating a method of producing carbonated water of a refrigerator according to one embodiment of the present disclosure.
Figure 13:
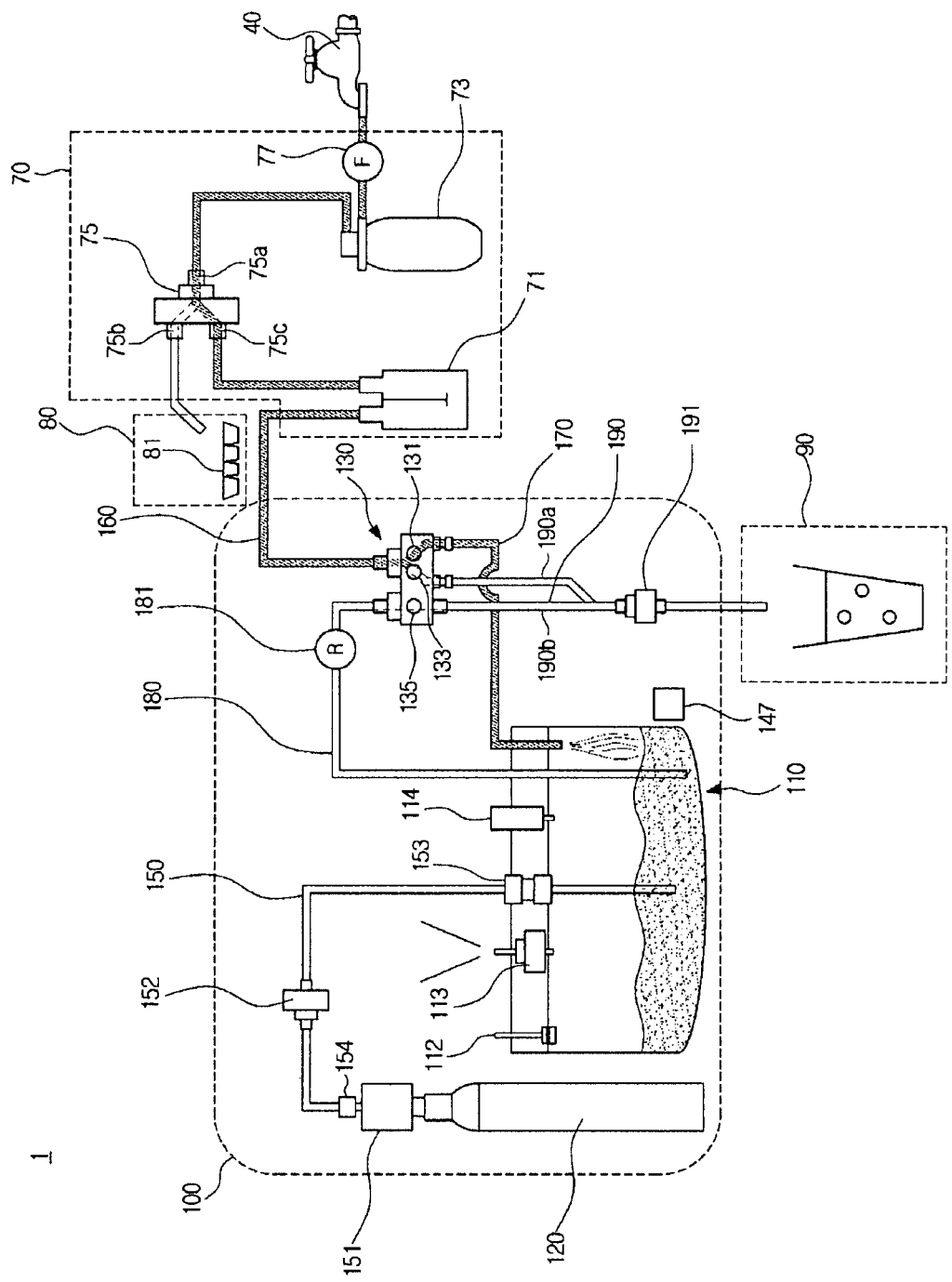
FIGS. 13 and 14 are views illustrating an example of producing carbonated water by a refrigerator according to the method illustrated in FIG. 12.
Figure 14:
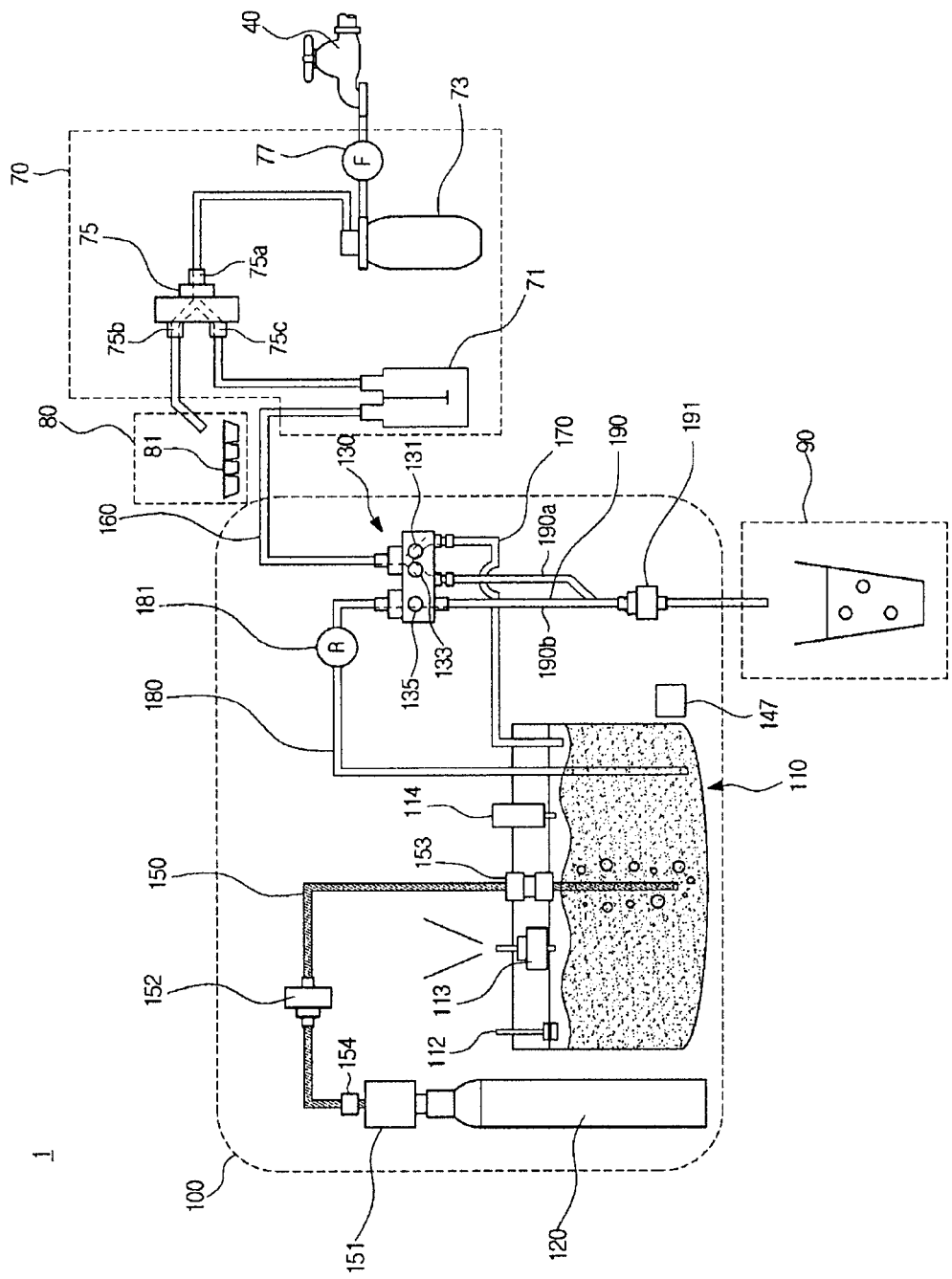

FIG. 12 is a view illustrating a method of producing carbonated water of a refrigerator according to one embodiment of the present disclosure and FIGS. 13 and 14 are views illustrating an example of producing carbonated water by a refrigerator according to the method illustrated in FIG. 12.

A method of producing carbonated water 1000 of a refrigerator 1 will be described with reference to FIGS. 12 to 14.

At first, the refrigerator 1 may determine whether conditions for starting to produce carbonated water are satisfied (operation 1010). The term of "conditions for starting to produce carbonated water" may represent conditions to allow the refrigerator 1 to start to produce carbonated water.

For example, when a carbonated water level of carbonated water stored in the carbonated water tank 110 is lower than the lowest level, the refrigerator 1 may automatically start to produce carbonated water. In addition, when the user inputs a command of carbonated water production activation through the user interface 300, the refrigerator 1 may start to produce carbonated water.

The refrigerator 1 may display carbonated water production on the user interface 300 (operation 1020). For example, the refrigerator 1 may display a carbonated water production image on the carbonated water producing display unit 313 provided in the carbonated water producing activation unit 310.

The refrigerator 1 may supply purified water to the carbonated water tank 110 (operation 1030).

The refrigerator 1 may open the purified water supply valve 131 to supply purified water to the carbonated water tank 110.

At this time, the refrigerator 1 may open the carbon dioxide gas discharge valve 152 to smoothly supply purified water to the carbonated water tank 110. Therefore, it may prevent a condition where purified water is not smoothly supplied to the carbonated water tank 110 when an internal pressure of the carbonated water tank 110 is higher than a supply pressure of purified water due to carbon dioxide gas in the carbonated water tank 110.

When the purified water supply valve 131 is opened, as illustrated in FIG. 13, purified water may be supplied from the water tank 71 to the carbonated water tank 110 along the purified water supply flow path 160, and the purified water supply flow path 170. In addition, water, which is the same amount as water supplied to the carbonated water tank 110, may be supplied to the purified water tank 71 from the outside water source 40 after passed through the flow sensor 77, the purification filter 73 and the flow path switching valve 75.

The refrigerator 1 may determine whether the amount of water stored in the carbonated water tank 110 is larger than the capacity of the carbonated water tank 110 (operation 1040).

The refrigerator 1 may estimate the amount of purified water supplied to the carbonated water tank 100 by using the flow sensor 77, and may estimate the amount of purified water stored in the carbonated water tank 110 by accumulating the amount of purified water supplied to the carbonated water tank 110.

Purified water may be supplied to the carbonated water tank 110 by the water pressure of the outside water source 40, and thus the amount of the purified water supplied to the carbonated water tank 110 may be the same as the amount of purified water supplied to the purified water supply module 70 from the outside water source 40. In addition, the refrigerator 1 may estimate the amount of purified water supplied to the purified water supply module 70 from the outside water source 40 by using the flow sensor 77.

As mentioned above, the refrigerator 1 may estimate the amount of purified water supplied to the carbonated water tank 110 by using the flow sensor 77.

The refrigerator 1 may estimate the amount of purified water stored in the carbonated water tank 110 by accumulating the amount of supplied purified water.

For example, when the refrigerator 1 produces carbonated water since all of carbonated water of the carbonated water tank 110 is finished, the refrigerator 1 may estimate the amount of purified water stored in the carbonated water tank 110 by accumulating the amount of supplied purified water by using the flow sensor 77.

For, another example, when the refrigerator 1 produces carbonated water by a command of producing carbonated water from a user, the refrigerator 1 estimate the amount of purified water stored in the carbonated water tank 110 by accumulating the amount of supplied purified water by using the flow sensor 77 in the remaining carbonated water in the carbonated water tank 110.

When the amount of stored purified water is not larger than the capacity of the carbonated water tank 110 (NO of operation 1040), the refrigerator 1 may continue to supply purified water to the carbonated water tank 110.

When the amount of stored purified water is larger than the capacity of the carbonated water tank 110 (YES of operation 1040), the refrigerator 1 may stop supplying purified water to the carbonated water tank 110, and may supply carbon dioxide gas to the carbonated water tank 110 (operation 1060).

To supply carbon dioxide gas to the carbonated water tank 110, the refrigerator 1 may close the purified water supply valve 131 and the carbon dioxide gas discharge valve 113, and then may open the carbon dioxide gas supply valve 152 for a predetermined carbon dioxide gas supply time.

As illustrated in FIG. 14, when the carbon dioxide gas supply valve 152 is opened, carbon dioxide gas may be supplied to the carbonated water tank 110 from the carbon dioxide gas cylinder 120 along the carbon dioxide gas supply flow path 150. In addition, carbon dioxide gas may be supplied to the carbonated water tank 110 after the pressure is reduced by the carbon dioxide gas regulator 151.

The refrigerator 1 may wait for a carbon dioxide dissolution time to dissolve carbon dioxide gas in purified water (operation 1070).

Despite of supplying carbon dioxide gas to the carbonated water tank 110 where purified water is filled, carbon dioxide gas may be not immediately dissolved. It may require from several minutes to several ten minutes to dissolve sufficient amount of carbon dioxide gas in purified water, but there may be differences according to the pressure of carbon dioxide gas, the concentration of carbon dioxide gas dissolved in purified water, and the likes.

When the carbon dioxide gas dissolution time is expired after supplying carbon dioxide gas, the refrigerator 1 may determine whether the concentration of carbonated water stored in the carbonated water tank 110 reaches a target concentration (operation 1080).

For example, to determine whether the concentration of carbonated water stored in the carbonated water tank 110 reaches a target concentration, the refrigerator 1 may determine whether the concentration of carbonated water reaches a target concentration based on a supply time of a carbon dioxide gas supplied to the carbonated water tank 110. This is because a certain pressure of carbon dioxide gas is supplied to the carbonated water tank by the carbon dioxide gas regulator 151.

For another example, the refrigerator 1 may determine whether the concentration of carbon dioxide gas reaches the target concentration based on the number of supplying time of carbon dioxide gas to the carbonated water tank 110.

The carbon dioxide gas pressure of the inside of the carbonated water tank 110 may be limited below a certain pressure, and thus the refrigerator 1 may repeatedly supply carbon dioxide gas and dissolve carbon dioxide gas to dissolve a large amount of carbon dioxide gas in purified water.

In other words, the refrigerator 1 may change the number of supplying time of carbon dioxide gas according to a target concentration inputted by the user.

The refrigerator 1 may supply carbon dioxide gas by only one time to produce carbonated water at a low concentration, may supply carbon dioxide gas by dividing two times to produce carbonated water at a middle concentration, and may supply carbon dioxide gas by dividing three times to produce carbonated water at a high concentration.

Depending on the number of supplying times, the carbon dioxide gas supply time and the carbon dioxide gas dissolution time may be variable.

When the first supply of carbon dioxide gas, carbon dioxide gas may be supplied for 6 seconds, and may be dissolved for 4 minutes, when the second supply of carbon dioxide gas, carbon dioxide gas may be supplied for 4 seconds, and may be dissolved for 8 minutes, and the third supply of carbon dioxide gas, carbon dioxide gas may be supplied for 5.5 seconds, and may be dissolved for 12 minutes.

The refrigerator 1 may change the amount of carbon dioxide gas dissolved in purified water by changing the number of supplying time of carbon dioxide gas, and the supply time of carbon dioxide gas.

Accordingly, to determine whether the carbonated water concentration reaches the target concentration, the refrigerator 1 may determine whether the number of supplying times of carbon dioxide gas supplied to the carbonated water tank 110 corresponds to the number of supplying time of carbon dioxide gas according to the target concentration.

When it is determined that the concentration of the carbonated water does not reach the target concentration (NO of operation 1080), the refrigerator 1 may repeatedly supply carbon dioxide gas and dissolve carbon dioxide gas to the carbonated water tank 110.

When it is determined that the concentration of the carbonated water reaches the target concentration (YES of operation 1080), the refrigerator 1 may display the completion of the carbonated water production on the user interface 300 (operation 1090).

For example, the refrigerator 1 may display a completion of the carbonated water production image on the carbonated water production displaying unit 313 included in the carbonated water producing activation unit 310.

As mentioned above, the refrigerator 1 may produce carbonated water at various concentrations by using the carbonated water production module 100.

Figure 15:
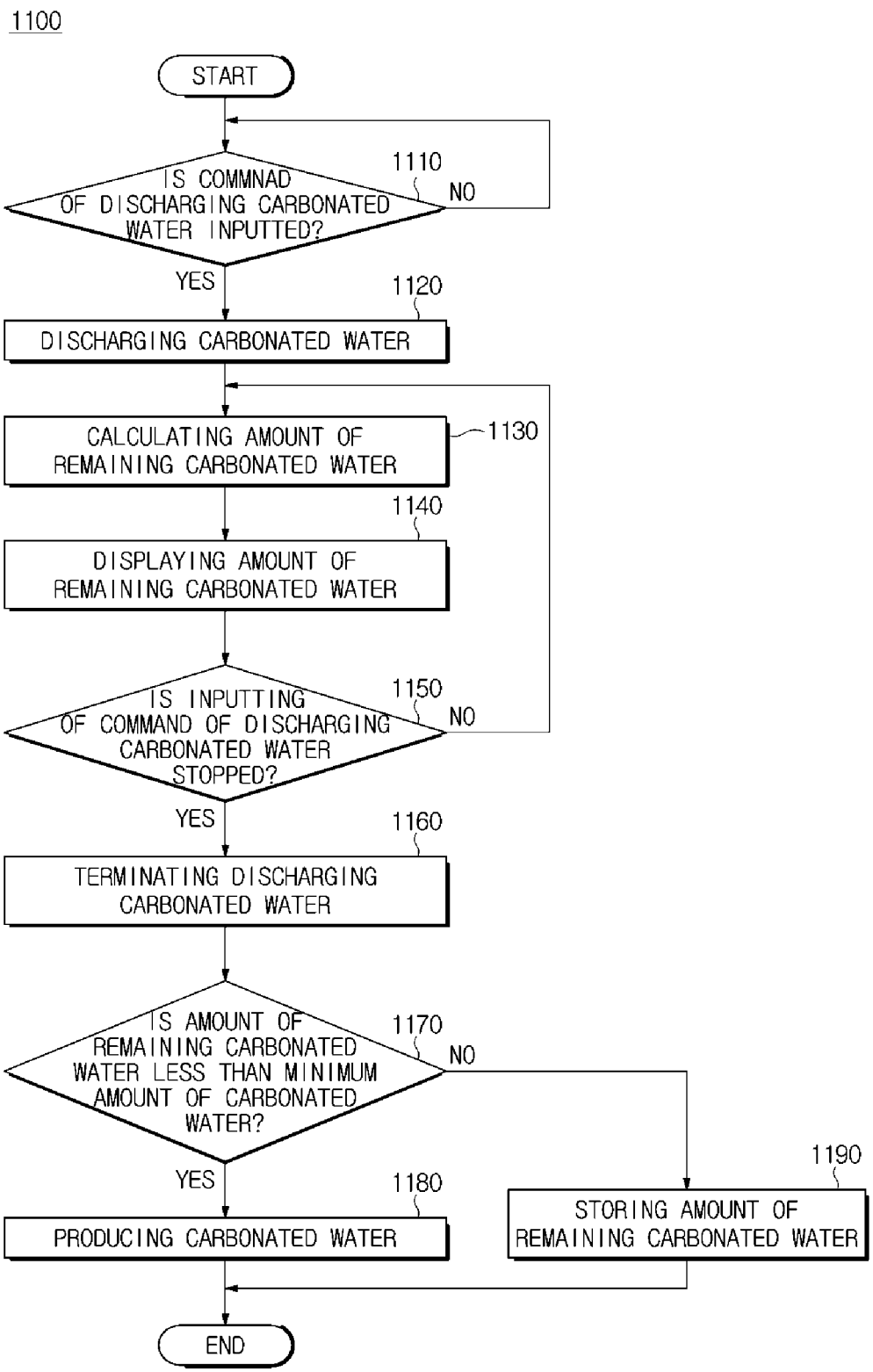
FIG. 15 is a view illustrating a method of discharging carbonated water of a refrigerator according to one embodiment of the present disclosure.
Figure 16:
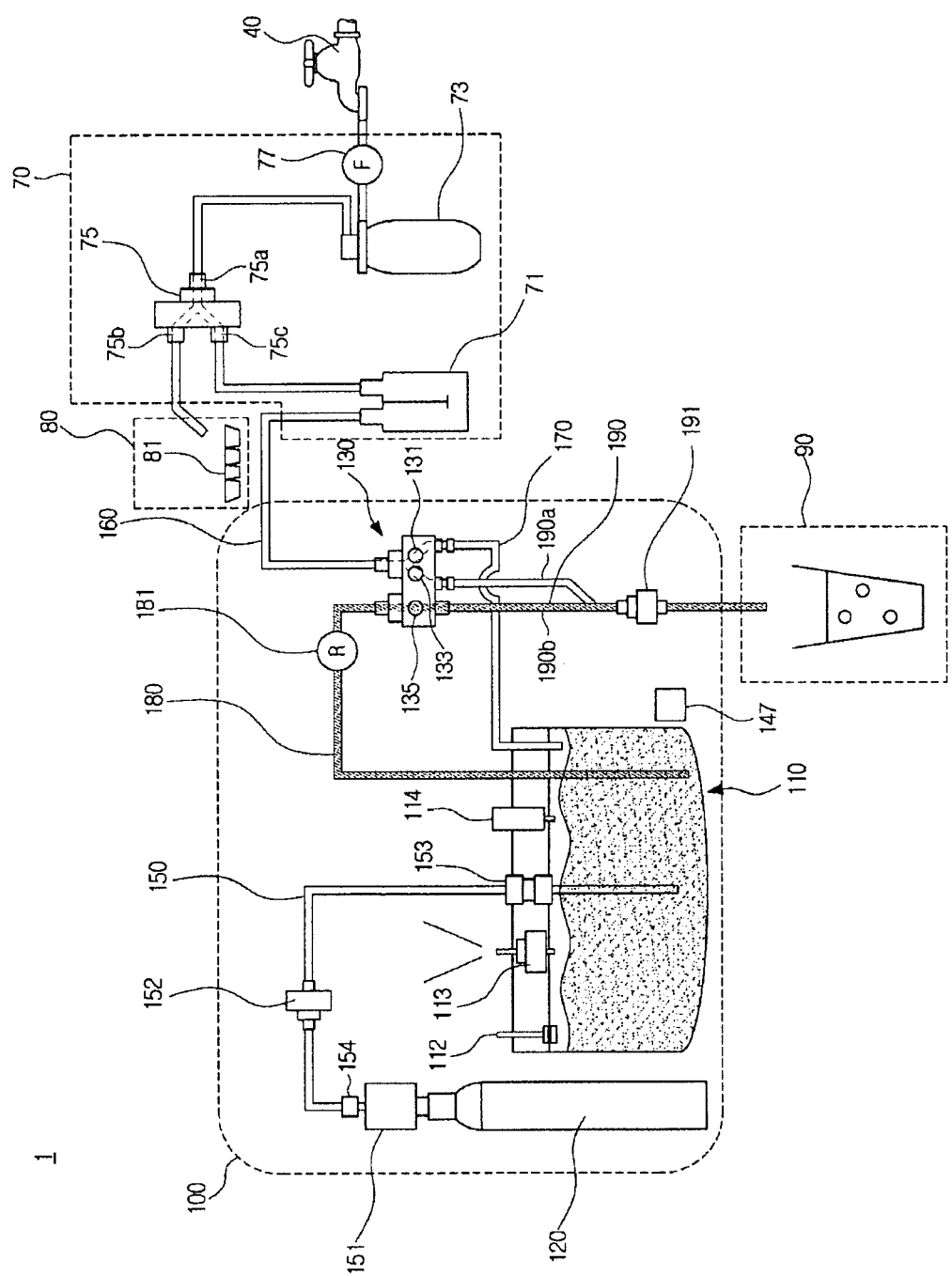
FIG. 16 is a view illustrating an example of discharging carbonated water by a refrigerator according to the method illustrated in FIG. 15.

FIG. 15 is a view illustrating a method of discharging carbonated water of a refrigerator according to one embodiment of the present disclosure and FIG. 16 is a view illustrating an example of discharging carbonated water by a refrigerator according to the method illustrated in FIG. 15.

A method of discharging carbonated water 1100 of a refrigerator 1 will be described with reference to FIGS. 15 and 16.

The refrigerator 1 may determine whether a command of discharging carbonated water is inputted (operation 1110).

When a user presses the dispenser lever 93 to discharge carbonated water, the refrigerator 1 may determine that a command of discharging carbonated water is inputted.

For example, when the third lever 93c included in the dispenser lever 93 is located in the fifth position P5, and the second lever 93b is moved from the third position P3 to the fourth position P4, the refrigerator 1 may determine that the command of discharging carbonated water is inputted.

When the command of discharging carbonated water is not inputted (NO of operation 1110), the refrigerator 1 may continue to perform an operation previously performed.

When the command of discharging carbonated water is inputted (YES of operation 1110), the refrigerator 1 may discharge carbonated water via the dispenser module 90 (operation 1120).

Particularly, the refrigerator 1 may open the residual water discharge prevention valve 191 and the carbonated water discharge valve 135 in sequence to discharge carbonated water. When the residual water discharge prevention valve 191 and the carbonated water discharge valve 135 are opened, carbonated water stored in the carbonated water tank 110 may be discharged along the carbonated water discharge flow path 180 and the integrated discharge flow path 190 by the pressure of carbon dioxide gas remained the carbonated water tank 110, as illustrated in FIG. 16.

That is, carbonated water may be discharged to the carbonated water tank 110 by the pressure difference between the internal pressure of the carbonated water tank 110 and the external pressure of the carbonated water tank 110.

The refrigerator 1 may estimate an amount of remaining carbonated water (operation 1130).

The amount of remaining carbonated water may represent an amount of carbonated water remaining in the carbonated water tank 110, and the amount of remaining carbonated water may be estimated based on the capacity of the carbonated water tank 110 and an accumulated amount of discharged carbonated water, that is, a sum of discharged carbonated water from when carbonated water is produced.

Carbonated water may be discharged at a certain pressure by the carbonated water regulator 181. Therefore, the refrigerator 1 may estimate an amount of remaining carbonated water stored in the carbonated water tank 110 based on a total open period of time of the carbonated water discharge valve 135, that is, a cumulative discharge time of carbonated water, and an output pressure of the carbonated water regulator 181.

For example, in a state where the capacity of the carbonated water tank 110 is the same as an amount of carbonated water discharged for 1 minute, the refrigerator 1 may determine that an amount of remaining carbonated water is more than ⅔ of the total capacity when a cumulative discharge time of carbonated water is less than 20 seconds. In addition, when a cumulative discharge time of carbonated water is from 20 to 40 seconds, the refrigerator 1 may determine that an amount of remaining carbonated water is from ⅓ to ⅔ of the total capacity, and when a cumulative discharge time of carbonated water is longer than 40 seconds, the refrigerator 1 may determine that an amount of remaining carbonated water is less than ⅓ of the total capacity.

The refrigerator 1 may display the amount of remaining carbonated water on the user interface 300 (operation 1140).

The refrigerator 1 may display the amount of remaining carbonated water, which is estimated at a step 1130, on the carbonated water level displaying unit 340. For example, when the amount of remaining carbonated water is more than ⅔ of the total capacity, the refrigerator 1 may display three water level displaying bars on the carbonated water level displaying unit 340, when the amount of remaining carbonated water is from ⅓ to ⅔ of the total capacity, the refrigerator 1 may display two water level displaying bars on the carbonated water level displaying unit 340, and when the amount of remaining carbonated water is less than ⅓ of the total capacity, the refrigerator 1 may display one water level displaying bar on the carbonated water level displaying unit 340.

The refrigerator 1 may determine whether inputting of the command of discharging carbonated water is stopped (operation 1150).

When the user releases the dispenser lever 93, the refrigerator 1 may determine that inputting of the command of discharging carbonated water is stopped.

For example, when the second lever 93b included in the dispenser module 90 is moved from the fourth position P4 to the third position P3, the refrigerator 1 may determine that inputting of the command of discharging carbonated water is stopped.

When the command of discharging carbonated water is continued (NO of operation 1150), the refrigerator 1 may repeat the estimation and the display of the amount of remaining carbonated water.

When the command of discharging carbonated water is stopped (YES of operation 1150), the refrigerator 1 may stop discharging carbonated water (operation 1160).

The refrigerator 1 may close the carbonated water discharge valve 135 and the residual water discharge prevention valve 191 in sequence to stop discharging carbonated water.

After discharging carbonated water is stopped, the refrigerator 1 may determine whether the amount of remaining carbonated water is less than the minimum amount of carbonated water (operation 1170).

The minimum amount of carbonated water may represent an amount of carbonated water corresponding to the lowest water level of carbonated water stored in the carbonated water tank 110. The minimum amount of carbonated water may be various according to the carbonated water tank 110, and may be set to "0".

When the amount of remaining carbonated water is less than the minimum amount of carbonated water (YES of operation 1170), the refrigerator 1 may start to produce carbonated water (operation 1180).

Particularly, the refrigerator 1 may produce carbonated water by supplying purified water and carbon dioxide gas to the carbonated water tank 110.

When the amount of remaining carbonated water is larger than the minimum amount of carbonated water (NO of operation 1170), the refrigerator 1 may store the amount of remaining carbonated water (operation 1190).

The refrigerator 1 may store the amount of remaining carbonated water in the memory 520 of the controller 500 or the storage 400 to estimate the amount of remaining carbonated water when carbonated water is discharged.

As mentioned above, the refrigerator 1 according to one embodiment may estimate the amount of discharged carbonated water based on the carbonated water discharge time, and may display the amount of remaining carbonated water stored in the carbonated water tank 110 based on the estimated amount of discharged carbonated water.

Figure 17:
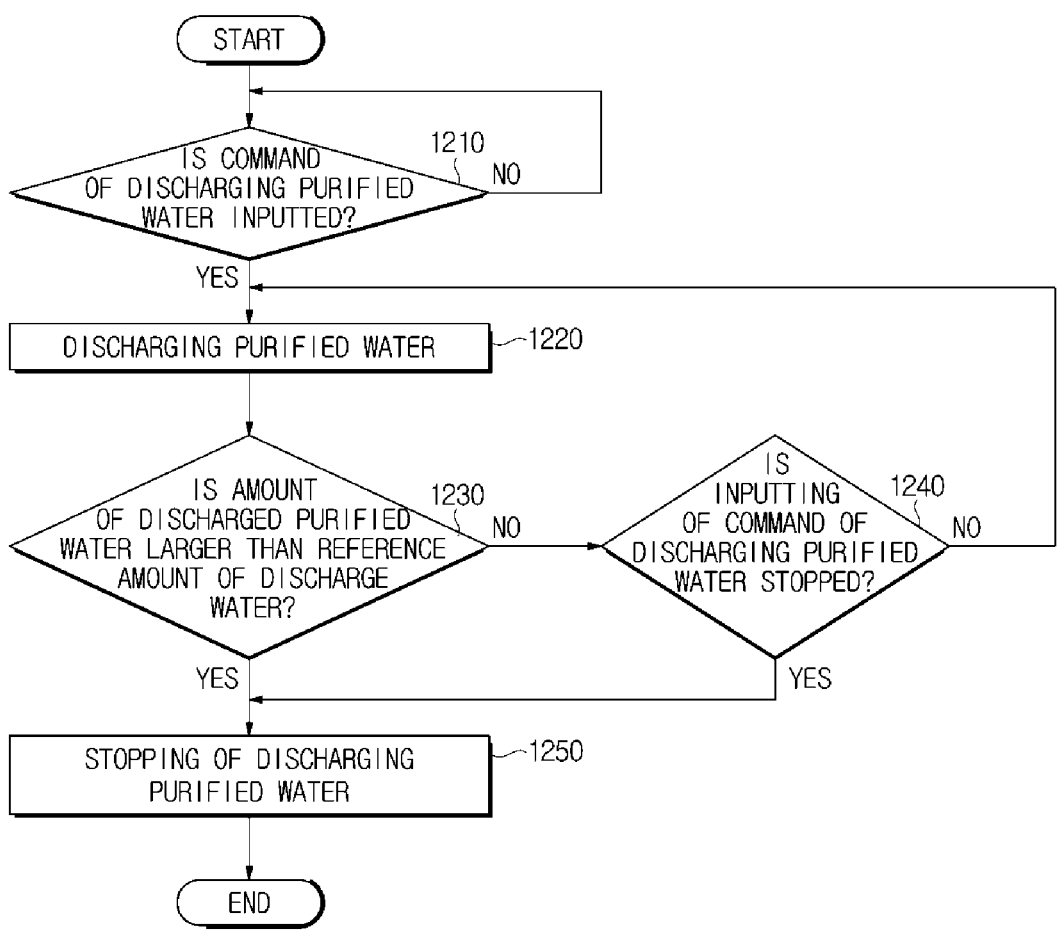
FIG. 17 is a view illustrating a method of discharging purified water of a refrigerator according to one embodiment of the present disclosure.
Figure 18:
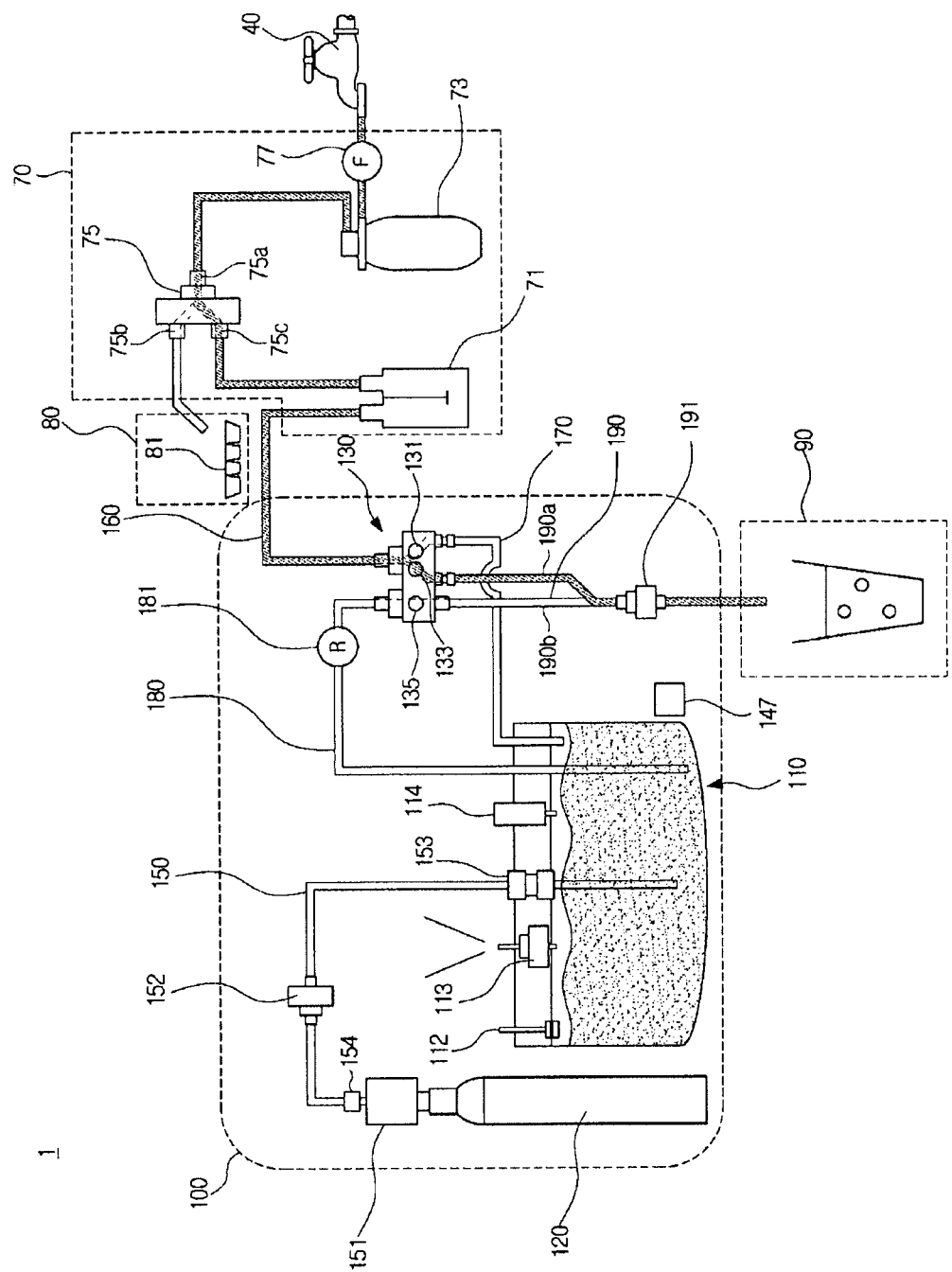
FIG. 18 is a view illustrating an example of discharging purified water by a refrigerator according to the method illustrated in FIG. 17.

FIG. 17 is a view illustrating a method of discharging purified water of a refrigerator according to one embodiment of the present disclosure and FIG. 18 is a view illustrating an example of discharging purified water by a refrigerator according to the method illustrated in FIG. 17.

A method of discharging purified water 1200 of a refrigerator 1 will be described with reference to FIGS. 17 and 18.

The refrigerator 1 may determine whether a command of discharging purified water is inputted (operation 1210).

When a user presses the dispenser lever 93 to discharge purified water, the refrigerator 1 may determine that a command of discharging purified water is inputted.

For example, when the first lever 93a included in the dispenser lever 93 is moved from the first position P1 to the second position P2, the refrigerator 1 may determine that a command of discharging purified water is inputted.

When the command of discharging purified water is not inputted (NO of operation 1210), the refrigerator 1 may continue to perform an operation previously performed.

When the command of discharging purified water is inputted (YES of operation 1210), the refrigerator 1 may discharge purified water via the dispenser module 90 (operation 1220).

Particularly, the refrigerator 1 may open the residual water discharge prevention valve 191 and the purified water discharge valve 133 in sequence to discharge purified water.

When the residual water discharge prevention valve 191 and the purified water discharge valve 133 are opened, purified water stored in the purified water tank 71 may be discharged along the first purified water supply flow path 160 and the integrated discharge flow path 190 to the outside by the water pressure of the external water source 40, as illustrated in FIG. 18.

The refrigerator 1 may determine whether the amount of discharged purified water is larger than the reference amount of discharged purified water (operation 1230).

The refrigerator 1 may detect the amount of discharge purified water.

Since purified water is discharged by the water pressure of the external water source 40, the amount of discharged purified water discharged by the dispenser module 90 may be the same as the amount of supplied purified water from the external water source 40 to the purified water supply module 70. In addition, the refrigerator 1 may estimate the amount of supplied purified water supplied from the external water source 40 to the purified water supply module 70 by using the flow sensor 77.

Therefore, the refrigerator 1 may detect the amount of discharged purified water by using the flow sensor 77.

The refrigerator 1 may compare the detected amount of discharged purified water with the reference amount of discharged purified water.

The reference amount of discharged water may be determined as the amount of water corresponding to a cup of water, but is not limited thereto. The reference amount of discharged water may be variously set according to the application. Also, the reference amount of discharged water may be set via the user interface 300 by a user.

When the amount of discharged purified water is less than the reference amount of discharged water (NO of operation 1230), the refrigerator 1 may determine whether inputting of the command of discharging purified water is stopped (operation 1240).

Particularly, when the user releases the dispenser lever 93, the refrigerator 1 may determine that inputting of the command of discharging purified water is stopped.

For example, when the first lever 93*a* included in the dispenser module 90 is moved from the second position P2 to the first position P1, the refrigerator 1 may determine that inputting of the command of discharging purified water is stopped.

When inputting of the command of discharging purified water is continued (YES of operation 1240), the refrigerator 1 may repeat the discharge of purified water, the estimation of the amount of discharged purified water, and the comparison of the amount of discharged purified water with the reference amount of discharged water.

When the amount of discharged purified water is larger than the reference amount of discharged water (YES of operation 1230) or inputting of the command of discharging purified water is stopped (YES of operation 1240), the refrigerator 1 may stop discharging purified water (operation 1250).

Particularly, the refrigerator 1 may close the purified water discharge valve 133 and the residual water discharge prevention valve 191 in sequence to stop discharging purified water.

As mentioned above, the refrigerator 1 according to one embodiment may detect the amount of discharged purified water during the discharge of purified water, and may prevent the amount of discharged purified water from being exceeded the reference amount of discharged water.

Figure 19:
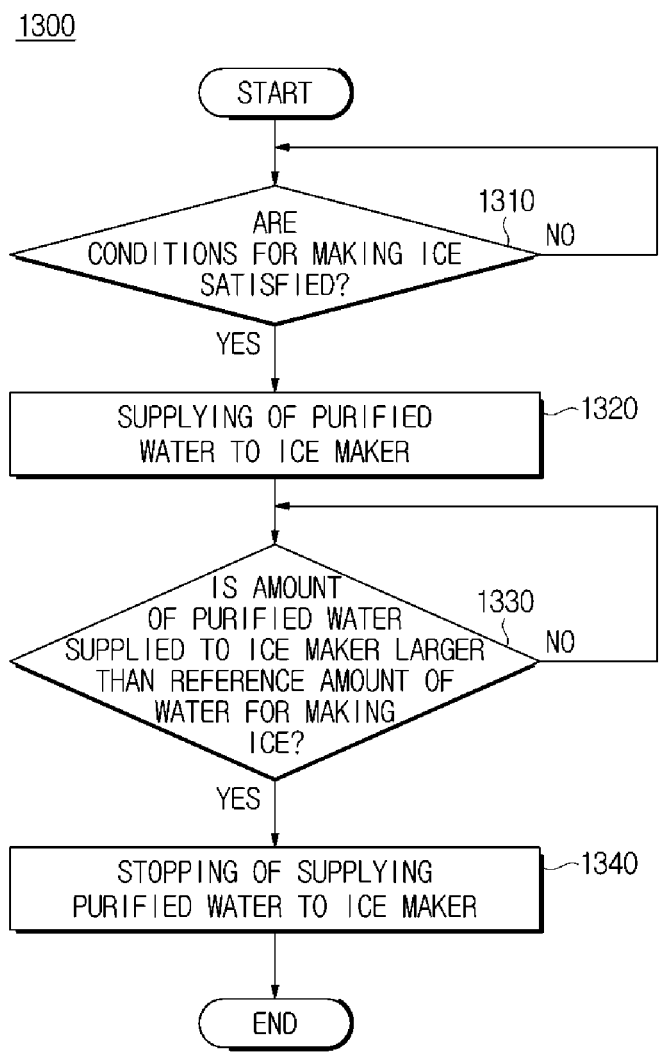
FIG. 19 is a view illustrating a method of supplying water for making ice by a refrigerator according to one embodiment of the present disclosure.
Figure 20:
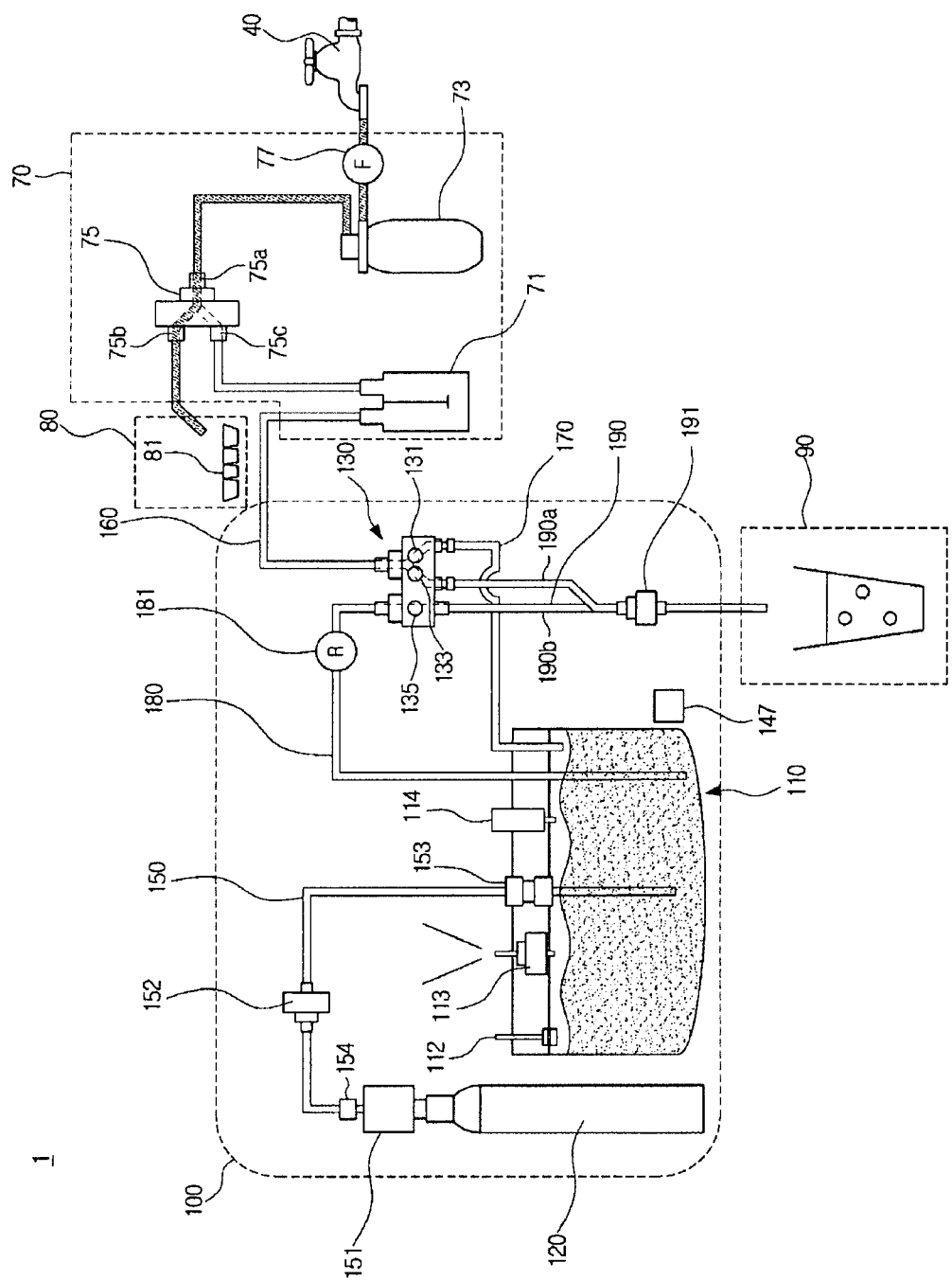
FIG. 20 is a view illustrating an example of supplying purified water to an ice maker in a refrigerator according to a method illustrated in FIG. 19.

FIG. 19 is a view illustrating a method of supplying water for making ice by a refrigerator according to one embodiment of the present disclosure and FIG. 20 is a view illustrating an example of supplying purified water to an ice maker in a refrigerator according to a method illustrated in FIG. 19.

A method of supplying water for making ice 1300 in which a refrigerator 1 supplies purified water to an ice maker 81 will be described with reference to FIGS. 19 and 20.

The refrigerator 1 may determine whether conditions for making ice are satisfied (operation 1310).

When ice is discharged from the ice making tray included in the ice maker 81 to the ice bucket, the refrigerator 1 may perform operations of ice making to produce new ice.

When the conditions for making ice are not satisfied (NO of operation 1310), the refrigerator 1 may continue to perform an operation previously performed.

When the conditions for making ice are satisfied (YES of operation 1310), the refrigerator 1 may supply purified water to the ice marker 81 (operation 1320).

The refrigerator 1 may switch a flow path of purified water to the ice maker 81 to supply purified water to the ice maker 81.

When the operation of making ice is not required, in order to supply purified water to the purified water tank 71, the refrigerator 1 may open a flow path on the side of the purified water tank 71 and may control the flow path switching valve 75 to close a flow path on the side of the ice maker 81.

Meanwhile, when the operation of making ice is required, in order to supply purified water to the ice maker 81, the refrigerator 1 may close a flow path on the side of the purified water tank 71 and may control the flow path switching valve 75 to open a flow path on the side of the ice maker 81.

When the flow path on the side of the ice maker 81 is opened, purified water purified by the purification filter 73 may be supplied to the ice maker 81 via the flow path switching valve 175, as illustrated in FIG. 20.

The refrigerator 1 may determine whether the amount of purified water supplied to the ice maker 81 is larger than the reference amount of water for making ice (operation 1330).

The refrigerator 1 may detect the amount of purified water supplied to the ice maker 81 by the flow sensor 77.

When the flow path on the side of the ice maker 81 is opened, purified water may be supplied to the ice maker 81 from the external water source 40 via the flow sensor 77, the purification filter 73, and the flow path switching valve 75, and the refrigerator 1 may estimate the amount of purified water supplied from the external water source 40 to the purified supply module 70 by the flow sensor 77.

Therefore, the refrigerator 1 may detect the amount of purified water supplied to the ice maker 81 by using the flow sensor 77.

In addition, the refrigerator 1 may compare the detected amount of supplied purified water with the reference amount of supplied water for making ice. Here, the reference amount of supplied water for making ice may determine the amount of water storable in the ice making tray.

When the amount of supplied purified water for making ice is less than the reference amount of supplied water for making ice (NO of operation 1330), the refrigerator 1 may continue to supply purified water to the ice maker 81.

When the amount of supplied purified water for making ice is larger than the reference amount of supplied water for making ice (YES of operation 1330), the refrigerator 1 may stop supplying purified water to the ice maker 81 (operation 1340).

To stop supplying purified water to the ice maker 81, the refrigerator 1 may switch a flow path of purified water to the purified water tank 71. Particularly, the refrigerator 1 may open a flow path on the side of the purified water tank 71 and may control the flow path switching valve 175 to close a flow path on the side of the ice maker 81.

As mentioned above, the refrigerator 1 according to one embodiment may detect the amount of supplied purified water for making ice and may prevent the amount of supplied purified water from being exceeded the reference amount of supplied water for making ice.

Figure 21:
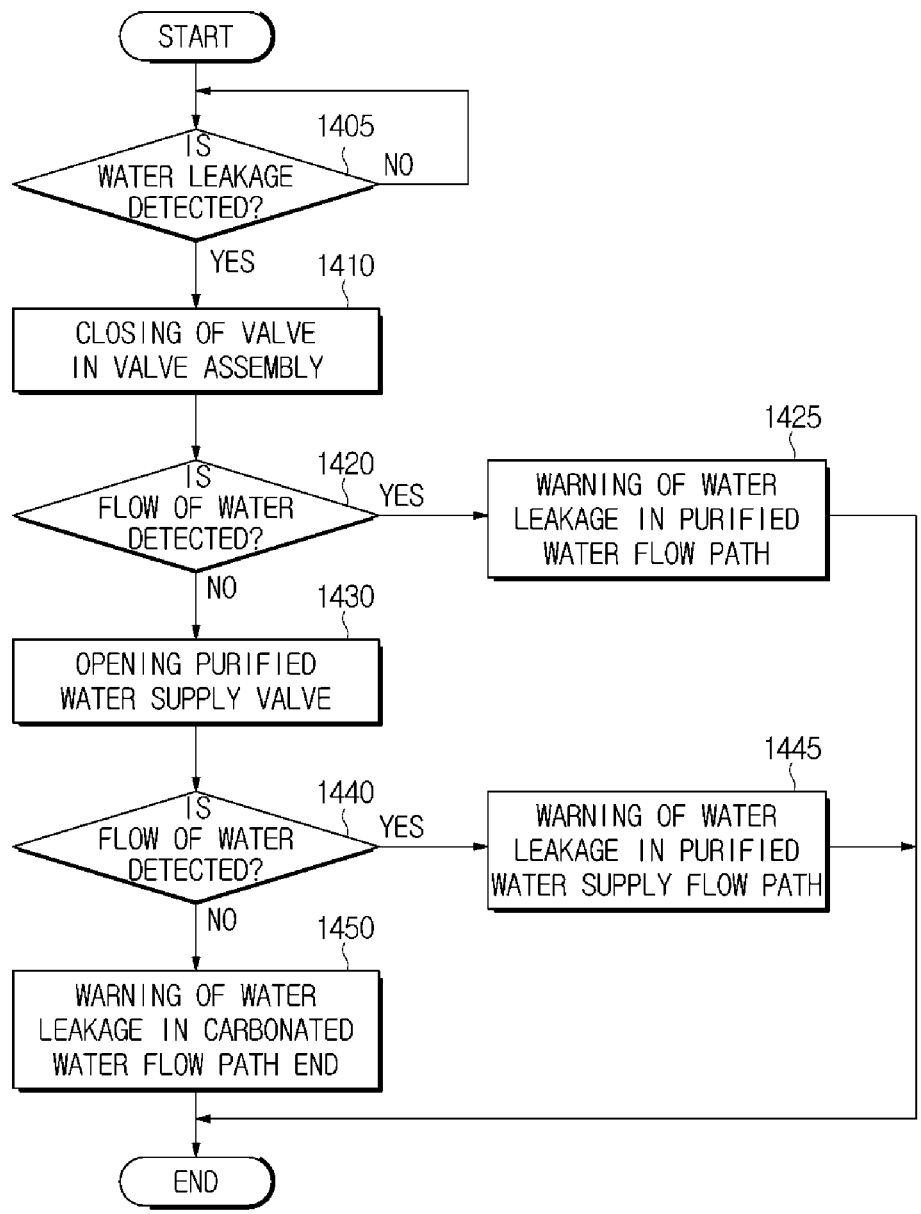
FIG. 21 is a view illustrating a method of determining water leakage of a refrigerator according to one embodiment of the present disclosure.
Figure 22:
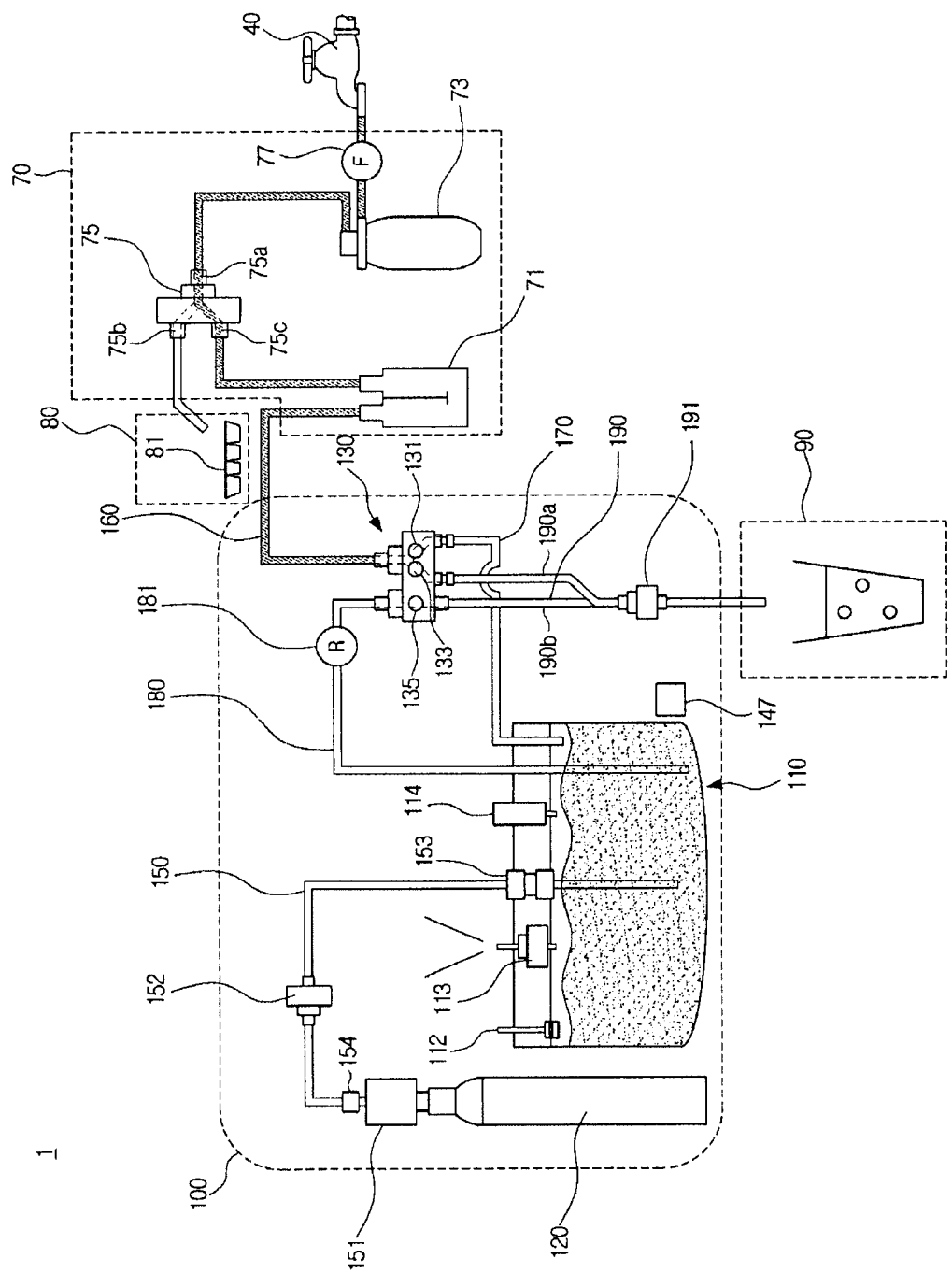
FIGS. 22 and 23 are views illustrating an example of detecting water leakage in a purified water supply module or a carbonated water production module by a refrigerator according to a method illustrated in FIG. 21.
Figure 23:
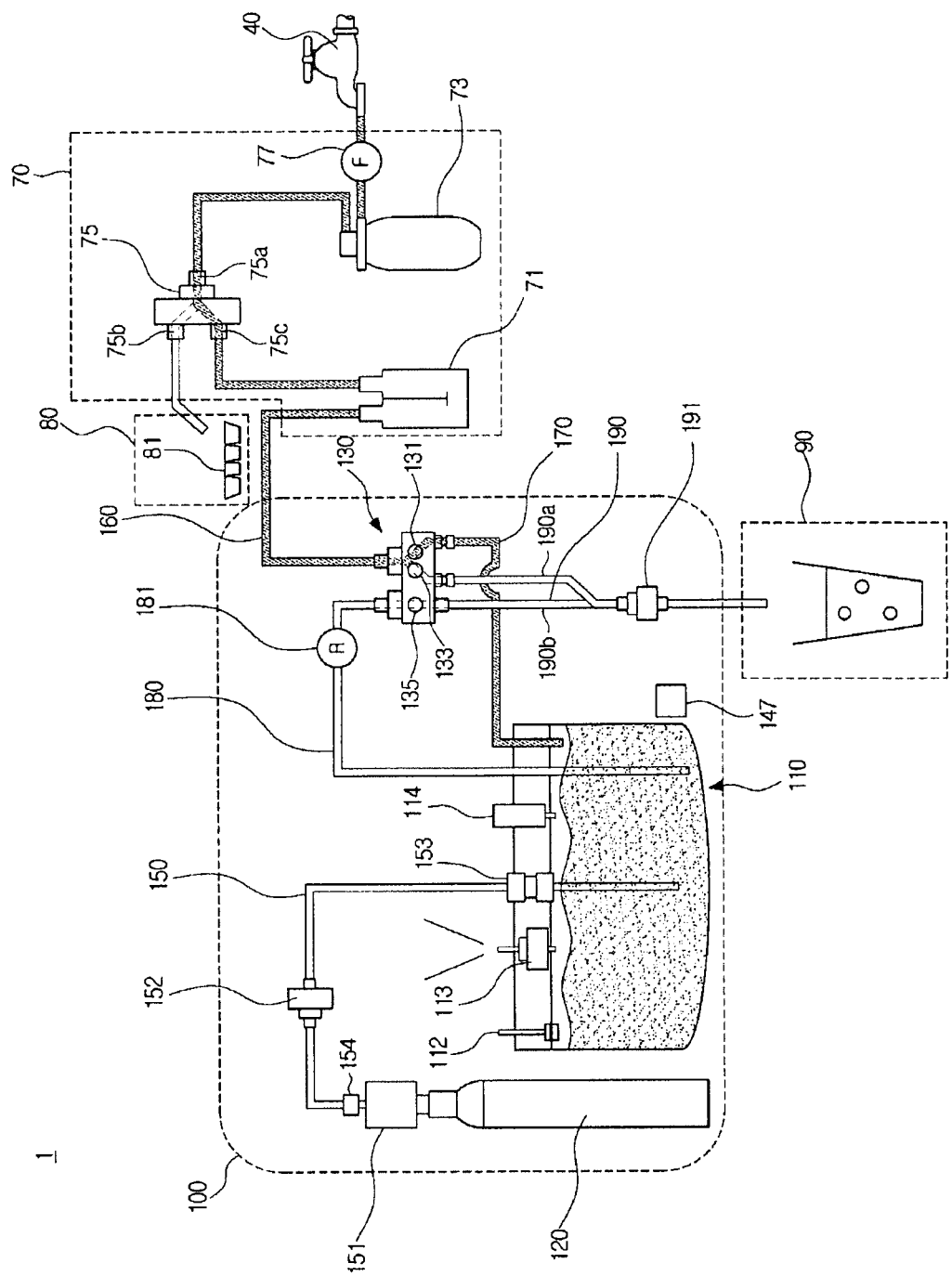

FIG. 21 is a view illustrating a method of determining water leakage of a refrigerator according to one embodiment of the present disclosure and FIGS. 22 and 23 are views illustrating an example of detecting water leakage in a purified water supply module or a carbonated water production module by a refrigerator according to a method illustrated in FIG. 21.

A method of determining water leakage 1400 in which the refrigerator 1 detects the location of water leakage in the purified water supply module 70 and the carbonated water production module 100 will be described with reference to FIGS. 21 to 23.

The refrigerator 1 may determine whether water leakage is detected in the carbonated water production module 100 (operation 1405).

The refrigerator 1 may determine whether water leakage occurs by using various manners.

For example, the refrigerator 1 may detect water leakage in the carbonated water production module 100 by using the water leakage sensor 147 included in the carbonated water production module 100. Particularly, when the current flows on a pair of electrodes included in the water leakage sensor 147, the refrigerator 1 may determine that water leakage occurs in the carbonated water production module 100.

For another example, when the flow of water is detected by the flow sensor 77 in a state where the production of the carbonated water or the discharge of the purified water is not performed, the refrigerator 1 may determine that water leakage occurs in the carbonated water production module 100.

When water leakage in the carbonated water production module 100 is determined by the flow sensor 77, the refrigerator 1 may not include the water leakage sensor 147.

When the water leakage is not detected (NO of operation 1405), the refrigerator 1 may continue to perform an operation previously performed.

When the water leakage is detected (YES of operation 1405), the refrigerator 1 may close a plurality of valves 131, 133, and 135 included in the valve assembly 130 (operation 1410).

The refrigerator 1 may close the purified water supply valve 131, the purified water discharge valve 133, and the carbonated water discharge valve 135 all of which are included in the valve assembly 130 to determine whether water leakage occurs in the first purified water supply flow path 160.

When the purified water supply valve 131, the purified water discharge valve 133, and the carbonated water discharge valve 135 are closed, purified water may fill the flow path to an upper portion of the purified water supply valve 131, as illustrated in FIG. 22.

The refrigerator 1 may detect the flow of water by using the flow sensor 77 (operation 1420).

When the purified water supply valve 131, the purified water discharge valve 133, and the carbonated water discharge valve 135 are closed, purified water may supply to an upper portion of the purified water supply valve 131, but may not flow.

When the flow of water is detected (YES of operation 1420), the refrigerator 1 may warn the water leakage of the first purified water supply flow path 160 or the valve assembly 130 (operation 1425). Particularly, the refrigerator 1 may warn the water leakage of the first purified water supply flow path 160 via the user interface 300.

When the purified water supply valve 131, the purified water discharge valve 133, and the carbonated water discharge valve 135 are closed, purified water may be supplied to the first purified water supply flow path 160 of the carbonated water production module 100, as illustrated in FIG. 22.

Therefore, when the flow sensor 77 detects the flow of water despite of closing the purified water supply valve 131, the purified water discharge valve 133, and the carbonated water discharge valve 135, the refrigerator 1 may determine that water leakage occurs in the first purified water supply flow path 160 or at a coupling part between the first purified water supply flow path 160 and the valve assembly 130.

When the flow of water is not detected (NO of operation 1420), the refrigerator 1 may open the purified water supply valve 131 (operation 1430).

when the flow of water is not detected in a state where the purified water supply valve 131, the purified water discharge valve 133, and the carbonated water discharge valve 135 are closed, the refrigerator 1 may determine that water leakage does not occur in the first purified water supply flow path 160 or in the purified water supply valve 131.

Therefore, the refrigerator 1 may open the purified water supply valve 131 to determine whether water leakage occurs in a lower portion of the purified water supply valve 130.

When the purified water supply valve 131 is opened, purified water may fill to an upper portion of the carbonated water discharge valve 135, as illustrated in FIG. 23.

The refrigerator 1 may detect the flow of water by using the flow sensor 77 (operation 1440).

When the purified water discharge valve 133 and the carbonated water discharge valve 135 are closed, purified water may be supplied to only the carbonated water tank 110, but may not flow. This is because purified water is not supplied to the carbonated water tank 110 by carbon dioxide gas inside the carbonated water tank 110 for the discharge of the carbonated water.

When the flow of water is detected (YES of operation 1440), the refrigerator 1 may warn the water leakage of the second purified water supply flow path 170 or the valve assembly 130 (operation 1445). Particularly, the refrigerator 1 may warn the water leakage of the second purified water supply flow path 170 via the user interface 300.

When the purified water discharge valve 133 and the carbonated water discharge valve 135 are closed, purified water may be supplied to the second purified water supply flow path 170 of the carbonated water production module 100, as illustrated in FIG. 22.

Therefore, when the flow sensor 77 detects the flow of water despite of closing the purified water discharge valve 133, and the carbonated water discharge valve 135, the refrigerator 1 may determine that water leakage occurs in the first purified water supply flow path 160, in a coupling part between the first purified water supply flow path 160 and the valve assembly 130 or in a coupling part between the first purified water supply flow path 160 and the carbonated water tank 110.

When the flow of water is not detected (NO of operation 1440), the refrigerator 1 may warn the water leakage of the carbonated water flow path (operation 1450).

As mentioned above, when it is determined that water leakage does not occur in the first purified water supply flow path 160 and the second purified water supply flow path 170, the refrigerator 1 may determine that water leakage occurs in the carbonated water discharge flow path 180, in a coupling part between the carbonated water discharge flow path 180 and the carbonated water tank 110, or in a coupling part between the carbonated water discharge flow path 180 and the carbonated water discharge valve 135. This is because water leakage may occur in the carbonated water discharge valve 180 without supplying water from the external water source 40 since carbonated water is stored in the carbonated water tank 110.

Therefore, the refrigerator 1 may warn the water leakage in the carbonated water discharge valve 180 via the user interface 300.

As mentioned above, when it is determined that water leakage occurs in the carbonated water production module 100, the refrigerator 1 may determine a location where water leakage occurs based on opening/closing the valves 131, 133, and 135 included in the valve assembly 130 and the result of detection of the flow of water by the flow sensor 77.

Figure 24:
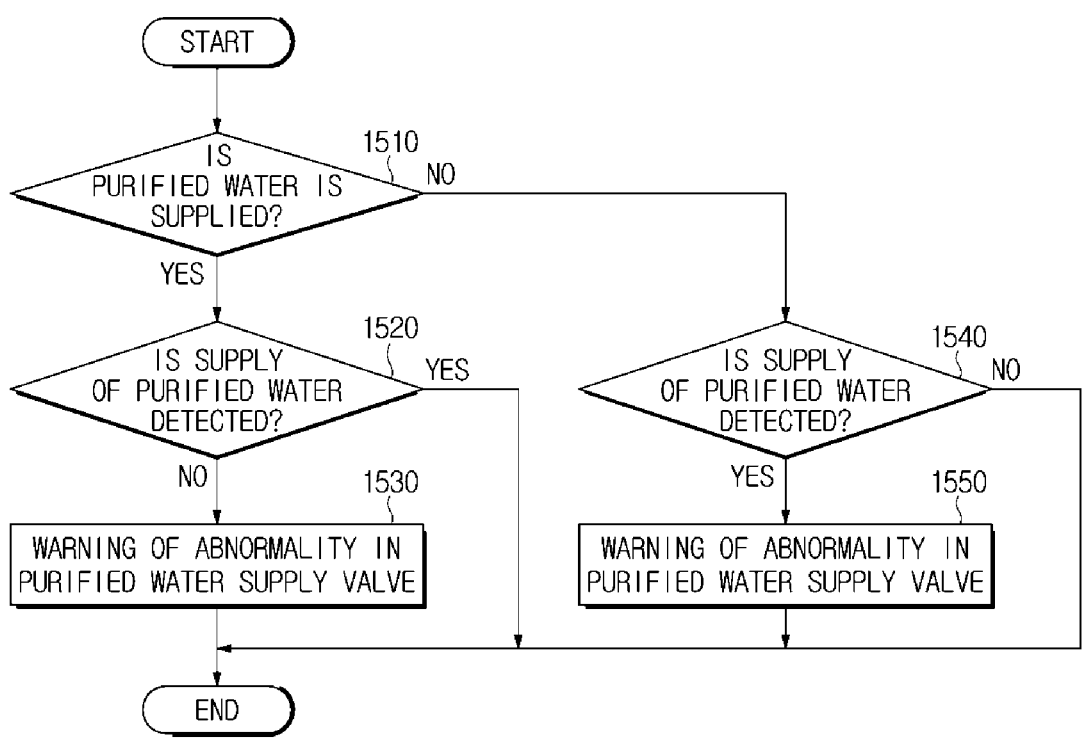
FIG. 24 is a view illustrating a method of determining an abnormality in a purified water supply valve by a refrigerator according to one embodiment of the present disclosure.

FIG. 24 is a view illustrating a method of determining an abnormality in a purified water supply valve of a refrigerator according to one embodiment of the present disclosure.

A method of determining an abnormality in the purified water supply valve 1500 in which the refrigerator 1 determines an abnormality in the purified water supply valve 131 will be described with reference to FIG. 24.

The refrigerator 1 may determine whether purified water is supplied to the carbonated water tank 110 (operation 1510).

The refrigerator 1 may determine whether purified water is supplied to the carbonated water tank 110 based on a control signal provided to the purified water supply valve 131.

Particularly, when an open valve signal is provided to the purified water supply valve 131, the refrigerator 1 may determine that purified water is supplied to the carbonated water tank 110, and when a close valve signal is provided to the purified water supply valve 131, the refrigerator 1 may determine that purified water is not supplied to the carbonated water tank 110.

When it is determined that purified water is supplied to the carbonated water tank 110 (YES of operation 1510), the refrigerator 1 may detect the supply of the purified water by using the flow sensor 77 (operation 1520).

When the purified water supply valve 131 is opened, the flow sensor 77 may detect the supply of the purified water since purified water is supplied to the carbonated water tank 110 by the water pressure of the external water source 40.

When the supply of the purified water is detected (YES of operation 1520), the refrigerator 1 may determine that there is no abnormality in the operation of the purified water supply valve 131.

Conversely, when the supply of the purified water is not detected (NO of operation 1520), the refrigerator 1 may warn the abnormality of the purified water supply valve (operation 1530).

What the flow sensor 77 does not detect the supply of the purified water may represent that the purified water supply valve 131 is not opened. That is, since the purified water supply valve 131 is not opened although the open valve signal is provided to the purified water supply valve 131, the refrigerator 1 may determine that there is an abnormality in the purified water supply valve 131.

The refrigerator 1 may warn the abnormality in the purified water supply valve 131 to a user via the user interface 300.

When it is determined that purified water is not supplied to the carbonated water tank 110 (NO of operation 1510), the refrigerator 1 may detect the supply of the purified water by using the flow sensor 77 (operation 1540).

When the purified water supply valve 131 is normally operated in a state where the close valve signal is provided to the purified water supply valve 131, the supply of the purified water may be not detected.

When the supply of the purified water is not detected (NO of operation 1540), the refrigerator 1 may determine that there is no abnormality in the operation of the purified water supply valve 131.

When the supply of the purified water is detected (YES of operation 1540), the refrigerator 1 may warn the abnormality of the purified water supply valve 131 (operation 1550).

What the flow sensor 77 detects the supply of the purified water may represent that the purified water supply valve 131 is not closed. That is, since the purified water supply valve 131 is not closed although the close valve signal is provided to the purified water supply valve 131, the refrigerator 1 may determine that there is an abnormality in the purified water supply valve 131.

The refrigerator 1 may warn the abnormality in the purified water supply valve 131 to a user via the user interface 300.

As mentioned above, the refrigerator 1 may determine the presence of the abnormality in the purified water supply valve 131 by using the flow sensor 77.

Figure 25:
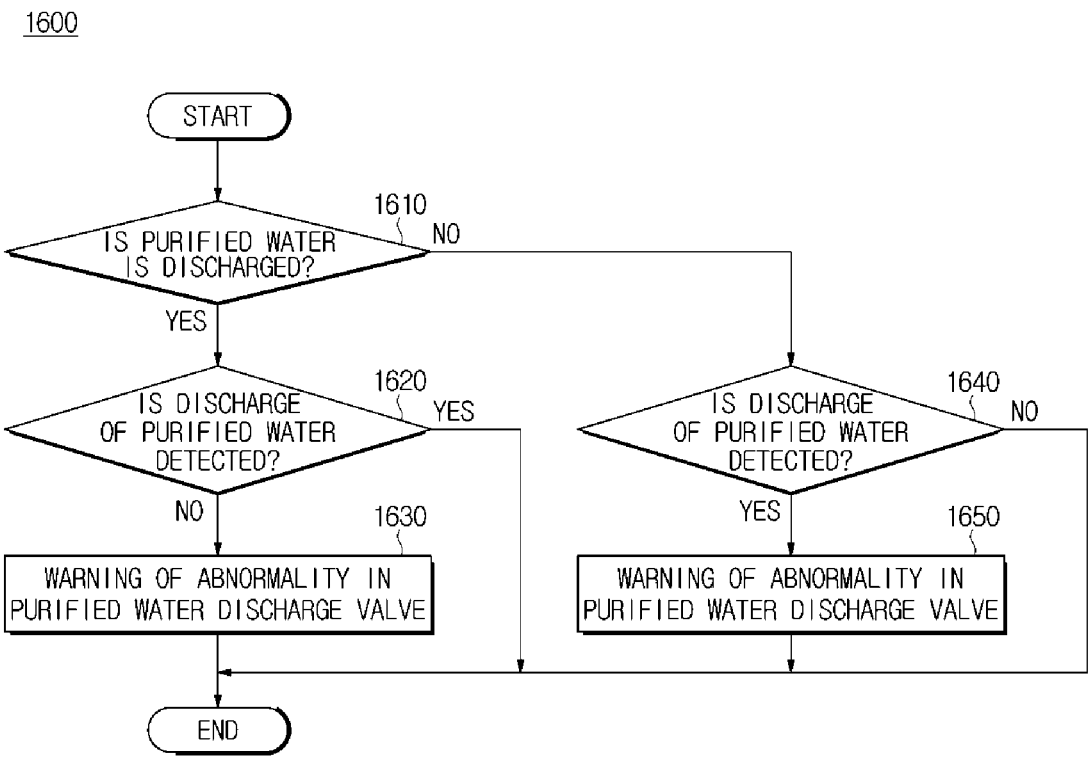
FIG. 25 is a view illustrating a method of determining an abnormality in a purified water discharge valve by a refrigerator according to one embodiment of the present disclosure.

FIG. 25 is a view illustrating a method of determining an abnormality in a purified water discharge valve of a refrigerator according to one embodiment of the present disclosure.

A method of determining an abnormality in the purified water discharge valve 1600 in which the refrigerator 1 determines an abnormality in the purified water discharge valve 133 will be described with reference to FIG. 25.

The refrigerator 1 may determine whether purified water is discharged (operation 1610).

The refrigerator 1 may determine whether purified water is discharged based on a control signal provided to the purified water discharge valve 133.

Particularly, when an open valve signal is provided to the purified water discharge valve 133, the refrigerator 1 may determine that purified water is discharged, and when a close valve signal is provided to the purified water discharge valve 133, the refrigerator 1 may determine that purified water is not discharged.

When it is determined that purified water is discharged (YES of operation 1610), the refrigerator 1 may detect the discharge of the purified water by using the flow sensor 77 (operation 1620).

When the purified water discharge valve 133 is opened, the flow sensor 77 may detect the discharge of the purified water since purified water is discharged via the dispenser module 90 by the water pressure of the external water source 40.

When the discharge of the purified water is detected (YES of operation 1620), the refrigerator 1 may determine that there is no abnormality in the operation of the purified water discharge valve 133.

Conversely, the discharge of the purified water is not detected (NO of operation 1620), the refrigerator 1 may warn the abnormality in the purified water discharge valve 133 (operation 1630).

What the flow sensor 77 does not detect the discharge of the purified water may represent that the purified water discharge valve 133 is not opened. That is, since the purified water discharge valve 133 is not opened although the open valve signal is provided to the purified water discharge valve 133, the refrigerator 1 may determine that there is an abnormality in the purified water discharge valve 133.

The refrigerator 1 may warn the abnormality in the purified water discharge valve 133 to a user via the user interface 300.

When it is determined that purified water is not discharged (NO of operation 1610), the refrigerator 1 may detect the discharge of the purified water by using the flow sensor 77 (operation 1640).

When the purified water supply valve 131 is normally operated in a state where the close valve signal is provided to the purified water discharge valve 133, the discharge of the purified water may be not detected.

When the discharge of the purified water is not detected (NO of operation 1640), the refrigerator 1 may determine that there is no abnormality in the operation of the purified water discharge valve 133.

When the discharge of the purified water is detected (YES of operation 1640), the refrigerator 1 may warn the abnormality in the purified water discharge valve 133 (operation 1650).

What the flow sensor 77 detects the discharge of the purified water may represent that the purified water discharge valve 133 is not closed. That is, since the purified water discharge valve 133 is not closed although the close valve signal is provided to the purified water discharge valve 133, the refrigerator 1 may determine that there is an abnormality in the purified water discharge valve 133.

The refrigerator 1 may warn an abnormality in the purified water discharge valve 133 to a user via the user interface 300.

As mentioned above, the refrigerator 1 may determine the presence of the abnormality of the purified water discharge valve 133 by using the flow sensor 77.

Figure 26:
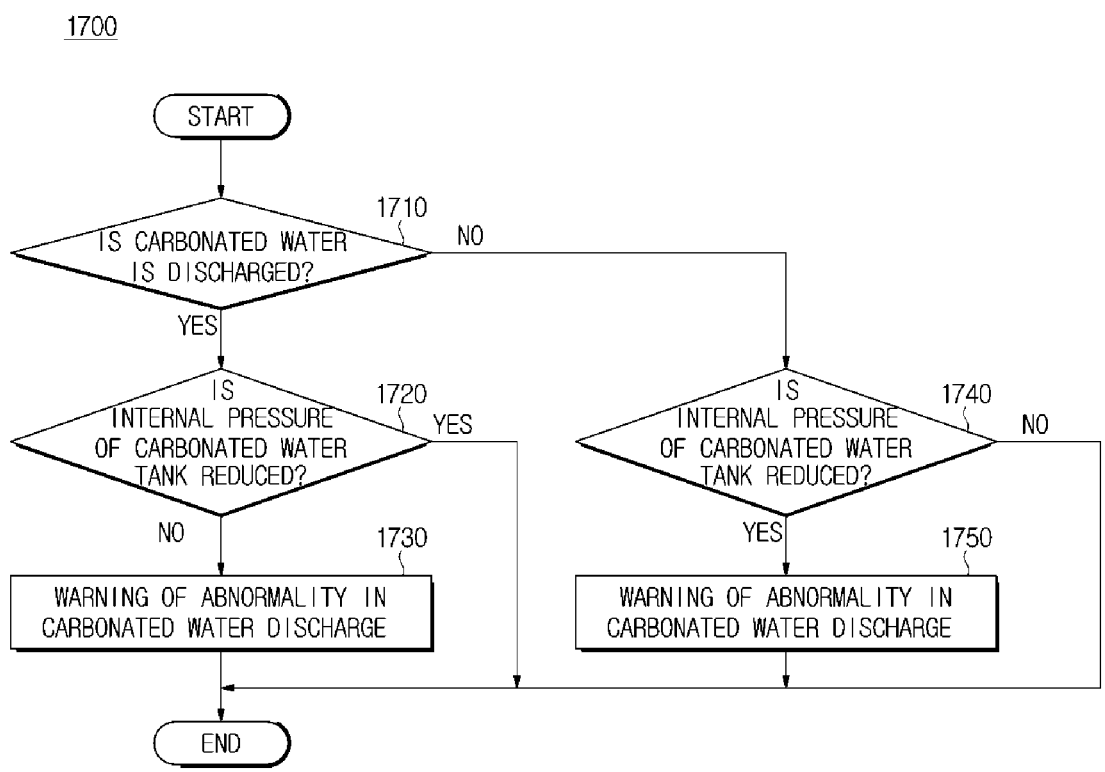
FIG. 26 is a view illustrating a method of determining an abnormality in a carbonated water discharge valve by a refrigerator according to one embodiment of the present disclosure.

FIG. 26 is a view illustrating a method of determining an abnormality in a carbonated water discharge valve of a refrigerator according to one embodiment of the present disclosure;

A method of determining an abnormality in the carbonated water discharge valve 1700 in which the refrigerator 1 determines an abnormality in the carbonated water discharge valve 135 will be described with reference to FIG. 26.

The refrigerator 1 may determine whether carbonated water is discharged from the carbonated water tank 110 (operation 1710).

The refrigerator 1 may determine whether carbonated water is discharged based on a control signal provided to the carbonated water discharge valve 135.

Particularly, when an open valve signal is provided to the carbonated water discharge valve 135, the refrigerator 1 may determine that carbonated water is discharged, and when a close valve signal is provided to the carbonated water discharge valve 135, the refrigerator 1 may determine that carbonated water is not discharged.

When it is determined that carbonated water is discharged (YES of operation 1710), the refrigerator 1 may determine whether the internal pressure of the carbonated water tank 110 is reduced (operation 1720).

The refrigerator 1 may detect the internal pressure of the carbonated water tank 110 per a predetermined cycle by using the carbonated water tank pressure sensor 112, and may compare the currently detected internal pressure with the previously detected internal pressure.

When carbonated water is discharged due to opening of the carbonated water discharge valve 135, the internal pressure of the carbonated water tank 110 may be reduced since the carbonated water tank 110 is filled with carbonated water and carbon dioxide gas.

When the internal pressure of the carbonated water tank 110 is reduced (YES of operation 1720), the refrigerator 1 may determine that there is no abnormality in the operation of the carbonated water discharge valve 135.

When the internal pressure of the carbonated water tank 110 is not reduced (NO of operation 1720), the refrigerator 1 may warn the abnormality in the carbonated water discharge valve 135 (operation 1730).

What the internal pressure of the carbonated water tank 110 is not reduced may represent that carbonated water is not discharged from the carbonated water tank 110. That is, since the carbonated water discharge valve 135 is not opened although the open valve signal is provided to the carbonated water discharge valve 135, the refrigerator 1 may determine that there is an abnormality in the carbonated water discharge valve 135.

The refrigerator 1 may warn the abnormality in the carbonated water discharge valve 135 to a user via the user interface 300.

When it is determined that carbonated water is not discharged (NO of operation 1710), the refrigerator 1 may determine whether the internal pressure of the carbonated water tank 110 is reduced (operation 1740).

The refrigerator 1 may detect the internal pressure of the carbonated water tank 110 per a predetermined cycle by using the carbonated water tank pressure sensor 112, and may compare the currently detected internal pressure with the previously detected internal pressure.

When the carbonated water discharge valve 135 is closed, the internal pressure of the carbonated water tank 110 may be constantly kept since the carbonated water tank 110 is filled with carbonated water and carbon dioxide gas.

When the internal pressure of the carbonated water tank 110 is not reduced (NO of operation 1740), the refrigerator 1 may determine that there is no abnormality in the operation of the carbonated water discharge valve 135.

When the internal pressure of the carbonated water tank 110 is reduced (YES of operation 1740), the refrigerator 1 may warn the abnormality in the carbonated water discharge valve 135 (operation 1750).

What the internal pressure of the carbonated water tank 110 is reduced may represent that carbonated water is discharged from the carbonated water tank 110. That is, since the carbonated water discharge valve 135 is not closed although the close valve signal is provided to the carbonated water discharge valve 135, the refrigerator 1 may determine that there is the abnormality in the carbonated water discharge valve 135.

As mentioned above, the refrigerator 1 may determine the presence of the abnormality of the carbonated water discharge valve 135 by using the carbonated water tank pressure sensor 112 provided on the carbonated water tank 110.

Figure 27:
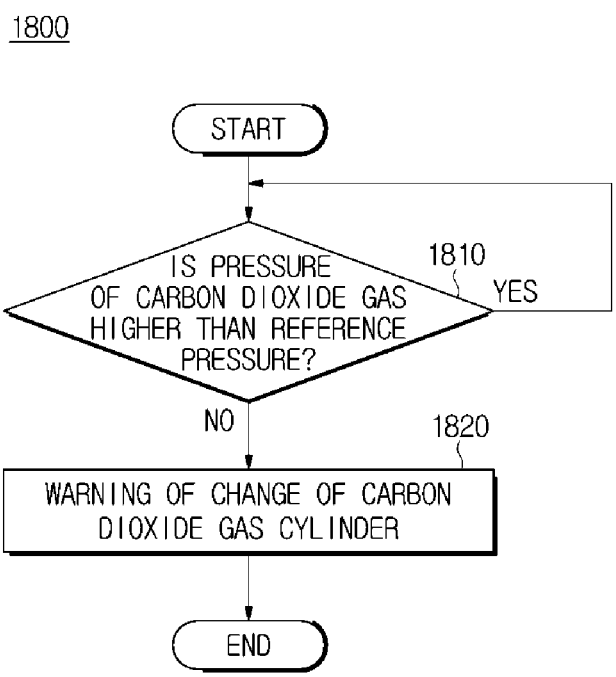
FIG. 27 is a view illustrating a method of determining the change of carbon dioxide cylinder by a refrigerator according to one embodiment of the present disclosure.

FIG. 27 is a view illustrating a method of determining the change of carbon dioxide gas cylinder of a refrigerator according to one embodiment of the present disclosure.

A method of determining the change of a carbon dioxide gas cylinder 1800 in which a refrigerator 1 determines whether to change the carbon dioxide gas cylinder will be described with reference to FIG. 27.

The refrigerator 1 may determine whether a pressure of supplied carbon dioxide gas is higher than the reference supply pressure (operation 1810).

The refrigerator 1 may detect the pressure of supplied carbon dioxide gas by using various manners.

For example, the refrigerator 1 may detect the pressure of supplied carbon dioxide gas of the carbon dioxide gas cylinder 120 by using the carbon dioxide gas pressure sensor 154.

Particularly, the refrigerator 1 may detect the pressure of supplied carbon dioxide gas of the carbon dioxide gas cylinder 120 by using the carbon dioxide gas pressure sensor 154, and may determine whether the pressure of supplied carbon dioxide gas is higher than the reference supply pressure by comparing the detected pressure of supplied carbon dioxide gas with the reference supply pressure.

When the carbon dioxide gas pressure sensor 154 employs a pressure switch, the refrigerator 1 may determine whether the pressure of supplied carbon dioxide gas is higher than the reference supply pressure depending on a low-pressure signal outputted from the carbon dioxide gas pressure sensor 154.

For another example, the refrigerator 1 may detect the pressure of supplied carbon dioxide gas of the carbon dioxide gas cylinder 120 by using the carbonated water tank pressure sensor 112.

Particularly, to produce the carbonated water, the refrigerator 1 may detect the internal pressure of the carbonated water tank 110 by using the carbonated water tank pressure sensor 112 just after supplying carbon dioxide gas to the carbonated water tank 110.

Just after supplying carbon dioxide gas, the refrigerator 1 may estimate the pressure of supplied carbon dioxide gas of the carbon dioxide gas cylinder 120 according to the detected internal pressure of the carbonated water tank 110. When the internal pressure of the carbonated water tank 110 detected just after supplying carbon dioxide gas is lower than the reference pressure, the refrigerator 1 may determine that the pressure of supplied carbon dioxide gas is lower than the reference supply pressure, and when the internal pressure of the carbonated water tank 110 detected just after supplying carbon dioxide gas is higher than the reference pressure, the refrigerator 1 may determine that the pressure of supplied carbon dioxide gas is higher than the reference supply pressure.

When the pressure of supplied carbon dioxide gas is higher than the reference supply pressure (YES of operation 1810), the refrigerator 1 may continue to perform an operation previously performed.

When the pressure of supplied carbon dioxide gas is not higher than the reference supply pressure (NO of operation 1810), the refrigerator 1 may warn the change of the carbon dioxide gas cylinder (operation 1820).

The carbonated water production module 100 may produce carbonated water by supplying carbon dioxide gas after supplying purified water to the carbonated water tank 110.

As mentioned above, the carbonated water production module 100 may supply carbon dioxide gas at high pressure to the carbonated water tank 110 to supply carbon dioxide gas to the carbonated water tank 110 in which purified water is supplied.

At this time, when the pressure of supplied carbon dioxide gas is reduced below the reference supply pressure, the amount of carbon dioxide gas supplied to the carbonated water tank 110 may be reduced and the quality of the carbonated water produced by the carbonated water production module 110 may be degraded.

To prevent those difficulties, the refrigerator 1 may warn the change of the carbon dioxide gas cylinder 120 by using the user interface 300 when the pressure of supplied carbon dioxide gas is reduced below the reference supply pressure.

As mentioned above, the refrigerator 1 may warn the change of the carbon dioxide gas cylinder 120 to maintain the constant quality of the carbonated water when the pressure of supplied carbon dioxide gas is reduced below the reference supply pressure.

Figure 28:
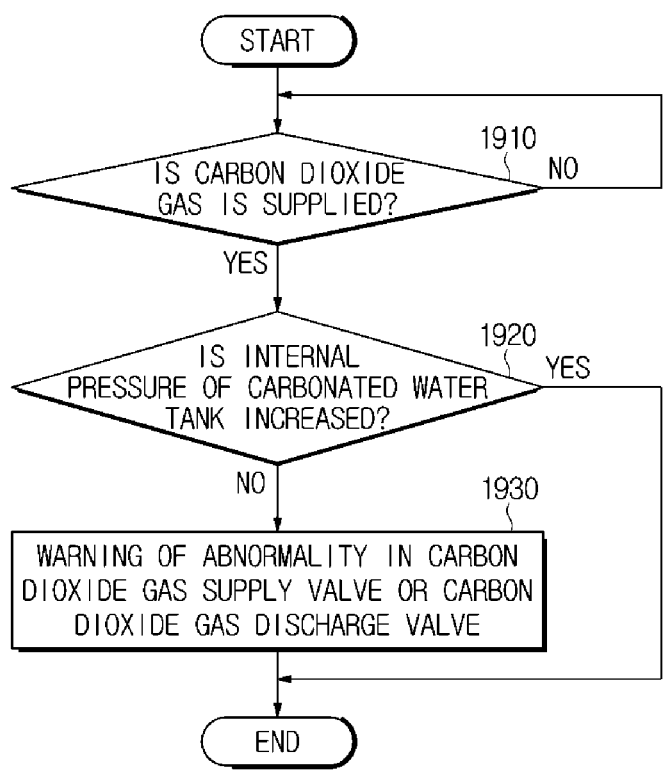
FIG. 28 is a view illustrating a method of determining an abnormality in a carbon dioxide supply/discharge valve by a refrigerator according to one embodiment of the present disclosure.

FIG. 28 is a view illustrating a method of determining an abnormality in a carbon dioxide supply/discharge valve of a refrigerator according to one embodiment of the present disclosure.

A method of determining an abnormality in the carbon dioxide gas supply/discharge valve 1900 in which the refrigerator 1 determines an abnormality in the carbon dioxide gas supply valve 152 and the carbon dioxide gas discharge valve 113 will be described with reference to FIG. 28.

The refrigerator 1 may determine whether carbon dioxide gas is supplied to the carbonated water tank 110 (operation 1910).

The refrigerator 1 may determine whether carbon dioxide gas is supplied based on a control signal provided to the carbon dioxide gas supply valve 152 and the carbon dioxide gas discharge valve 113.

Particularly, when a close valve signal is provided to the carbon dioxide gas discharge valve 113, and an open valve signal is provided to the carbon dioxide gas supply valve 152, the refrigerator 1 may determine that carbon dioxide gas is supplied to the carbonated water tank 110. In addition, when a close valve signal is provided to the carbon dioxide gas supply valve 152, the refrigerator 1 may determine that carbon dioxide gas is not supplied.

When it is determined that carbon dioxide gas is not supplied (NO of operation 1910), the refrigerator 1 may continue to perform an operation previously performed.

When it is determined that carbon dioxide gas is supplied (YES of operation 1910), the refrigerator 1 may determine whether the internal pressure of the carbonated water tank 110 is increased (operation 1920).

The refrigerator 1 may detect the internal pressure of the carbonated water tank 110 per a predetermined cycle by using the carbonated water tank pressure sensor 112, and may compare the currently detected internal pressure with the previously detected internal pressure.

When the internal pressure of the carbonated water tank 110 is increased (YES of operation 1920), the refrigerator 1 may determine that there is no abnormality in the operation of the carbonated water discharge valve 135.

When the internal pressure of the carbonated water tank 110 is not increased (NO of operation 1920), the refrigerator 1 may warn an abnormality in the carbon dioxide gas supply valve 152 or the carbon dioxide gas discharge valve 113 (operation 1930).

What the internal pressure of the carbonated water tank 110 is not increased may represent that carbon dioxide gas is not supplied to the carbonated water tank 110 from the carbon dioxide gas cylinder 120 or carbon dioxide gas supplied to the carbonated water tank 110 is leaked.

That is, the carbon dioxide gas supply valve 152 may be not opened although the open valve signal is provided to the carbon dioxide gas supply valve 152 or the carbon dioxide gas discharge valve 113 may be not closed although the close valve signal is provided to the carbon dioxide gas discharge valve 113.

Particularly, when the internal pressure of the carbonated water tank 110 is not increased, the refrigerator 1 may determine the abnormality in the carbon dioxide gas supply valve 152, and when the internal pressure of the carbonated water tank 110 is lower than the atmospheric pressure, the refrigerator 1 may determine the abnormality in the carbon dioxide gas discharge valve 113.

The refrigerator 1 may warn an abnormality in the carbon dioxide gas supply valve 152 or the carbon dioxide gas discharge valve 113 via the user interface 300.

As mentioned above, the refrigerator 1 may determine the presence of the abnormality in the carbon dioxide gas supply valve 152 or the carbon dioxide gas discharge valve 113 by using the carbonated water tank pressure sensor 112.

Figure 29:
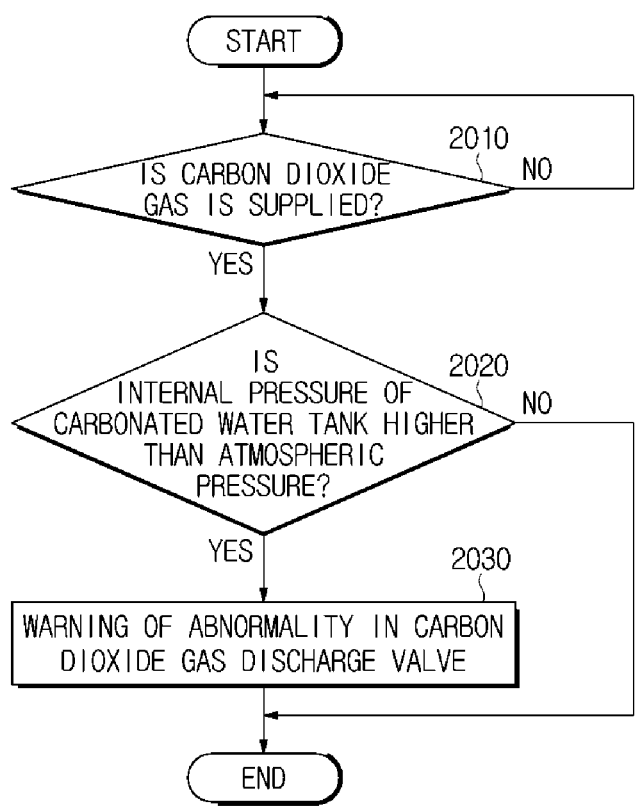
FIG. 29 is a view illustrating a method of determining an abnormality in a carbon dioxide discharge valve by a refrigerator according to one embodiment of the present disclosure.

FIG. 29 is a view illustrating a method of determining an abnormality in a carbon dioxide discharge valve of a refrigerator according to one embodiment of the present disclosure.

A method of determining an abnormality in the carbon dioxide gas discharge valve 2000 in which the refrigerator 1 determines an abnormality in the carbon dioxide gas discharge valve 113 will be described with reference to FIG. 29.

The refrigerator 1 may determine whether carbon dioxide gas is discharged from the carbonated water tank 110 (operation 2010).

The refrigerator 1 may determine whether carbon dioxide gas is discharged based on a control signal provided to the carbon dioxide gas discharge valve 113.

Particularly, when an open valve signal is provided to the carbon dioxide gas discharge valve 113, the refrigerator 1 may determine that carbon dioxide gas is discharged and when a close valve signal is provided to the carbon dioxide gas discharge valve 113, the refrigerator 1 may determine that carbon dioxide gas is not discharged.

When it is determined that carbon dioxide gas is not discharge (NO of operation 2010), the refrigerator 1 may continue to perform an operation previously performed.

When it is determined that carbon dioxide gas is discharged (YES of operation 2010), the refrigerator 1 may determine whether the internal pressure of the carbonated water tank 110 is higher than the atmospheric pressure (operation 2020).

The refrigerator 1 may detect the internal pressure of the carbonated water tank 110 by using the carbonated water tank pressure sensor 112, and may compare the currently detected internal pressure with the atmospheric pressure.

When the carbon dioxide gas discharge valve 113 is opened and carbon dioxide gas inside the carbonated water tank 110 is discharged to the outside, the inside and the outside of the carbonated water tank 110 may become a pressure equilibrium state. That is, the internal pressure of the carbonated water tank 110 may be the same as the atmospheric pressure.

When the internal pressure of the carbonated water tank 110 is not higher than the atmospheric pressure (NO of operation 2020), the refrigerator 1 may determine that there is no abnormality in the operation of the carbon dioxide gas discharge valve 113.

When the internal pressure of the carbonated water tank 110 is higher than the atmospheric pressure (YES of operation 2020), the refrigerator 1 may warn an abnormality in the carbon dioxide gas discharge valve 113 (operation 2030).

What the internal pressure of the carbonated water tank 110 is great than the atmospheric pressure may represent that carbon dioxide gas is not discharged from the carbonated water tank 110. That is, since the carbon dioxide gas discharge valve 113 is not opened although the open valve signal is provided to the carbon dioxide gas discharge valve 113, the refrigerator 1 may determine that there is the abnormality in the carbon dioxide gas discharge valve 113.

The refrigerator 1 may warn the abnormality in the carbon dioxide gas discharge valve 113 to a user via the user interface 300.

As mentioned above, the refrigerator 1 may determine the presence of the abnormality in the carbon dioxide gas discharge valve 113 by using the carbonated water tank pressure sensor 112 provided in the carbonated water tank 110.

Figure 30:
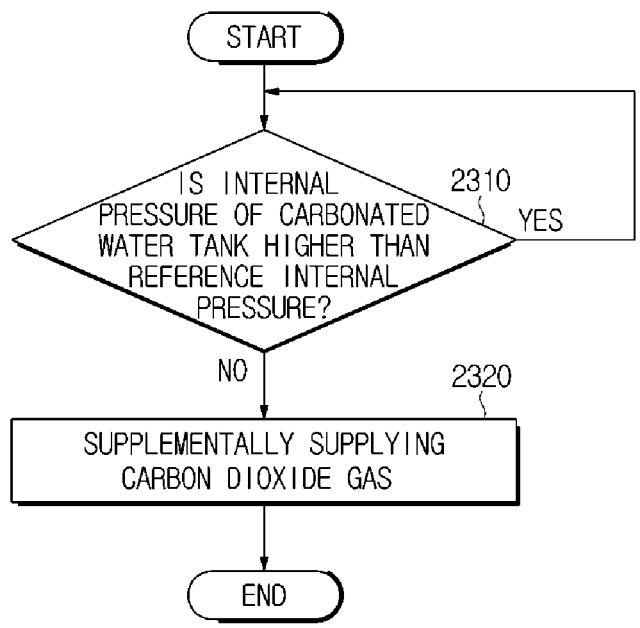
FIG. 30 is a view illustrating a method of supplementing carbon dioxide gas of a refrigerator according to one embodiment of the present disclosure.

FIG. 30 is a view illustrating a method of supplementing carbon dioxide of a refrigerator according to one embodiment of the present disclosure.

A method of supplementing carbon dioxide 2300 in which the refrigerator 1 supplementally supplies carbon dioxide gas to the carbonated water tank 110 will be described with respect to FIG. 30.

The refrigerator 1 may determine whether the internal pressure of the carbonated water tank 110 is higher than the minimum internal pressure (operation 2310).

The refrigerator 1 may detect the internal pressure of the carbonated water tank 110 by using the carbonated water tank pressure sensor 112, and may compare the currently detected internal pressure with the minimum internal pressure.

"the minimum internal pressure" may represent a minimum internal pressure to allow the carbonated water tank 110 to discharge carbonated water by using the internal pressure of the carbonated water tank 110.

When discharging the carbonated water, the carbonated water tank 110 may discharge carbonated water by using the internal pressure of the carbonated water tank 110. That is, the carbonated water tank 110 may discharge carbonated water by using a difference between the internal pressure of the carbonated water tank 110 and the atmospheric pressure.

To discharge carbonated water at more than a certain pressure, the refrigerator 1 may maintain the internal pressure of the carbonated water tank 110 to be higher than the minimum internal pressure.

However, when the refrigerator 1 discharges carbonated water, the internal pressure of the carbonated water tank 110 may be reduced. In addition, as time passes from when carbonated water is produced, the internal pressure of the carbonated water tank 110 may be reduced since carbon dioxide gas is dissolved in carbonated water.

When the internal pressure of the carbonated water tank 110 is higher than the minimum internal pressure (YES of operation 2310), the refrigerator 1 may continue to perform an operation performed previously.

When the internal pressure of the carbonated water tank 110 is not higher than the minimum internal pressure (NO of operation 2310), the refrigerator 1 may supplementally supply carbon dioxide gas to the carbonated water tank 110 without supplying purified water (operation 2320).

The refrigerator 1 may open the carbon dioxide gas supply valve 152 for a predetermined supplement supply time to increase the internal pressure of the carbonated water tank 110. When the carbon dioxide gas supply valve 152 is opened, carbon dioxide gas may be additionally supplied to the carbonated water tank 110, and the internal pressure of the carbonated water tank 110 may be increased.

Figure 31:
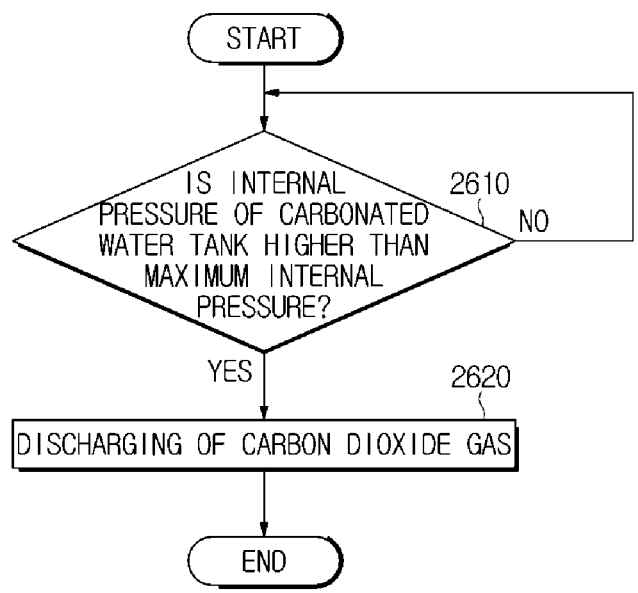
FIG. 31 is a view illustrating a method of discharging carbon dioxide gas of a refrigerator according to one embodiment of the present disclosure.

FIG. 31 is a view illustrating a method of discharging carbon dioxide of a refrigerator according to one embodiment of the present disclosure.

A method of discharging carbon dioxide gas 2600 in which the refrigerator 1 discharges carbon dioxide gas to the carbonated water tank 110 will be described with reference to FIG. 31.

The refrigerator 1 may determine whether the internal pressure of the carbonated water tank 110 is higher than the maximum internal pressure (operation 2610).

The refrigerator 1 may detect the internal pressure of the carbonated water tank 110 by using the carbonated water tank pressure sensor 112, and may compare the currently detected internal pressure with the maximum internal pressure.

"the minimum internal pressure" may represent a maximum value of the internal pressure which is allowed by the carbonated water tank 110 for the safety.

When supplying carbon dioxide gas to the carbonated water tank 110 to supplement the internal pressure of the carbonated water tank 110 or to produce carbonated water, carbon dioxide gas, which is more than appropriate amount, may be supplied to the carbonated water tank 110 due to the abnormality in the carbon dioxide gas supply valve 152 or the carbon dioxide gas regulator 151.

In this case, it may cause safety problems in the carbonated water tank 110.

When the internal pressure of the carbonated water tank 110 is lower than the maximum internal pressure (NO of operation 2610), the refrigerator 1 may continue to perform an operation previously performed.

When the internal pressure of the carbonated water tank 110 is higher than the maximum internal pressure (YES of operation 2610), the refrigerator 1 may discharge carbon dioxide gas from the carbonated water tank 110 (operation 2620).

The refrigerator 1 may open the carbon dioxide gas discharge valve 113 for a predetermined discharge time to increase the internal pressure of the carbonated water tank 110. When the carbon dioxide gas discharge valve 113 is opened, carbon dioxide gas may be discharged from the carbonated water tank 110, and the internal pressure of the carbonated water tank 110 may be reduced.

As mentioned above, the refrigerator 1 may maintain the internal pressure of the carbonated water tank 110 within a predetermined range, after producing the carbonated water, by using the carbonated water tank pressure sensor 112.

Figure 32:
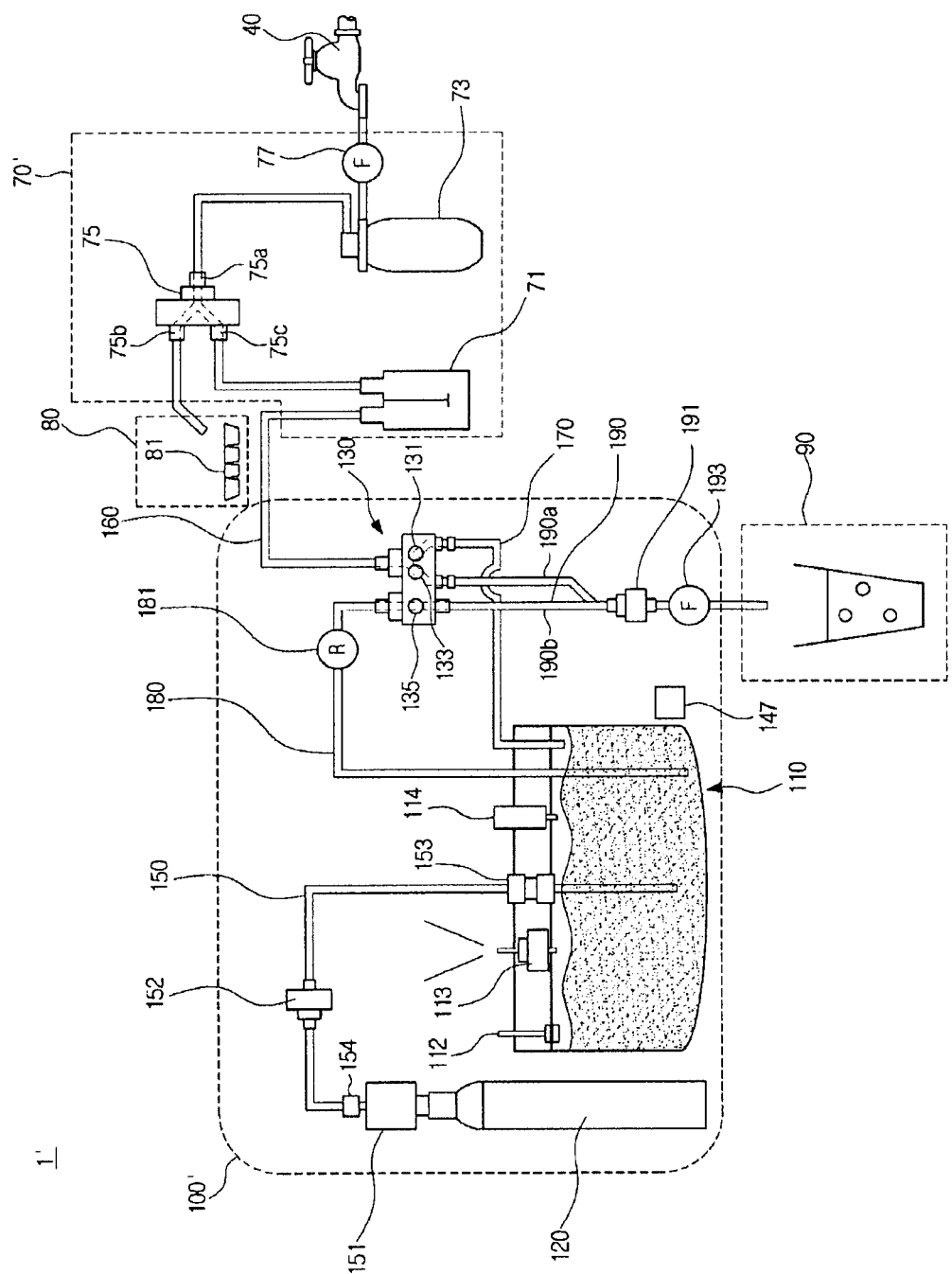
FIG. 32 is a view illustrating a carbonated water production module and a purified water supply module of a refrigerator according to another embodiment of the present disclosure.

FIG. 32 is a view illustrating a carbonated water production module and a purified water supply module of a refrigerator according to another embodiment of the present disclosure.

A purified water supply module 70' and a carbonated water production module 100' included in a refrigerator 1' according to another embodiment will be described with reference to FIG. 32. However, a description of the same parts as the purified water supply module and the carbonated water production module shown in FIG. 5 will be omitted.

As illustrated in FIG. 32, the purified water supply module 70' may include a purified water tank 71, a purification filter 73, a flow path switching valve 75, and a flow sensor 77, and the carbonated water production module 100' may include a carbonated water tank 110, a carbon dioxide gas cylinder 120, a valve assembly 130, a variety of flow paths 150, 160, 170, 180, and 190, and a module case 140.

The carbonated water tank 110 may include a pressure sensor 112, a carbon dioxide gas discharge valve 113, and a safety valve 114.

A first purified water supply flow path 160, a second purified water supply flow path 170, a carbonated water discharge flow path 180 and an integrated discharge flow path 190 may be provided among the carbonated water tank 110, the carbon dioxide gas cylinder 120, and the valve assembly 130.

In the integrated discharge flow path 190, a second flow sensor 193 to detect an amount of discharged carbonated water or an amount of discharged purified water via the integrated discharge flow path 190 may be provided.

A configuration and an operation of the second flow sensor 193 is the same as those of the first flow sensor 77 and thus a description thereof will be omitted.

Figure 33:
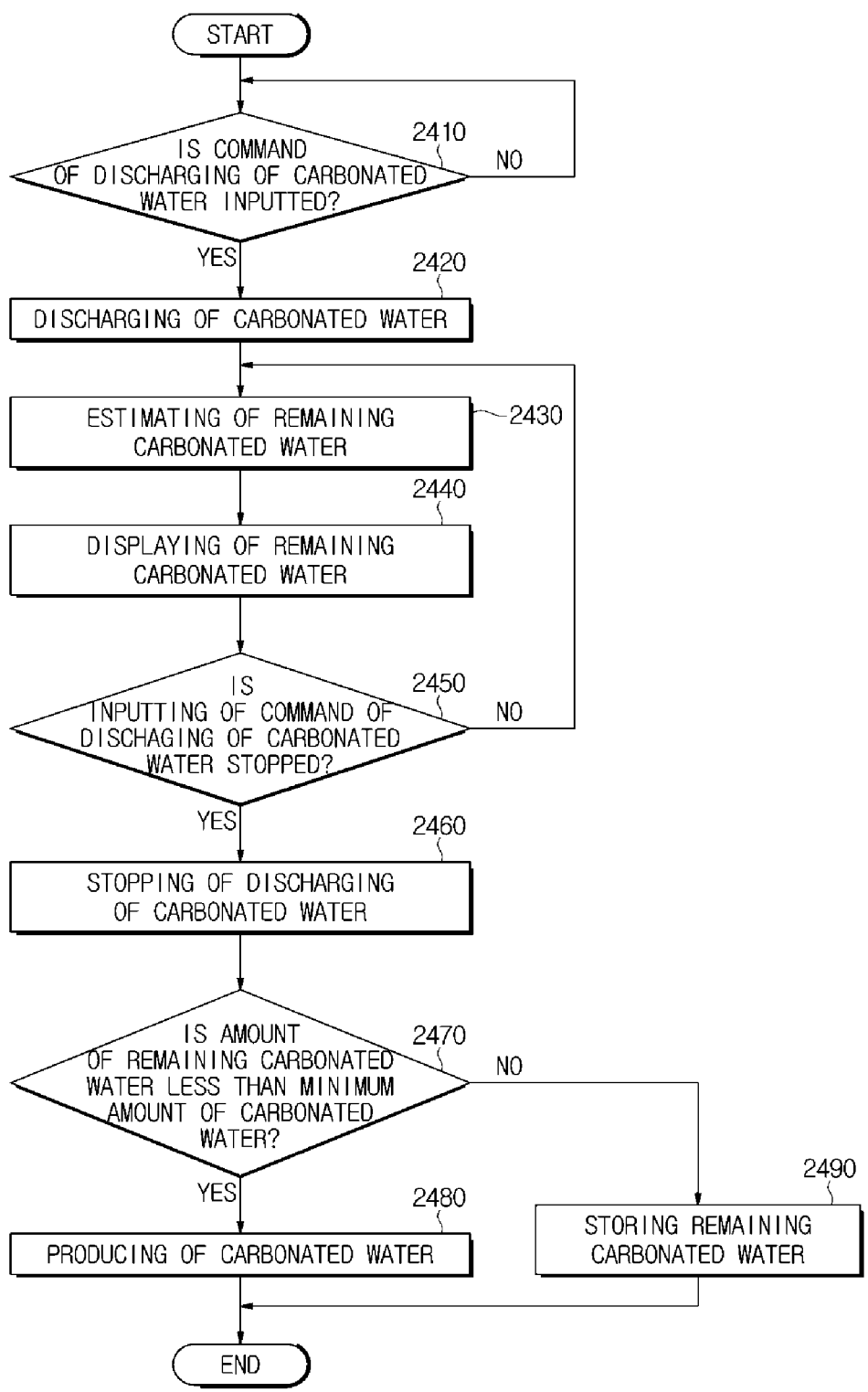
FIG. 33 is a view illustrating a method of discharging carbonated water of a refrigerator according to another embodiment of the present disclosure.
Figure 34:
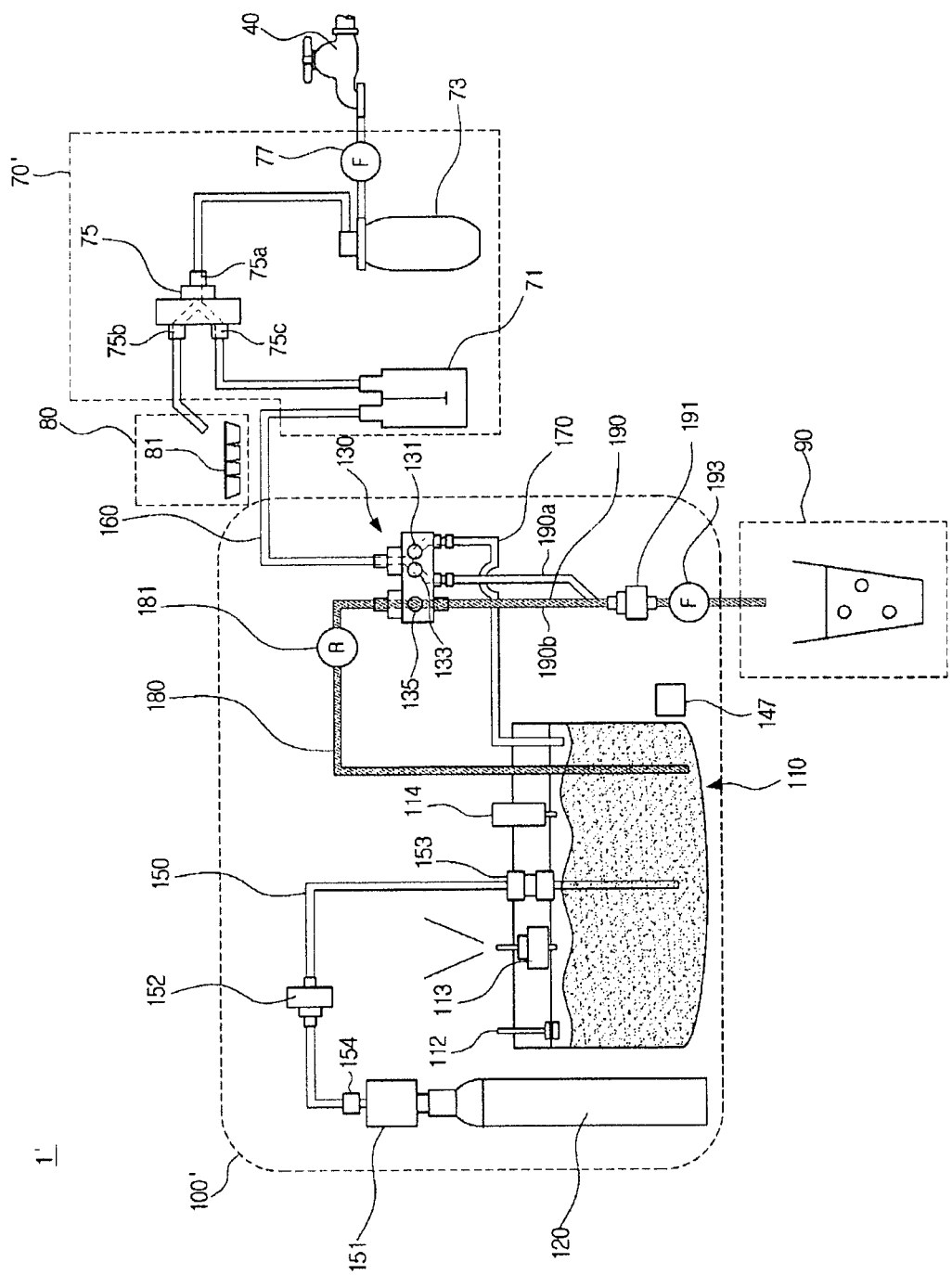
FIG. 34 is a view illustrating an example of discharging carbonated water by a refrigerator according to the method illustrated in FIG. 33.

FIG. 33 is a view illustrating a method of discharging carbonated water of a refrigerator according to another embodiment of the present disclosure and FIG. 34 is a view illustrating an example of discharging carbonated water by a refrigerator according to the method illustrated in FIG. 33.

A method of discharging carbonated water 2400 in which a refrigerator 1' discharges carbonated water will be described with reference to FIGS. 33 and 34.

The refrigerator 1' may determine whether a command of discharging carbonated water is inputted (operation 2410).

When a user presses the dispenser lever 93 to discharge carbonated water, the refrigerator 1' may determine that a command of discharging carbonated water is inputted.

When the command of discharging carbonated water is not inputted (NO of operation 2410), the refrigerator 1' may continue to perform an operation previously performed.

When the command of discharging carbonated water is inputted (YES of operation 2410), the refrigerator 1' may discharge carbonated water via the dispenser module 90 (operation 2420).

Particularly, the refrigerator 1' may open a residual water discharge prevention valve 191 and a carbonated water discharge valve 135 in sequence to discharge carbonated water. When the residual water discharge prevention valve 191 and the carbonated water discharge valve 135 are opened, carbonated water stored in the carbonated water tank 110 may be discharged along the carbonated water discharge flow path 180 and the integrated discharge flow path 190 by a pressure of carbon dioxide gas remained the carbonated water tank 110, as illustrated in FIG. 34.

That is, carbonated water may be discharged to the carbonated water tank 110 by the pressure difference between the internal pressure of the carbonated water tank 110 and the external atmospheric pressure of the carbonated water tank 110.

The refrigerator 1' may estimate an amount of remaining carbonated water (operation 2430).

The amount of remaining carbonated water may represent an amount of carbonated water remaining in the carbonated water tank 110, and the amount of remaining carbonated water may be estimated based on the capacity of the carbonated water tank 110 and an accumulated amount of discharged carbonated water, that is a sum of discharged carbonated water from when carbonated water is produced.

The refrigerator 1' may estimate an accumulated amount of discharged carbonated water based on the result of the detection of the second flow sensor 193 provided on the integrated discharge flow path 190. When the command of discharging carbonated water is inputted, carbonated water may be discharged to the outside via the second flow sensor 193, as illustrated in FIG. 34, and the second flow sensor 193 may detect the amount of discharged carbonated water while carbonated water is discharged.

For example, when the command of discharging carbonated water is inputted, the refrigerator 1' may count an electrical pulse outputted by the second flow sensor 193, and may estimate an accumulated amount of discharged carbonated water based on the counted electrical pulse.

In addition, the refrigerator 1' may estimate the amount of remaining carbonated water based on a difference between the capacity of the carbonated water tank 110 and the accumulated amount of discharged carbonated water.

The refrigerator 1' may display the amount of remaining carbonated water on the user interface 300 (operation 2440).

The refrigerator 1' may display the amount of remaining carbonated water, which is estimated at a step 2430, on a carbonated water level displaying unit 340. For example, when the amount of remaining carbonated water is more than $2/3$ of the total capacity, the refrigerator 1' may display three water level displaying bars on the carbonated water level displaying unit 340, when the amount of remaining carbonated water is from $1/3$ to $2/3$ of the total capacity, the refrigerator 1' may display two water level displaying bars on the carbonated water level displaying unit 340, and when the amount of remaining carbonated water is less than $1/3$ of the total capacity, the refrigerator 1' may display one water level displaying bar on the carbonated water level displaying unit 340.

The refrigerator 1' may determine whether inputting of the command of discharging carbonated water is stopped (operation 2450).

When the user releases the dispenser lever 93, the refrigerator 1' may determine that inputting of the command of discharging carbonated water is stopped.

For example, when a second lever 93b included in the dispenser module 90 is moved from the fourth position P4 to the third position P3, the refrigerator 1' may determine that inputting of the command of discharging carbonated water is stopped.

When the command of discharging carbonated water is continued (NO of operation 2450), the refrigerator 1' may repeat the estimation and the display of the amount of remaining carbonated water.

When the command of discharging carbonated water is stopped (YES of operation 2450), the refrigerator 1' may stop discharging carbonated water (operation 2460).

The refrigerator 1' may close the carbonated water discharge valve 135 and the residual water discharge prevention valve 191 in sequence to stop discharging carbonated water.

After discharging carbonated water is stopped, the refrigerator 1' may determine whether the amount of remaining carbonated water is less than the minimum amount of carbonated water (operation 2470).

The minimum amount of carbonated water may represent an amount of carbonated water corresponding to the lowest water level of carbonated water stored in the carbonated water tank 110. The minimum amount of carbonated water may be different according to the carbonated water tank 110, and may be set to "0".

When the amount of remaining carbonated water is less than the minimum amount of carbonated water (YES of operation 2470), the refrigerator 1' may start to produce carbonated water (operation 2480).

Particularly, the refrigerator 1' may produce carbonated water by supplying purified water and carbon dioxide gas to the carbonated water tank 110.

When the amount of remaining carbonated water is not less than the minimum amount of carbonated water (NO of operation 2470), the refrigerator 1' may store the amount of remaining carbonated water (operation 2490).

The refrigerator 1 may store the amount of remaining carbonated water in a memory 520 of a controller 500 or a storage 400 to estimate the amount of remaining carbonated water when carbonated water is discharged.

As mentioned above, the refrigerator 1' may detect the amount of discharged carbonated water by using the second flow sensor 193 provided on the integrated discharge flow path 190, and may estimate the amount of remaining carbonated water of the carbonated water tank 110 based on the detected amount of discharged carbonated water.

Figure 35:
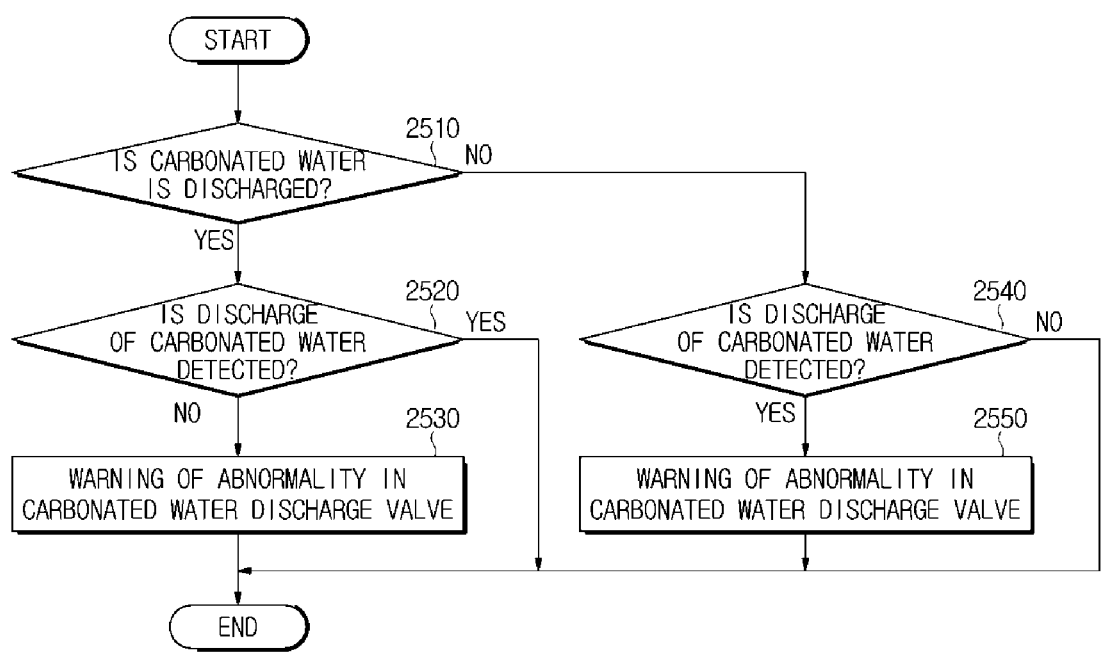
FIG. 35 is a view illustrating a method of determining an abnormality in a carbonated water discharge valve by a refrigerator according to another embodiment of the present disclosure.

FIG. 35 is a view illustrating a method of determining an abnormality in a carbonated water discharge valve of a refrigerator according to another embodiment of the present disclosure.

A method of determining an abnormality in the carbonated water discharge valve 2500 in which the refrigerator 1' determines an abnormality in the carbonated water discharge valve 135 will be described with reference to FIG. 35.

The refrigerator 1' may determine whether carbonated water is discharged (operation 2510).

The refrigerator 1' may determine whether carbonated water is discharged based on a control signal provided to the carbonated water discharge valve 135.

Particularly, when an open valve signal is provided to the carbonated water discharge valve 135, the refrigerator 1' may determine that carbonated water is discharged, and when a close valve signal is provided to the carbonated water discharge valve 135, the refrigerator 1' may determine that carbonated water is not discharged.

When it is determined that carbonated water is discharged (YES of operation 2510), the refrigerator 1' may detect the discharge of the carbonated water by using the second flow sensor 193 (operation 2520).

When the carbonated water discharge valve 135 is opened, the second flow sensor 193 may detect the discharge of the carbonated water since carbonated water is discharged from the carbonated water tank 110 via the carbonated water discharge valve 135 and the second flow sensor 193.

When the discharge of the carbonated water is detected (YES of operation 2520), the refrigerator 1' may determine that there is no abnormality in the operation of the carbonated water discharge valve 135.

Conversely, the discharge of the carbonated water is not detected (NO of operation 2520), the refrigerator 1' may warn the abnormality in the carbonated water discharge valve 135 (operation 2530).

What the second flow sensor 193 does not detect the discharge of the carbonated water may represent that the carbonated water discharge valve 135 is not opened. That is, since the carbonated water discharge valve 135 is not opened although the open valve signal is provided to the carbonated water discharge valve 135, the refrigerator 1' may determine that there is an abnormality in the carbonated water discharge valve 135.

The refrigerator 1' may warn the abnormality in the carbonated water discharge valve 135 to a user via the user interface 300.

When it is determined that carbonated water is not discharged (NO of operation 2510), the refrigerator 1' may detect the discharge of the carbonated water by using the second flow sensor 193 (operation 2540).

When the carbonated water supply valve 135 is normally operated in a state where the close valve signal is provided to the carbonated water discharge valve 135, the discharge of the carbonated water may be not detected.

When the discharge of the purified water is not detected (NO of operation 2540), the refrigerator 1' may determine that there is no abnormality in the operation of the carbonated water discharge valve 135.

When the discharge of the carbonated water is detected (YES of operation 2540), the refrigerator 1' may warn an abnormality in the carbonated water discharge valve 135 (operation 2550).

What the second flow sensor 193 detects the discharge of the carbonated water may represent that the carbonated water discharge valve 135 is not closed.

That is, since the carbonated water discharge valve 135 is not closed although the close valve signal is provided to the carbonated water discharge valve 135, the refrigerator 1' may determine that there is an abnormality in the carbonated water discharge valve 135.

The refrigerator 1' may warn the abnormality in the carbonated water discharge valve 135 to a user via the user interface 300.

As mentioned above, the refrigerator 1' may determine the presence of the abnormality in the carbonated water discharge valve 135 by using the second flow sensor 193.

Figure 36:
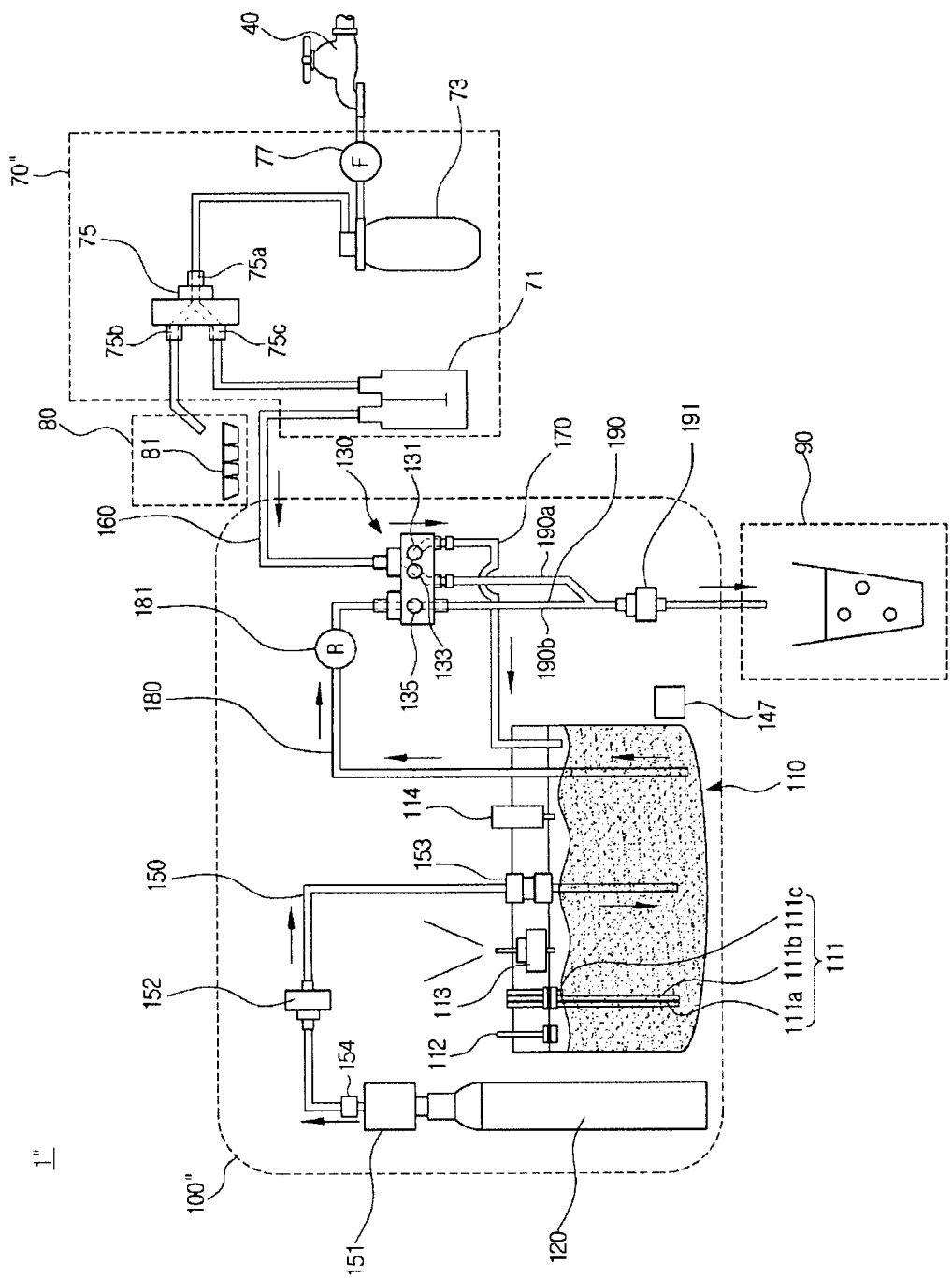
FIG. 36 is a view illustrating a carbonated water production module and a purified water supply module of a refrigerator according to another embodiment of the present disclosure.

FIG. 36 is a view illustrating a carbonated water production module and a purified water supply module of a refrigerator according to another embodiment of the present disclosure;

A purified water supply module 70" and a carbonated water production module 100" included in a refrigerator 1" according to another embodiment will be described with reference to FIG. 36. However, a description of the same parts as the purified water supply module and the carbonated water production module shown in FIG. 5 will be omitted.

As illustrated in FIG. 36, the purified water supply module 70" may include a purified water tank 71, a purification filter 73, a flow path switching valve 75, and a flow sensor 77, and the carbonated water production module 100" may include a carbonated water tank 110, a carbon dioxide gas cylinder 120, a valve assembly 130, a variety of flow paths 150, 160, 170, 180, and 190, and a module case 140.

The carbonated water tank 110 may include a water level sensor 111 to measure the amount of purified water or carbonated water stored in the carbonated water tank 110, a pressure sensor 112, a carbon dioxide gas discharge valve 113, and a safety valve 114.

The water level sensor 111 may include a first electrode 111a and a second electrode 111b, both of which have the same length, and a third electrode 111c having different length from the first electrode 111a and the second electrode 111b.

For example, each end of the first electrode 111a and the second electrode 111b may be disposed at a height corresponding to the lowest carbonated water level, and an end of the third electrode 111c may be disposed at a height corresponding to the highest carbonated water level. In this case, when the current is conducted between any one electrode between the first electrode 111a and the second electrode 111b, and the third electrode 111c, the refrigerator 1" may determine that the carbonated water level is higher than the highest carbonated water level. Also, when the current is not conducted between the first electrode 111a and the second electrode 111b, the refrigerator 1" may determine that the carbonated water level is lower than the lowest carbonated water level.

In summary, the water level sensor 111 may include three electrodes 111a, 111b, 111c, and may determine whether the carbonated water level is the highest level and whether the carbonated water level is the lowest level, wherein the carbonated water is stored in the carbonated water tank 110.

However, the water level sensor 111 is not limited thereto. For example, the water level sensor 111 may include two electrodes and may determine whether the carbonated water level is the highest level or the lowest level. For another example, the water level sensor 111 may include four or more electrodes and may detect more than three point of the water level according to the number of electrodes.

A first purified water supply valve 160, a second purified water supply valve 170, a carbonated water discharge flow path 180 and an integrated discharge flow path 190 may be provided among the carbonated water tank 110, the carbon dioxide gas cylinder 120, and the valve assembly 130.

Figure 37:
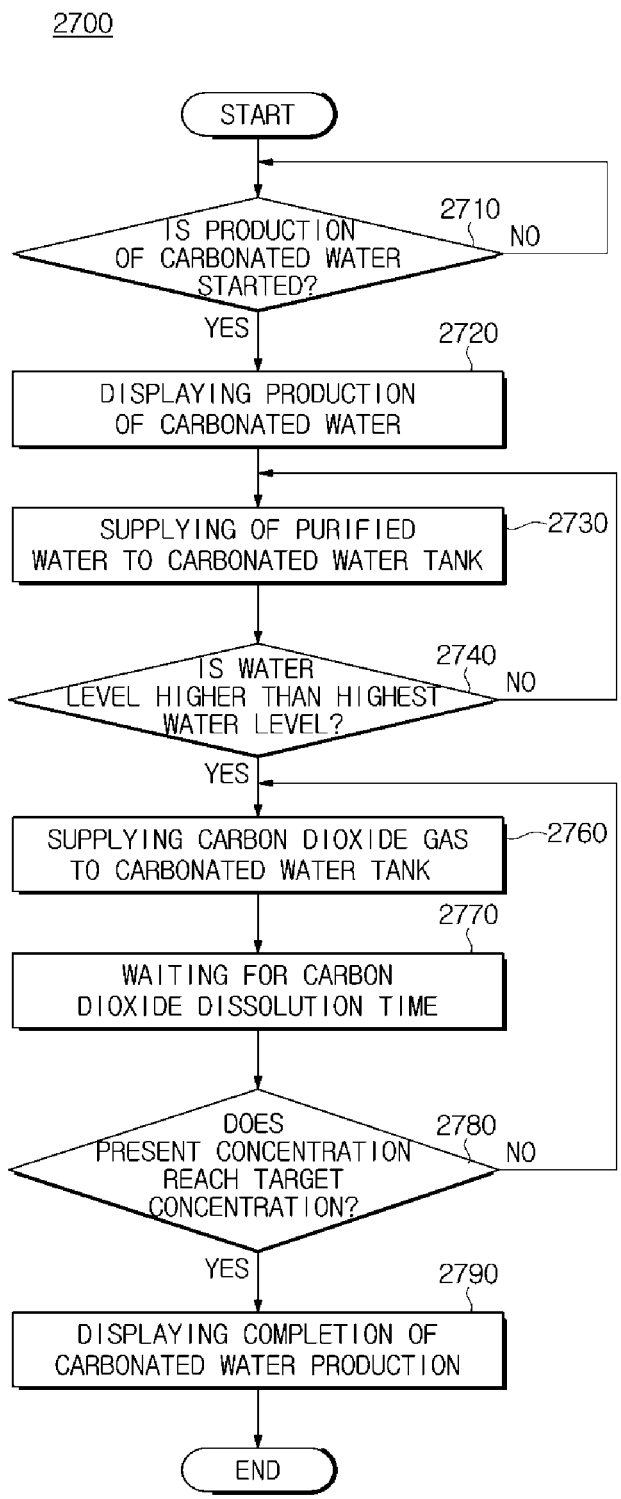
FIG. 37 is a view illustrating a method of producing carbonated water of a refrigerator according to another embodiment of the present disclosure.

FIG. 37 is a view illustrating a method of producing carbonated water of a refrigerator according to another embodiment of the present disclosure.

A method of producing carbonated water 2700 of a refrigerator 1" will be described with reference to FIG. 37

At first, the refrigerator 1" may determine whether conditions for starting to produce carbonated water are satisfied (operation 2710). The term of "conditions for starting to produce carbonated water" may represent conditions to allow the refrigerator 1" to start to produce carbonated water.

When a water level of carbonated water stored in the carbonated water tank 110 is lower than the lowest level, the refrigerator 1" may automatically start to produce carbonated water. In addition, when the user inputs a command of activating carbonated water production through the user interface 300, the refrigerator 1" may start to produce carbonated water.

The refrigerator 1" may display carbonated water production on the user interface 300 (operation 2720). For example, the refrigerator 1" may display the carbonated water production image on a carbonated water producing display unit 313 (refer to FIG. 11) provided in a carbonated water producing activation unit 310 (refer to FIG. 11).

The refrigerator 1" may supply purified water to the carbonated water tank 110 (operation 2730).

The refrigerator 1 may open a purified water supply valve 131 to supply purified water to the carbonated water tank 110.

At this time, the refrigerator 1" may open a carbon dioxide gas discharge valve 152 to smoothly supply purified water to the carbonated water tank 110. Therefore, it may prevent a condition where purified water is not smoothly supplied to the carbonated water tank 110 when an internal pressure of the carbonated water tank 110 is higher than a supply pressure of purified water due to carbon dioxide gas in the carbonated water tank 110.

The refrigerator 1" may determine whether the water level of water stored in the carbonated water tank 110 is higher than the highest level (operation 2740).

The refrigerator 1" may determine whether the water level of purified water stored in the carbonated water tank 110 is higher than the highest level by using the water level sensor 111.

When the current is conducted between any one electrode between the first electrode 111a and the second electrode 111b, both of which are long and the third electrode 111c which is short, the refrigerator 1" may determine that the carbonated water level is higher than the highest carbonated water level.

When the water level of purified water is not higher than the highest level (NO of operation 2740), the refrigerator 1" may continue to supply purified water to the carbonated water tank 110.

When the water level of purified water stored in the carbonated water tank 110 is higher than the highest level (YES of operation 2740), the refrigerator 1" may stop supplying purified water to the carbonated water tank 110, and may supply carbon dioxide gas to the carbonated water tank 110 (operation 2760).

To supply carbon dioxide gas to the carbonated water tank 110, the refrigerator 1" may close the purified water supply valve 131 and the carbon dioxide gas discharge valve 113, and then may open the carbon dioxide gas supply valve 152 for a predetermined carbon dioxide gas supply time.

The refrigerator 1" may wait for a carbon dioxide dissolution time to dissolve carbon dioxide gas in purified water (operation 2770).

Despite of supplying carbon dioxide gas to the carbonated water tank 110 where purified water is filled, carbon dioxide gas may be not immediately dissolved. It may require from several minutes to several ten minutes to dissolve sufficient amount of carbon dioxide gas in purified water even there may be differences according to the pressure of carbon dioxide gas, the concentration of carbon dioxide gas dissolved in purified water, and the likes.

When the carbon dioxide gas dissolution time is expired after supplying carbon dioxide gas, the refrigerator 1" may determine whether the concentration of carbonated water stored in the carbonated water tank 110 reaches a target concentration (operation 2780).

For example, to determine whether the concentration of carbonated water stored in the carbonated water tank 110 reaches a target concentration, the refrigerator 1" may determine whether the concentration of carbonated water reaches a target concentration based on a supply time of a carbon dioxide gas supplied to the carbonated water tank 110. This is because carbon dioxide gas at a certain pressure is supplied to the carbonated water tank by the carbon dioxide gas regulator 151.

For another example, the refrigerator 1" may determine whether the concentration of carbonated water reaches the target concentration based on the number of supply times of carbon dioxide gas to the carbonated water tank 110.

The carbon dioxide gas pressure of the inside of the carbonated water tank 110 may be limited below a certain pressure, and thus the refrigerator 1" may repeatedly supply carbon dioxide gas and dissolve carbon dioxide gas to dissolve a large amount of carbon dioxide gas in purified water.

In other words, the refrigerator 1" may change the number of times of supplying carbon dioxide gas according to a target concentration inputted by the user, and may change the supply time of carbon dioxide gas and the carbon dioxide gas dissolution time according to the number of supply times.

To determine whether a carbonated water concentration reaches the target concentration, the refrigerator 1" may determine whether the number of supply times of carbon dioxide gas supplied to the carbonated water tank 110 corresponds to the number of supply times of carbon dioxide gas according to the target concentration.

When it is determined that the concentration of the carbonated water does not reach the target concentration (NO of operation 2780), the refrigerator 1" may repeatedly supply carbon dioxide gas and dissolve carbon dioxide gas to the carbonated water tank 110.

When it is determined that the concentration of the carbonated water reaches the target concentration (YES of operation 2780), the refrigerator 1" may display the completion of the carbonated water production on the user interface 300 (operation 2790).

For example, the refrigerator 1" may display a completion of the carbonated water production image on the carbonated water production displaying unit 313 (refer to FIG. 11) included in the carbonated water producing activation unit 310 (refer to FIG. 11).

As mentioned above, the refrigerator 1" may produce carbonated water at various concentrations by using the carbonated water production module 100".

Figure 38:
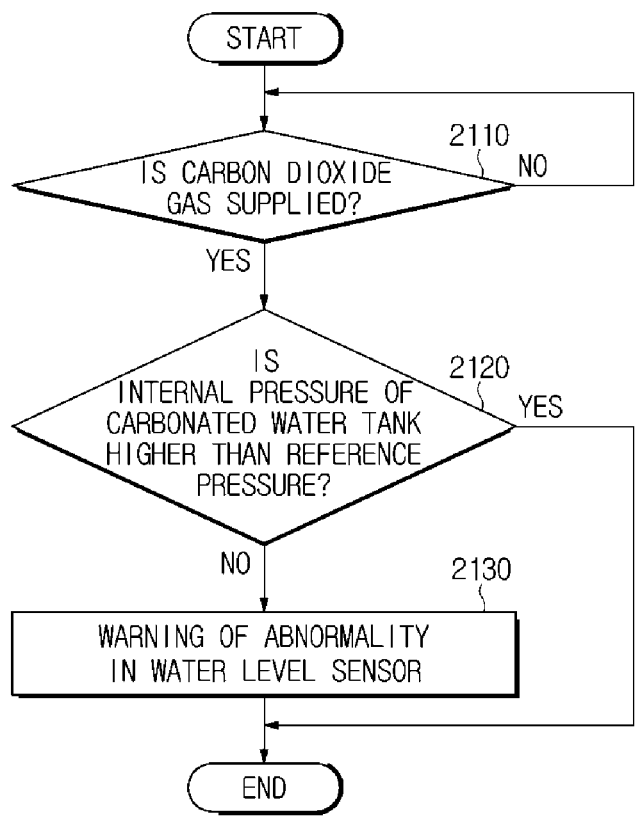
FIG. 38 is a view illustrating an example of a method of determining an abnormality in a water level sensor by a refrigerator according to another embodiment of the present disclosure.

FIG. 38 is a view illustrating an example of a method of determining an abnormality in a water level sensor of a refrigerator according to another embodiment of the present disclosure.

A method of determining an abnormality in the water level sensor 2100 in which the refrigerator 1" determines an abnormality in the water level sensor 111 will be described with reference to FIG. 38.

The refrigerator 1" may determine whether carbon dioxide gas is supplied to the carbonated water tank 110 (operation 2110).

The refrigerator 1" may determine whether carbon dioxide gas is supplied based on a control signal provided to the carbon dioxide gas supply valve 152 and the carbon dioxide gas discharge valve 113.

Particularly, when a close valve signal is provided to the carbon dioxide gas discharge valve 113, and an open valve signal is provided to the carbon dioxide gas supply valve 152, the refrigerator 1" may determine that carbon dioxide gas is supplied to the carbonated water tank 110. In addition, when a close valve signal is provided to the carbon dioxide gas supply valve 152, the refrigerator 1" may determine that carbon dioxide gas is not supplied.

When it is determined that carbon dioxide gas is not supplied (NO of operation 2110), the refrigerator 1" may continue to perform an operation previously performed.

When it is determined that carbon dioxide gas is supplied (YES of operation 2110), the refrigerator 1 may determine whether the internal pressure of the carbonated water tank 110 is higher than the reference internal pressure (operation 2120).

The refrigerator 1" may detect the internal pressure of the carbonated water tank 110 by using the carbonated water tank pressure sensor 112, and may compare the detected internal pressure with the reference internal pressure.

The term of the reference internal pressure may represent an internal pressure to allow the carbonated water tank 110 to discharge carbonated water by using the internal pressure of the carbonated water tank 110. As mentioned above, the carbonated water tank 110 may discharge carbonated water by using the internal pressure of the carbonated water tank 110. That is, the carbonated water tank 110 may discharge carbonated water by using differences between the internal pressure of the carbonated water tank 110 and the atmospheric pressure.

In addition, the carbonated water tank 110 may discharge carbonated water at more than a certain pressure for the user convenience.

To discharge carbonated water at more than a certain pressure, the internal pressure of the carbonated water tank 110 may be higher than the reference internal pressure, and carbon dioxide gas may be supplied to allow the internal pressure of the carbonated water tank 110 to be higher than the reference internal pressure.

When the internal pressure of the carbonated water tank 110 is higher than the reference internal pressure (YES of operation 2120), the refrigerator 1" may determine that there is no abnormality in the operation of the water level sensor 111.

When the internal pressure of the carbonated water tank 110 is not higher than the reference internal pressure (NO of operation 2120), the refrigerator 1" may warn the abnormality of the water level sensor 111 (operation 2130).

What the internal pressure of the carbonated water tank 110 is not higher than the reference internal pressure although carbon dioxide gas is supplied may represent that there are many empty spaces inside the carbonated water tank 110. In addition, it may represent that the water level of the purified water supplied to the carbonated water tank 110, when producing carbonated water, does not reach the highest water level.

The water level of the purified water may be detected by the water level sensor 111, and thus the refrigerator 1" may determine that the water level of the purified water is the highest water level due to the malfunction of the water level sensor 111 although the water level of the purified water does not reach the highest water level.

Therefore, the refrigerator 1″ may display the abnormality in the water level sensor 111 by using the user interface 300.

As mentioned above, the refrigerator 1″ may determine the presence of the abnormality in the water level sensor 111 by using the carbonated water tank pressure sensor 112.

Figure 39:
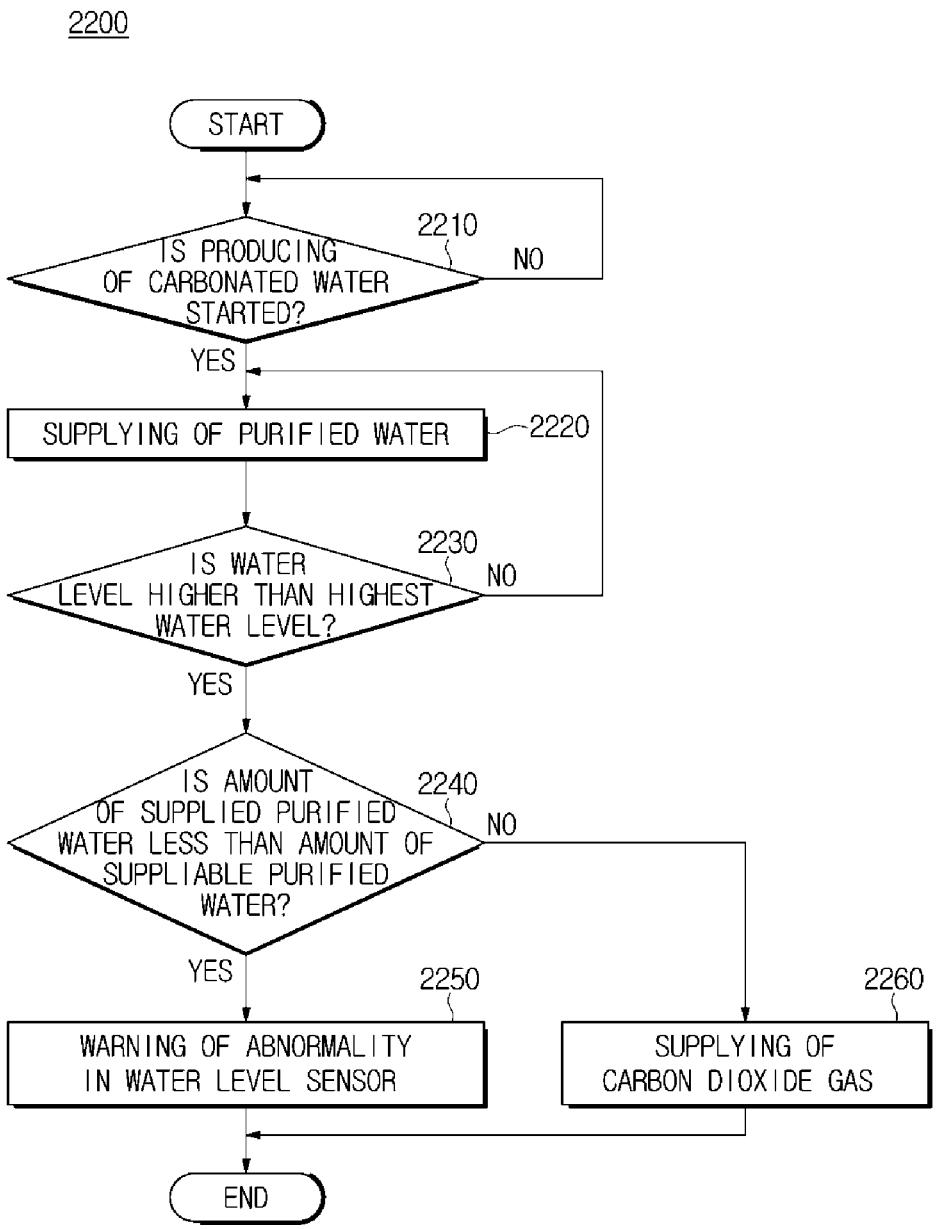
FIG. 39 is a view illustrating another example of a method of determining an abnormality in a water level sensor by a refrigerator according to another embodiment of the present disclosure.

FIG. 39 is a view illustrating another example of a method of determining an abnormality in a water level sensor of a refrigerator according to another embodiment of the present disclosure.

A method of determining an abnormality in the water level sensor 2200 in which the refrigerator 1″ determines an abnormality in the water level sensor 111 will be described with reference to FIG. 39.

The refrigerator 1″ may determine whether conditions for starting to produce carbonated water are satisfied (operation 2210).

The term of "conditions for starting to produce carbonated water" may represent conditions to allow the refrigerator 1″ to start to produce carbonated water. For example, when a carbonated water level of carbonated water stored in the carbonated water tank 110 is lower than the lowest level, the refrigerator 1″ may automatically start to produce carbonated water. In addition, when the user inputs a command of carbonated water production activation through the user interface 300, the refrigerator 1″ may start to produce carbonated water.

The refrigerator 1″ may supply purified water to the carbonated water tank 110 (operation 2220).

The refrigerator 1″ may open the purified water supply valve 131 to supply purified water to the carbonated water tank 110. In addition, the refrigerator 1″ may open the carbon dioxide gas discharge valve 152 to smoothly supply purified water to the carbonated water tank 110. Therefore, it may prevent a condition where purified water is not smoothly supplied to the carbonated water tank 110 when an internal pressure of the carbonated water tank 110 is higher than a supply pressure of purified water due to carbon dioxide gas in the carbonated water tank 110.

The refrigerator 1″ may determine whether the water level of purified water stored in the carbonated water tank 110 is higher than the highest level (operation 2230).

The refrigerator 1″ may determine whether the water level of purified water stored in the carbonated water tank 110 is higher than the highest level by using the water level sensor 111.

When the current is conducted between any one electrode between the first electrode 111a and the second electrode 111b, both of which are long and the third electrode 111c which is short, the refrigerator 1″ may determine that the carbonated water level is higher than the highest water level.

When the water level of purified water is not higher than the highest level (NO of operation 2230), the refrigerator 1″ may continue to supply purified water.

When the water level of purified water is higher than the highest level (YES of operation 2230), the refrigerator 1″ may determine whether the amount of supplied purified water is less than the amount of the purified water, which is suppliable (operation 2240).

Purified water is supplied to the carbonated water tank 110 by the water pressure of the external water source 40, and thus the amount of purified water supplied to the carbonated water tank 110, may be the same as the amount of purified water which is supplied to the purified water supply module 70″ from the external water source 40. In addition, the refrigerator 1″ may estimate the amount of the purified water supplied to the purified water supply module 70″ from the external water source 40 by using the flow sensor 77.

Therefore, the refrigerator 1″ may detect the amount of purified water supplied to the carbonated water tank 110 by using the flow sensor 77, and may compare the detected amount of supplied purified water with the amount of suppliable purified water.

The term of the amount of suppliable purified water may represent the amount of purified water, which is allowed to be supplied to the carbonated water tank 110 when carbonated water is produced.

Particularly, when the production of carbonated water is started since the water level of carbonated water reaches the lowest water level, the amount of suppliable purified water may represent the maximum amount of purified water corresponding to the highest water level of the carbonated water tank 110. In addition, when the production of carbonated water is started due to the user' command of producing carbonated water, the amount of suppliable purified water may represent the difference between the maximum amount of purified water corresponding to the highest water level of the carbonated water tank 110 and the amount of remaining carbonated water stored in the carbonated water tank 110.

When the amount of supplied purified water is less than the amount of suppliable purified water (YES of operation 2240), the refrigerator 1″ may warn an abnormality in the water level sensor 111 (operation 2250).

What the amount of supplied purified water is less than the amount of suppliable purified water may represent that the water level of purified water supplied to the carbonated water tank 110 does not reach the lowest water level.

The water level of the purified water may be detected by the water level sensor 111, and thus the refrigerator 1″ may determine that the water level of the purified water is the highest water level due to the malfunction of the water level sensor 111 although the water level of the purified water does not reach the highest water level.

Therefore, the refrigerator 1″ may display the abnormality in the water level sensor 111 by using the user interface 300.

When the amount of supplied purified water is not less than the amount of suppliable purified water (NO of operation 2240), the refrigerator 1″ may supply carbon dioxide gas to the carbonated water tank 110 (operation 2260).

Particularly, the refrigerator 1″ may open the carbon dioxide gas supply valve 152 to supply carbon dioxide gas.

As mentioned above, the refrigerator 1″ may determine the presence of the abnormality in the water level sensor 111 by using the flow sensor 77.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A refrigerator comprising:
    a body including an opening and a storage chamber configured to store food;
    at least one door coupled to the body to open and close the opening;
    a display provided on the at least one door;
    a water tank provided in the storage chamber and configured to store water; and
    a carbonated water production module including:
        a carbonated water tank provided on the at least one door and configured to store carbonated water;

a carbon dioxide gas cylinder storing carbon dioxide gas;

a water supply flow path fluidly coupling the water tank to the carbonated water tank;

a carbon dioxide gas supply flow path fluidly coupling the carbon dioxide gas cylinder to the carbonated water tank and to output a pressure signal corresponding to the detected internal pressure;

a carbonated water tank pressure sensor controllable to detect an internal pressure in the carbonated water tank;

a water supply valve controllable to open/close the water supply flow path to provide the water from the water tank to the carbonated water tank;

a carbon dioxide gas supply valve configured to open/close the carbon dioxide gas supply flow path to provide carbon dioxide gas from the carbon dioxide gas cylinder to the carbonated water tank;

a carbon dioxide gas discharge valve controllable to discharge carbon dioxide gas from the carbonated water tank; and a controller configured to control the water supply valve and the carbon dioxide gas supply valve to open in sequence to produce carbonated water in the carbonated water tank, wherein, the controller is configured to control the display to display an abnormality in at least one of the carbon dioxide gas supply valve and the carbon dioxide gas discharge valve based on the pressure signal outputted by the carbonated water tank pressure sensor, while the carbonated water is produced.

2. The refrigerator of claim 1 wherein:

in response to the carbonated water tank pressure sensor detecting that the internal pressure of the carbonated water tank is lower than a minimum pressure, the controller is configured to control the carbon dioxide gas supply valve to open until the carbonated water tank pressure sensor detects that the internal pressure of the carbonated water tank is equal to or higher than the minimum pressures, in response to the carbonated water tank pressure sensor detecting that the internal pressure of the carbonated water tank is higher than a maximum pressure, the controller is configured to control the carbon dioxide gas discharge valve to open so that the internal pressure of the carbonated water tank is equal to or lower than the maximum pressure.

3. The refrigerator of claim 1 wherein the controller is configured to control the display to warn against changing the carbon dioxide gas cylinder when the carbonated water is being produced and the internal pressure of the carbonated water tank is lower than a reference pressure after the carbon dioxide gas is supplied.

4. The refrigerator of claim 1 wherein the controller controls the display to display an abnormality in the carbon dioxide gas discharge valve or the carbon dioxide gas supply valve based on a control signal that is provided to the carbon dioxide gas discharge valve and the pressure signal outputted by the carbonated water tank pressure sensor while the carbonated water is produced.

5. The refrigerator of claim 4 wherein the controller controls the display to display an abnormality in the carbon dioxide gas discharge valve in response to the internal pressure of the carbonated water tank being higher than atmospheric pressure after an open valve signal is provided by the controller to the carbon dioxide gas discharge valve.

6. The refrigerator of claim 4 wherein, the controller controls the carbon dioxide gas discharge valve to open in response to the internal pressure of the carbonated water tank being the same as atmospheric pressure after an open valve signal is provided by the controller to the carbon dioxide gas discharge valve.

7. The refrigerator of claim 1 wherein the controller controls the display to display an abnormality in the carbon dioxide gas discharge valve or the carbon dioxide gas supply valve based on a control signal that is provided by the controller to the carbon dioxide gas supply valve and a pressure signal outputted by the carbonated water tank pressure sensor while the carbonated water is produced.

8. The refrigerator of claim 7 wherein the controller controls the display to display an abnormality in the carbon dioxide gas supply valve in response to the carbonated water tank pressure sensor detecting that the internal pressure of the carbonated water tank is not increased after the controller provides an open valve signal to the carbon dioxide gas supply valve.

* * * * *

UNITED STATES PATENT AND TRADEMARK OFFICE
CERTIFICATE OF CORRECTION

PATENT NO.         : 10,947,098 B2                                  Page 1 of 1
APPLICATION NO.    : 15/475729
DATED              : March 16, 2021
INVENTOR(S)        : Jae Koog An et al.

It is certified that error appears in the above-identified patent and that said Letters Patent is hereby corrected as shown below:

In the Claims

Column 45 Line 39:
In Claim 2, delete "pressures," and insert -- pressure, --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*